United States Patent [19]

Tavor et al.

[11] Patent Number: 6,070,149
[45] Date of Patent: May 30, 2000

[54] VIRTUAL SALES PERSONNEL

[75] Inventors: Onn Tavor, Ramat Hasharon; Gila Ben Avraham; Vadim Shevchenko, both of Netania, all of Israel

[73] Assignee: Activepoint Ltd., Netania, Israel

[21] Appl. No.: 09/109,726

[22] Filed: Jul. 2, 1998

[51] Int. Cl.$^7$ .................................................. G06F 17/60
[52] U.S. Cl. ............................................. 705/26; 706/47
[58] Field of Search ............................... 705/26, 27, 35, 705/1, 10; 706/47, 46, 11, 12

[56] References Cited

U.S. PATENT DOCUMENTS

| | | | |
|---|---|---|---|
| 4,992,940 | 2/1991 | Dworkin ................................... | 705/26 |
| 5,454,106 | 9/1995 | Burns et al. ............................. | 395/600 |
| 5,581,664 | 12/1996 | Allen et al. .............................. | 706/46 |
| 5,586,218 | 12/1996 | Allen ....................................... | 706/12 |
| 5,696,962 | 12/1997 | Kupiec .................................... | 395/604 |
| 5,701,399 | 12/1997 | Lee et al. ................................. | 706/11 |
| 5,715,399 | 2/1998 | Bezos ...................................... | 705/35 |
| 5,774,868 | 6/1998 | Cragun et al. ........................... | 705/10 |
| 5,852,814 | 12/1998 | Allen ....................................... | 706/13 |
| 5,890,139 | 3/1999 | Suzuki et al. ............................ | 705/27 |
| 5,905,973 | 5/1999 | Yonezawa et al. ...................... | 705/27 |
| 5,926,798 | 7/1999 | Carter ...................................... | 705/26 |
| 5,937,389 | 8/1999 | Maxwell ................................. | 705/10 |
| 5,978,784 | 11/1999 | Fagg, III et al. ........................ | 706/11 |
| 5,983,200 | 11/1999 | Slotznick ................................. | 705/26 |
| 6,012,051 | 1/2000 | Sammon, Jr. et al. .................. | 705/26 |

OTHER PUBLICATIONS

"Brightware Amer Finance: Brightware and American Finance Team to Provide Mortgages in Minutes on Internet.." Business Wire, Feb. 28, 1997.

Tomasula, D. "Self–service Web Ware Could Make Service Reps Obsolete." Wall Street & Technology, vol. 15, No. 3, p. S26, Mar. 1997.

"Brightware, Inc. Ships Brightware 1.0 to Automate Selling on the Net." Press Release, Aug. 4, 1997.

"Brightware Ships Web's First Automated Real–time Advice Agent." Press Release, Jun. 29, 1998.

"Brightware: AI is Alive and Kicking." Software Futures, May 1, 1996.

Tehrani, N. "The Internet and Call Center . . ." Telemarketing & Call Center Solutions, vol. 15, No. 2, p. 4, Aug. 1996.

Bucholtz, C. "Working with the Web, BellSouth Brings 'Do it yourself' Applications to Customer Service." Telephony, Aug. 25, 1997.

Nelson, M. "Neuromedia Offers Automated Online Service." Infoworld, vol. 20, No. 13, p. 20, Mar. 30, 1998.

*Primary Examiner*—Allen R. MacDonald
*Assistant Examiner*—Michele Stuckey Crecca
*Attorney, Agent, or Firm*—Mark M. Friedman

[57] ABSTRACT

A method for enabling users over a network or over the WWW to interact with an interactive sales representative system for providing sales guidance. The system offers the user products, services, or ideas (the "products") according to parameters collected from the user. The system guides the customer to retrieve the desired products. If the system does not have a product matched to the customer requirements, preferably it will operate a mechanism for suggesting alternatives which are the closest to the customer requirements. The system will execute various sales tools and techniques to help and assist the customer and to convince the customer to purchase a product. By guiding the customer to the target product, the system will shorten the search cycle for the customer as well as find better matched products. The system will provide market advisory, suggest, recommend, discuss (in written form and optionally voice form), comment, advise the customer regarding the products. The system might advise the customer in any other aspects as well (such as providing personal feedback). The system adds graphics, animation, 3D, movie clips, voice and other effects to make the session enjoyable for the customer. The system is capable of executing various tools and techniques to improve its sales capabilities and bring better sales results.

6 Claims, 22 Drawing Sheets

FIG 1 - Sales Engine - General Architecture

FIG 2  *Sales Engine Unit (SEU)*

FIG 5. *Comments processing*

FIG 6. *preferred*

FIG 7. *Arithmetics*

FIG 9. Spider

FIG 10. Path

FIG 11. Pipe Line

FIG 12. Path + Rules

FIG 13. offering alternatives

FIG 14. Financial Purchase Manager

Credit Card Charge

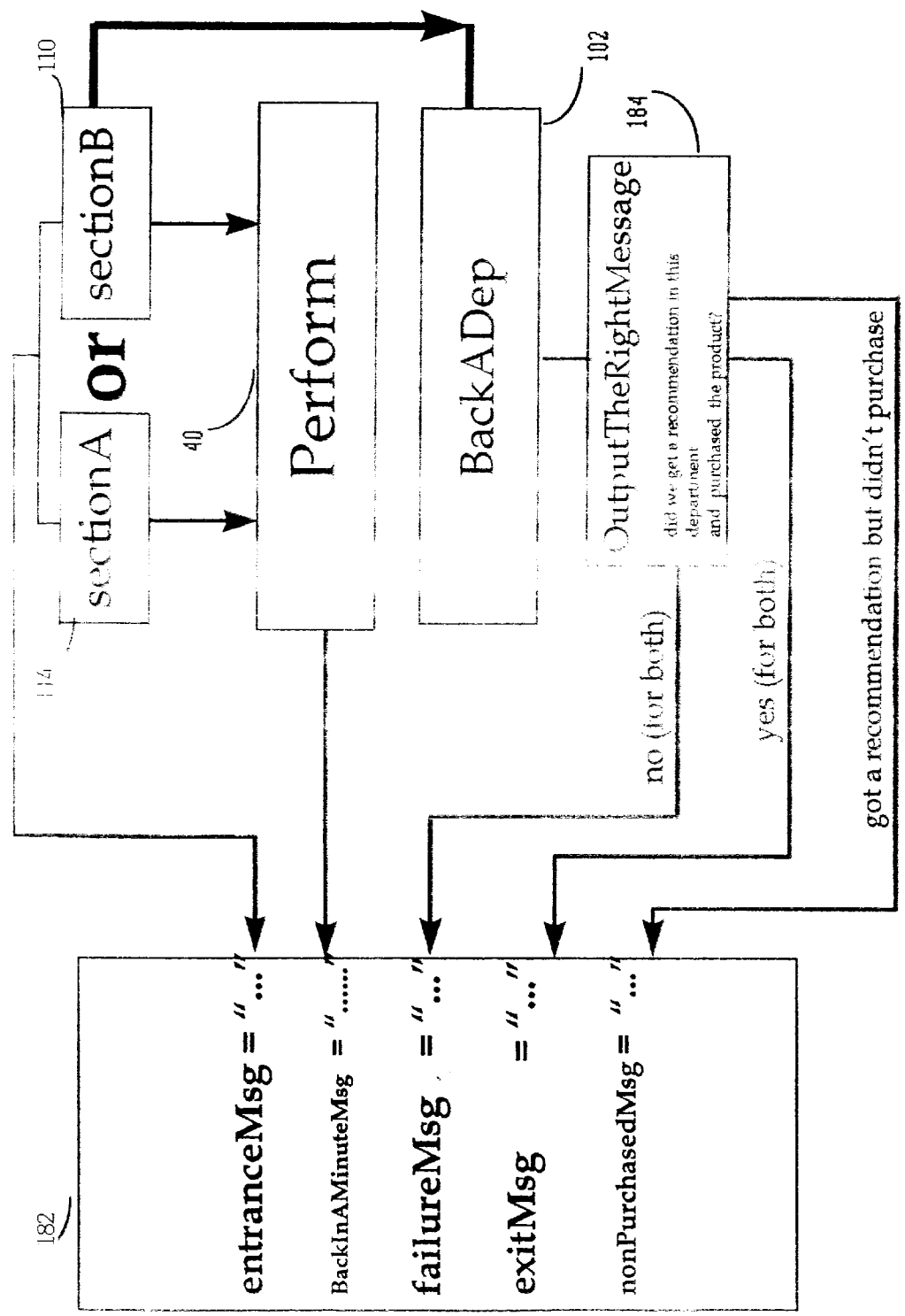
FIG 16. Department messages

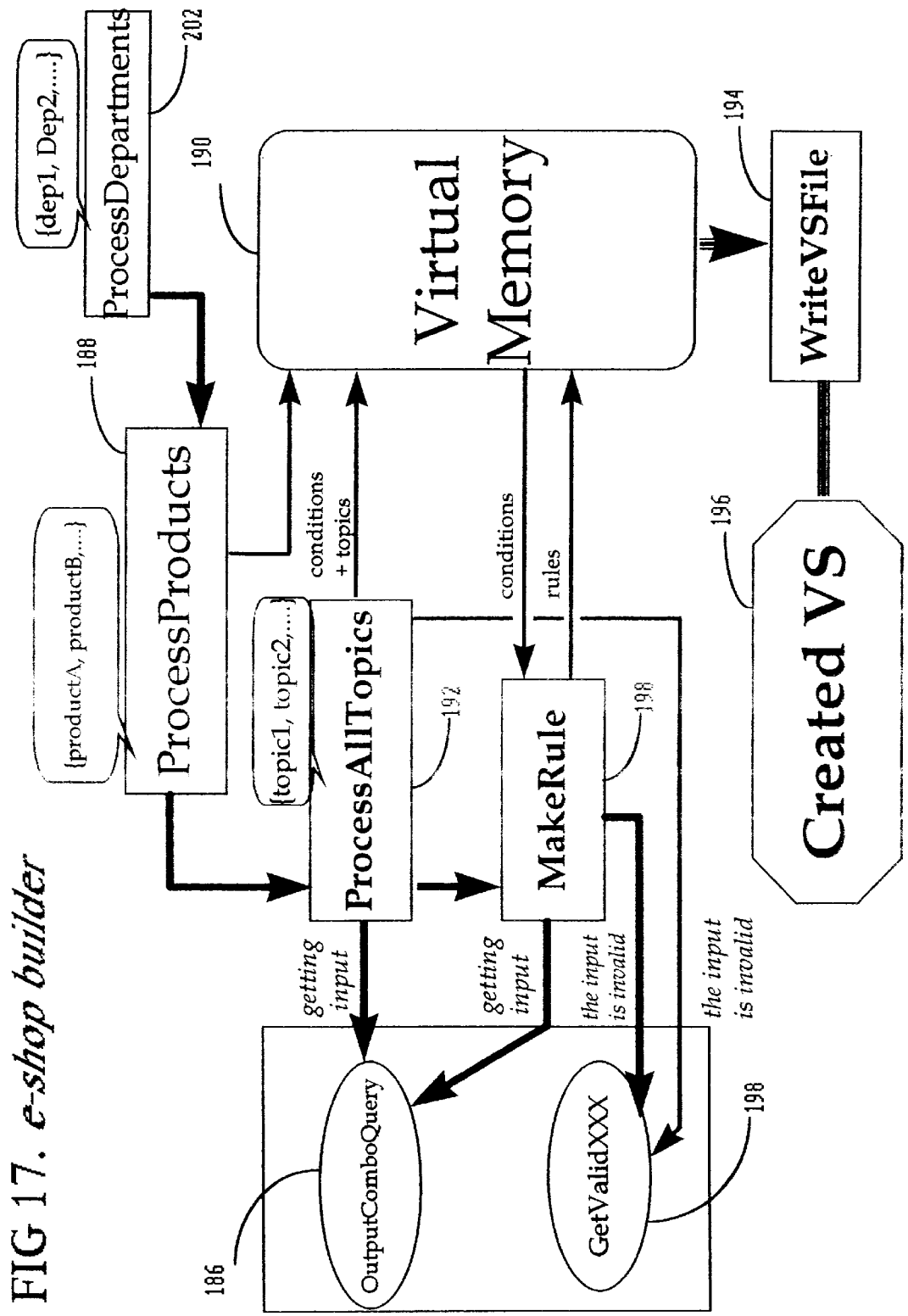
FIG 17. e-shop builder

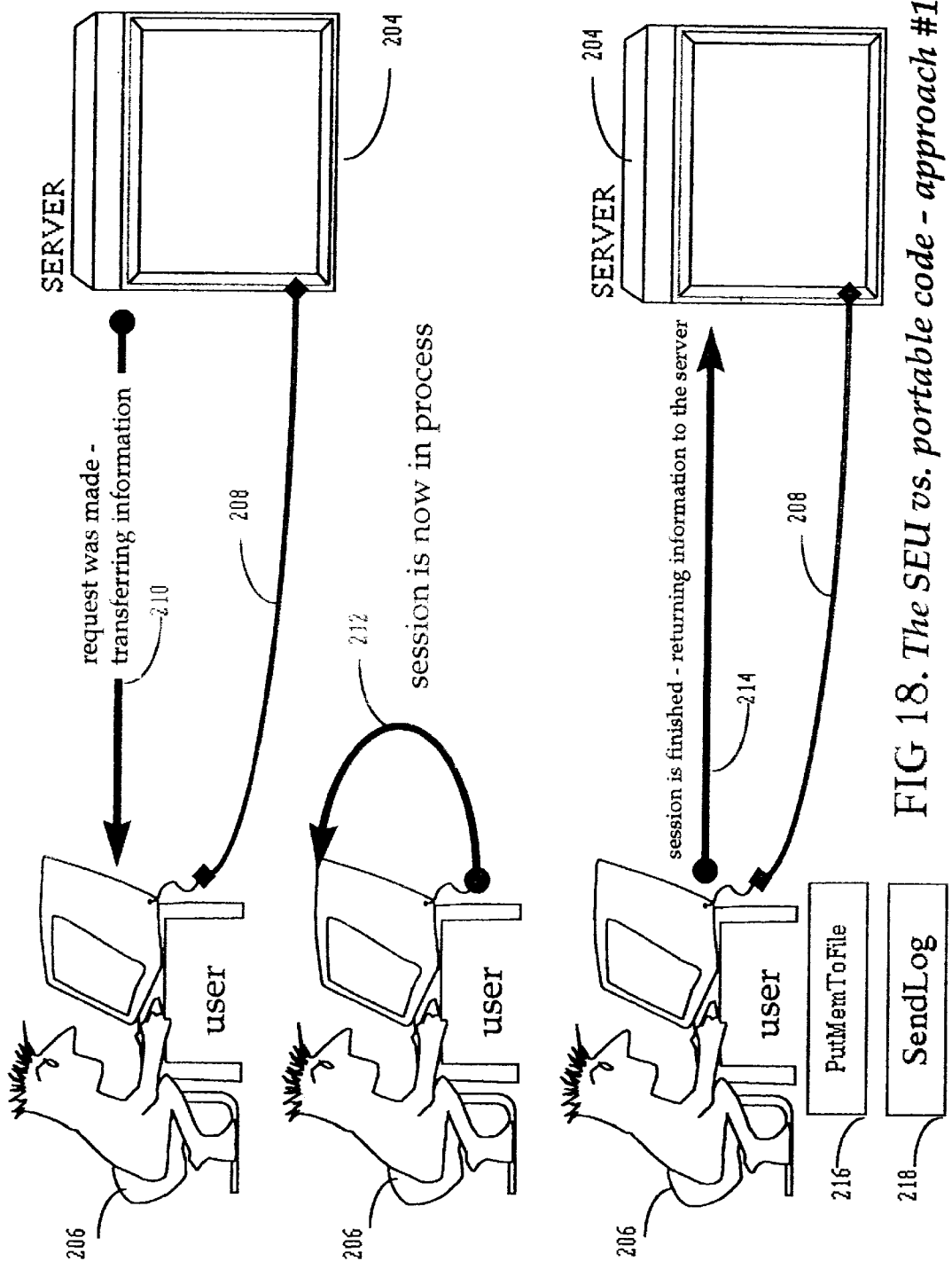
FIG 18. *The SEUI vs. portable code - approach #1*

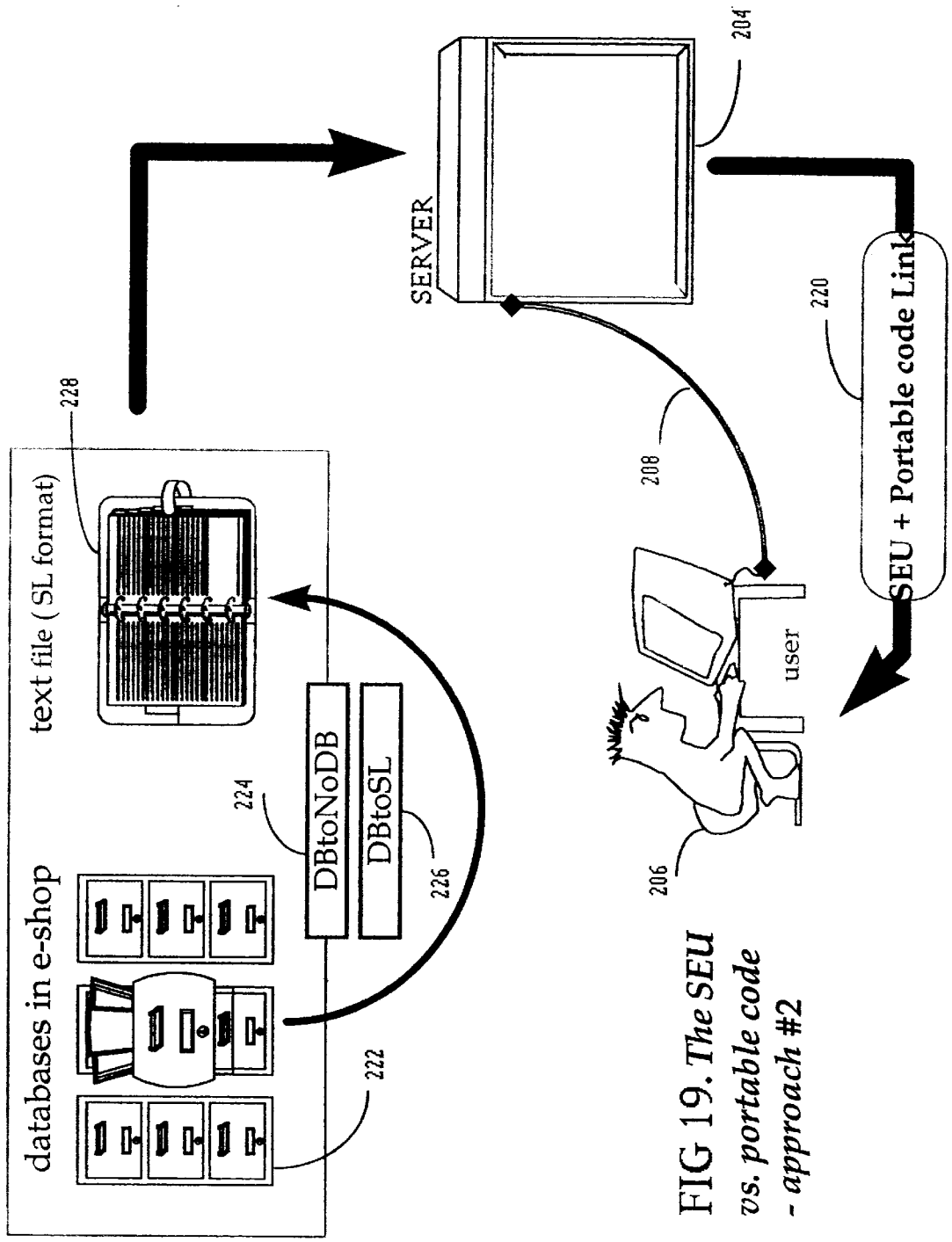
FIG 19. *The SEU vs. portable code - approach #2*

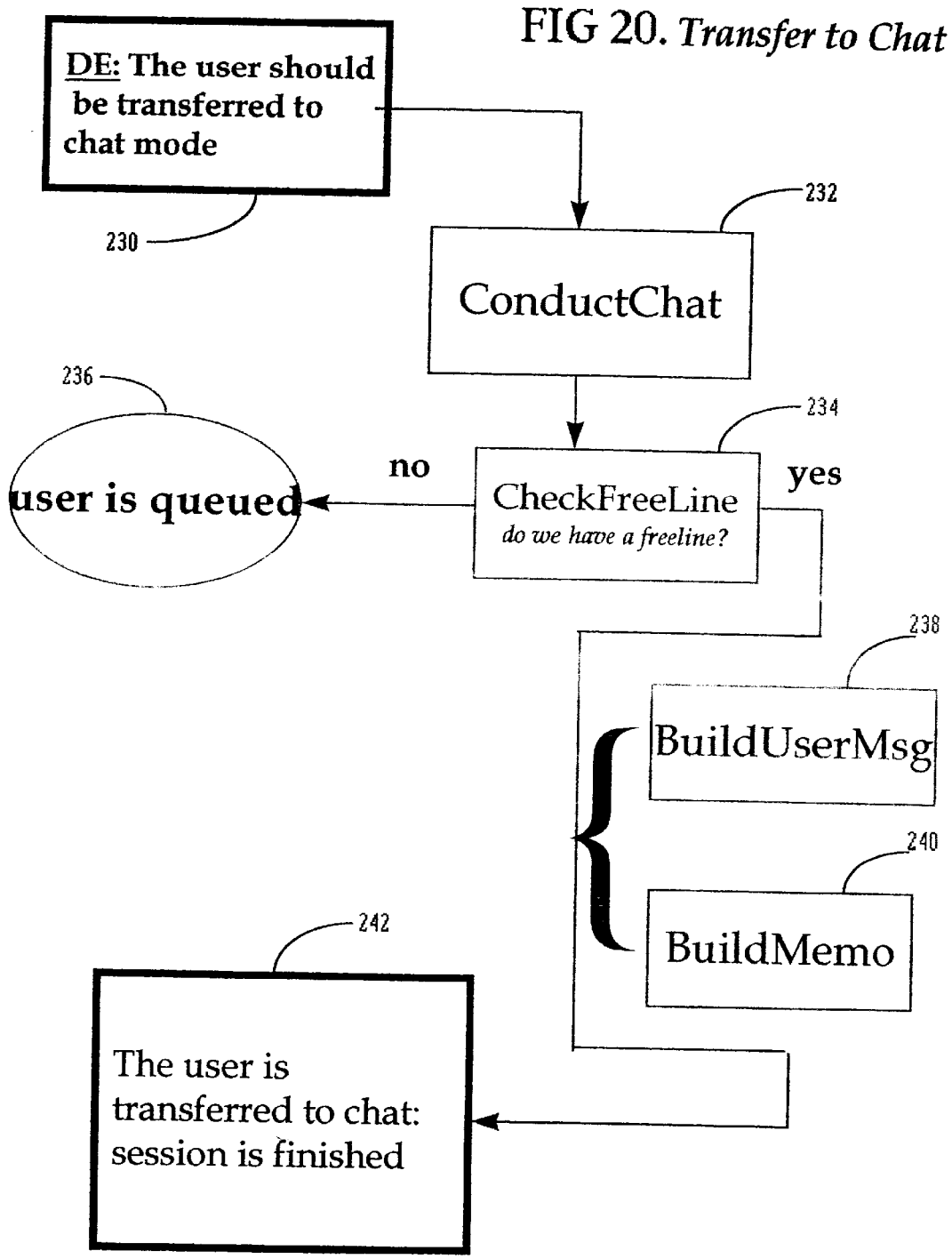
FIG 20. *Transfer to Chat*

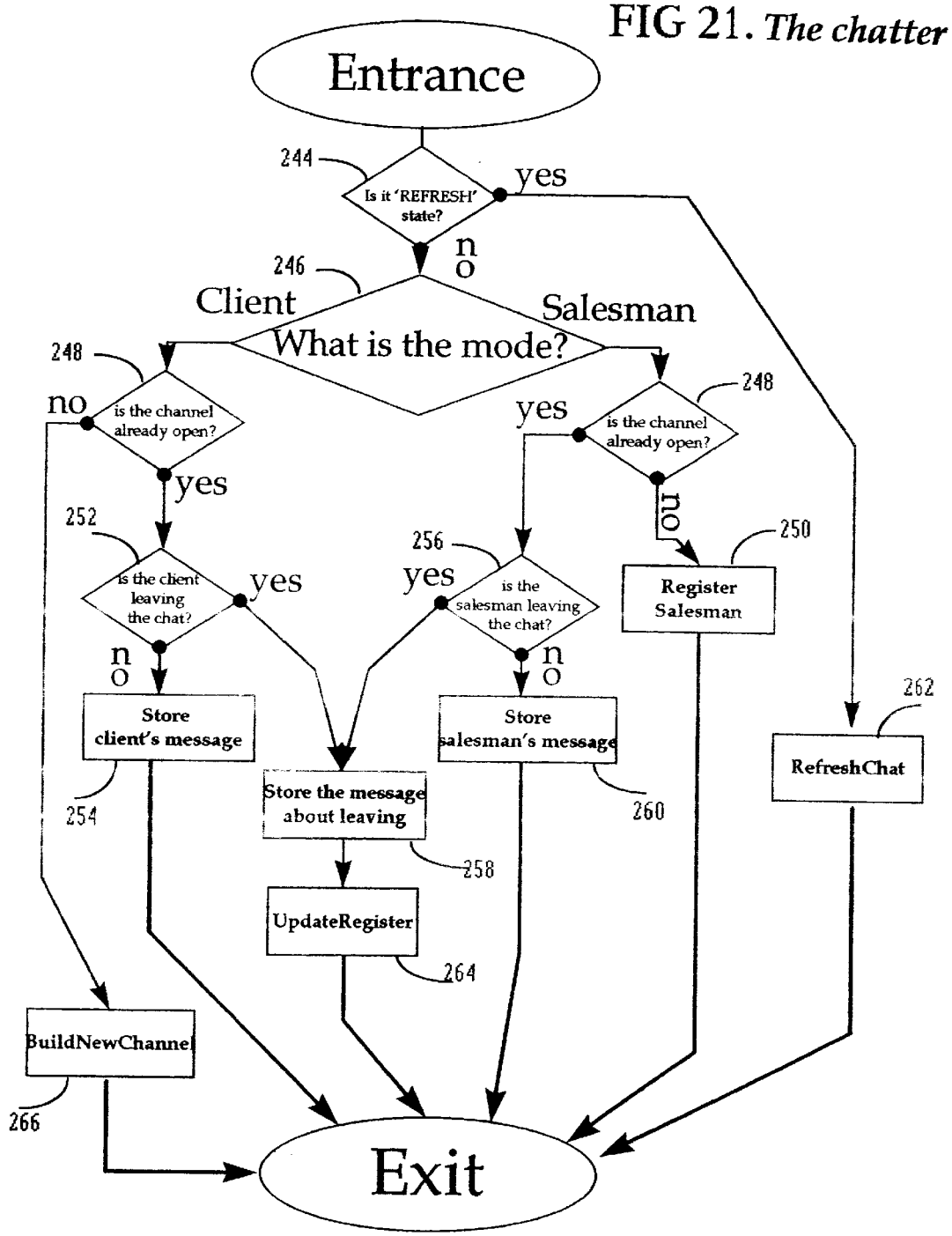
FIG 21. *The chatter*

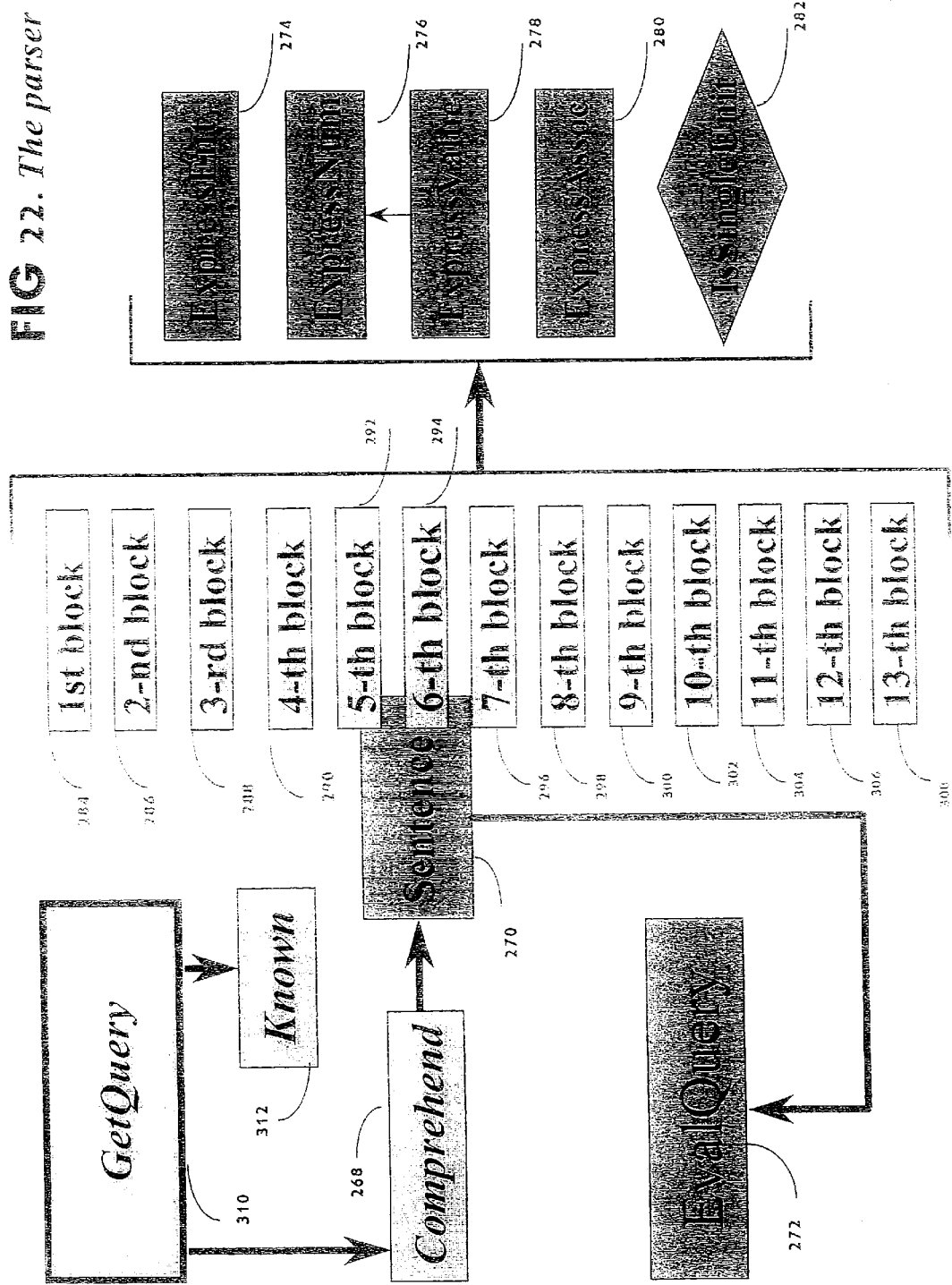
FIG 22. *The parser*

VIRTUAL SALES PERSONNEL

FIELD AND BACKGROUND OF THE INVENTION

The present invention relates to virtual sales personnel, and more particularly, to software which is capable of assisting a computer user to complete an on-line sales transaction in a substantially similar manner as a human sales representative.

As the Internet grows, many Web sites are becoming connected and more corporations are trying to do business on the "Web". Although most information is still given freely on the Internet, an increasing number of organizations are attempting to actually sell their products electronically by charging a credit card. As credit card security problems are being resolved, the area of electronic sales, or Electron Commerce (e-commerce), has been developing rapidly. The new and exciting point about e-commerce is the ability of every one, almost anywhere on the globe to which a Web connection is available, to access any commercial business offerings catalog implemented as a Web site. Moreover, the user, can access this service anytime, 24 hours a day, seven days a week. However, one area in which virtual stores lag far behind their actual, physical counterparts is in the area of sales representatives.

A common practice worldwide in actual physical stores is to have sales representatives or sales persons. These sales representatives help the customer to understand the product and its benefit to the customer, as well as enabling customers to find the needed product quickly. In addition, the sales representative can advise the customer on product related issues, including the virtues of competing brands. In this sense, the sales representative is the technical expert who generally advises the buyer. However, since the sales representative is also an employee of the store, the sales representative should also promote certain products according to the interest of the business and also sell as many products as possible.

As a basic example, if customers go to a computer hardware or software store, a sales representative helps them find the appropriate product. Even when ordering a product over the phone, a sales representative can speak to the customer directly and give advice. Unfortunately, when the customer wishes to buy a product through the Internet, only a menu and pictures are shown. No advice, no knowledge, no expertise, no confidence in the purchase is provided. Thus, if the customer does not understand computers, for example, he or she will not purchase one through a virtual store on the Internet since no advice is provided.

Clearly, one solution would be to add the Sales Representative function to the Internet virtual store. Currently, the merchant would need to hire 3 shifts of human representatives for a 7 day work week, including holidays. Then, the merchant would need a chat system in a cell center of some sort for enabling communication from these "human" Sales Representatives to the users over the Web. Thus, this solution is difficult and expensive to implement.

There is thus a need for, and it would be useful to have, a virtual sales representative accessible through the Internet or via some other electronic connection, with which a potential customer can communicate through interactions with a GUI (graphical user interface) such as a Web browser.

SUMMARY OF THE INVENTION

It is one object of the present invention to provide a virtual sales representative.

It is another object of the present invention to provide intelligent interactions with a computer user for the purpose of securing a sale.

It is yet another object of the present invention to provide such intelligent interactions through a GUI.

It is still another object of the present invention to provide such a GUI through a Web browser, such that the virtual sales representative is accessed through the Internet. Alternatively, the GUI is provided through an applet or other stand-alone software program, such that the virtual sales representative is accessed through a locally operated software module.

These and other objects of the present invention will be explained in further detail with regard to the description, figures and claims given below.

Hereinafter, the term "Web browser" refers to any software program which can display text, graphics, or both, from Web pages on World Wide Web sites. Hereinafter, the term "Web page" refers to any document written in a mark-up language including, but not limited to, HTML (hypertext make-up language) or VRML (virtual reality modeling language), dynamic HTML, XML (extended mark-up language) or related computer languages thereof, as well as to any collection of such documents reachable through one specific Internet address or at one specific World Wide Web site, or any document obtainable through a particular URL (Universal Resource Locator). Hereinafter, the term "Web site" refers to at least one Web page, and preferably a plurality of Web pages, virtually connected to form a coherent group.

Hereinafter, the term "applet" refers to a self-contained software module written in an applet language such as Java or constructed as an ActiveX™ control.

Hereinafter, the term "network" refers to a connection between any two computers which permits the transmission of data. Hereinafter, the term "computer" includes, but is not limited to, personal computers (PC) having an operating system such as DOS, Windows™, OS/2™ or Linux; Mackintosh™ computers; computers having JAVA™-OS as the operating system; and graphical workstations such as the computers of Sun Microsystems™ and Silicon Graphics™, and other computers having some version of the UNIX operating system such as AIX™ or SOLARIS™ of Sun Microsystems™; or any other known and available operating system. Hereinafter, the term "Windows™" includes but is not limited to Windows95™, Windows 3.x™ in which "x" is an integer such as "1", Windows NT™, Windows98™, Windows CE™ and any upgraded versions of these operating systems by Microsoft Inc. (Seattle, Wash., USA).

Hereinafter, the phrase "display a Web page" includes all actions necessary to render at least a portion of the information on the Web page available to the computer user. As such, the phrase includes, but is not limited to, the static visual display of static graphical information, the audible production of audio information, the animated visual display of animation and the visual display of video stream data.

Hereinafter, the term "user" is the person who operates the Web browser or other GUI interface and navigates through the system of the present invention.

Hereinafter the word "product" includes both physical products and services (tangible and intangible products), as well as ideas and concepts.

Abbreviations in the text are as follows:

VSD—Virtual shop designer (Sales Representative Designer)

VS—virtual shop (Sales Representative)

SEU—The core of the Sales Engine Unit (SEU)

BRIEF DESCRIPTION OF THE INVENTION

The present invention is of a virtual sales representative for interacting with a customer browsing a virtual store Web site, for example. The virtual sales representative can ask questions and receive answers from the customer. The reverse is also possible, in which the customer poses the question. In addition, the virtual sales representative can be programmed to guide the sales transaction in order to promote certain products, for example, or in order to more easily provide the customer with the desired product. Such guidance is provided through software modules capable of "intelligent" interaction with the customer, as described in more detail below. The operation of the virtual sales representative is as follows.

First, the user navigates via the Web browser to a site where the system operates. The Internet sales representative system of the present invention then interacts with the user, advises, guides, consults, suggests, comments and negotiates with the user regarding items available for sale or any other topic to be conveyed. The system offers alternatives in case the requested item is not available. The system works to convince the user to buy certain products and generally promotes the products.

The system is installed over a Web server and preferably serves many users simultaneously. The number of users is limited substantially only by the capacity of the server itself.

The system accompanies the customer from the initial stage of requesting an Internet sales representative, through the stage of determining the needs of the customer, guiding the customer to the desired products while maintaining a product and market advisory, and generally suggesting or recommending, and discussing or commenting with regard to the product through the purchasing process. The system follows a line of reasoning in order to sell to the end user. The system optionally continues through the credit card charge process with a secure mechanism for charging the card.

The system feature a "Detection engine" mechanism to recognize characteristics of the user and to modify the session from user to user according to the individual. The "Detection engine" is capable of sensing certain behavior patterns by the user, such as: curious about more information, serious customer, not a serious customer, and the like.

The system, following a signal from the "Detection engine" or following a request from the user, preferably can change the session from the logic based system to a chat mode with a "live" human sales representative whenever and if one is available. The "live" sales representative is preferably briefed regarding the customer's interests (if any were demonstrated), such that the session will preferably continue smoothly from the logic based system to the chat mode.

The system, following a signal from the "Detection engine" optionally and preferably writes the email addresses of all the users which the "Detection engine" found to be interesting or important to a dedicated log file.

The system performs the functions described above also on a stand alone system without the Internet as well as over a network system, using either Internet technologies such as browsers and servers or a dedicated Graphical User Interface (GUI) without Internet or web tools.

The system has at least one application file per business application. The application file is built by the builder system by interviewing a sales representative or other expert individuals regarding the products and strategy of the desired sales. The interviewing is done in a process of an intelligent "chat-like" session, where the sales person or other qualifying personnel answers questions asked by the system according to instructions, explanations and guidance by the intelligent system.

BRIEF DESCRIPTION OF THE DRAWINGS

The foregoing and other objects, aspects and advantages will be better understood from the following detailed description of a preferred embodiment of the invention with reference to the drawings, wherein:

FIG. 16 is a schematic block diagram of an illustrative department messaging system according to the present invention;

FIG. 17 is a schematic block diagram of an illustrative e-shop builder according to the present invention;

FIG. 18 is a schematic block diagram of a first illustrative portable code implementation of the system of the present invention;

FIG. 19 is a schematic block diagram of a second illustrative portable code implementation of the system of the present invention;

FIG. 20 is a schematic block diagram of an illustrative chat transfer system according to the present invention;

FIG. 21 is a schematic block diagram of an illustrative chat session according to the present invention; and FIG. 22 shows an illustrative parser according to the present invention.

DETAILED DESCRIPTION OF THE INVENTION

The present invention is of a virtual sales representative for interacting with a customer browsing a virtual store Web site, for example. The virtual sales representative can ask questions and receive answers from the customer. The reverse is also possible, in which the customer asks the questions and the virtual sales representative gives the answer. In addition, the virtual sales representative can be programmed to guide the sales transaction in order to promote certain products, for example, or in order to more easily provide the customer with the desired product. Such guidance is provided through software modules capable of "intelligent" interaction with the customer, as described in more detail below.

The principles and operation of a method for providing a virtual sales representative to a computer user according to the present invention may be better understood with reference to the drawings and the accompanying description, it being understood that these drawings are given for illustrative purposes only and are not meant to be limiting.

Figure 1:
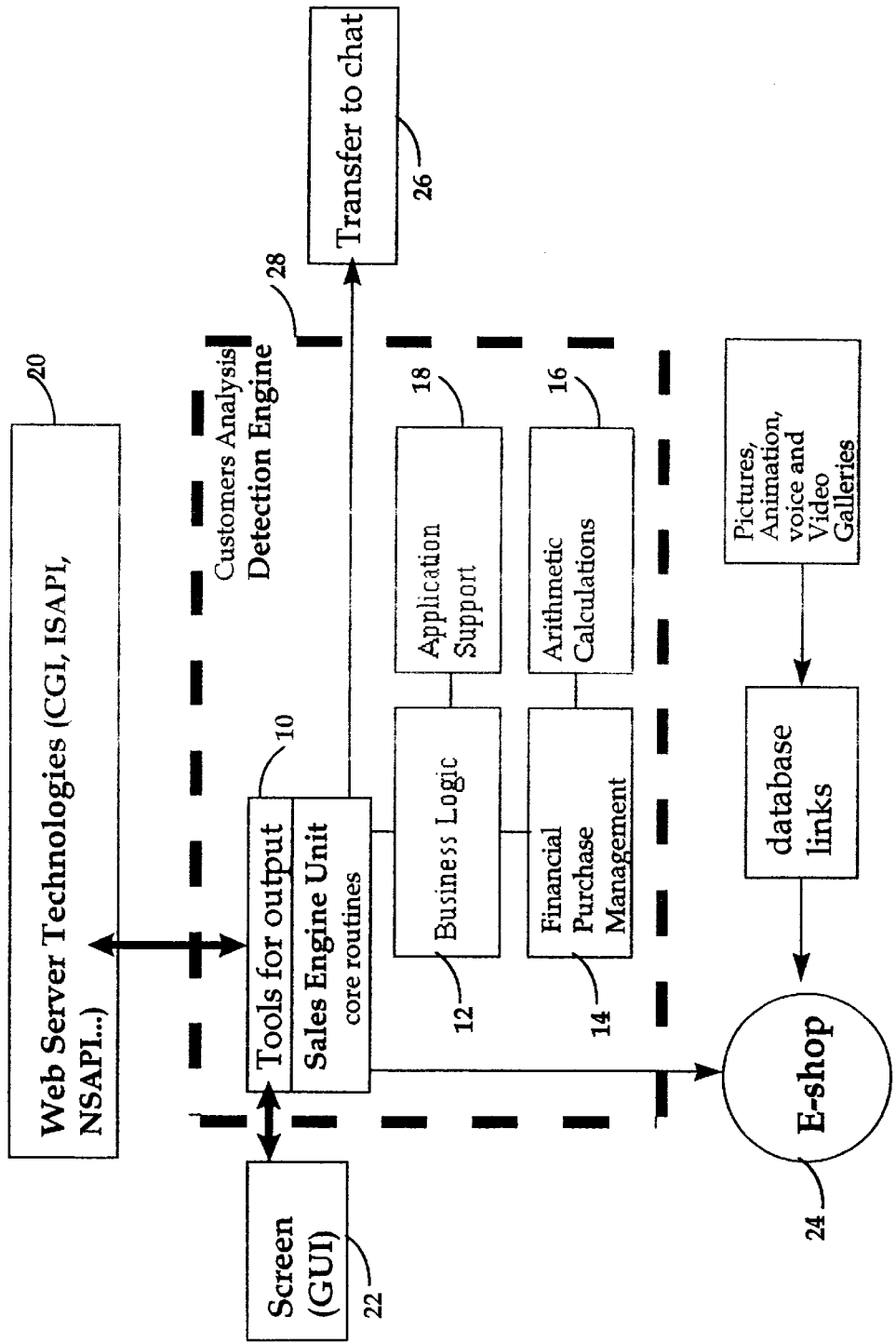
FIG. 1 is a schematic block diagram of an illustrative sales representative system of the present invention.

Referring now to the drawings, FIG. 1 is an exemplary block diagram of a virtual sales representative system according to the present invention. Block 10 of the system shows the Sales Engine Unit core routines: rules linkage, "lookAhead", reading information from the e-shop and basic rules processes as described in more detail below. Block 12 is the Business Logic module for controlling the departments and business strategies. Block 14 shows the Financial Purchase Management system, including the credit card charge security of the present invention. Block 16 includes various arithmetical functions such as the arithmetic parser. Block 18 shows the Application Support module, including the generation of sales comments, department messages and multimedia output. Block 20 is the module providing the Web server technologies and block 22 is the GUI (graphical user interface) platform for interactions with the user. Block 24 is the E-Shop and includes links to the various modules required for the interaction of the virtual sales representative and the user. Block 26 is a software module providing the option to transfer the interaction to "chat mode" with user. Block 28 is the Detection Engine. All of these software modules and components of the present invention are described in more detail below.

Figure 2:
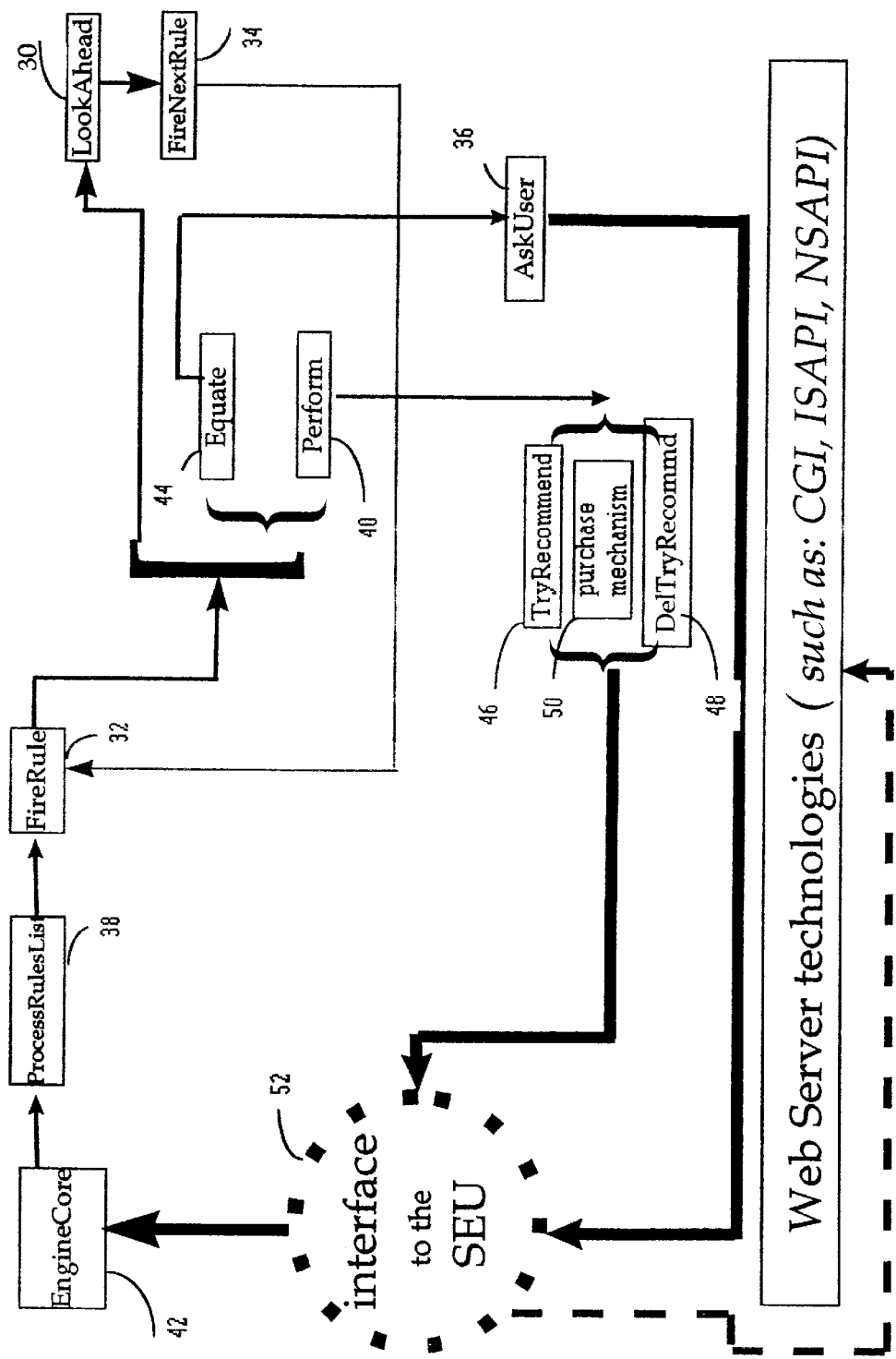
FIG. 2 is a schematic block diagram of an illustrative sales engine unit of the present invention.

Turning now to the sales engine unit (SEU), FIG. 2 shows a more detailed description of SEU 10, SEU 10 interacts with the user using a CGI or other web server interface, as shown by the block labelled "Interface to the SEU" (block 52), which calls the main SEU procedure labelled "EngineCore" (block 42). "Interface to the SEU" (block 52) handles the I/O (input and output) which consists of questions and answers from the user.

Inside SEU 10 there are global functions for processing the rule base, such that the answer of the user is analyzed according to the rule base of the E-shop (see below), and to determine if another question is to be asked or if a type of a product can be recommended to the user. "ProcessRulesList" (block 38) is initiated and starts the process by calling the software module "FireRule" (block 32). "FireRule" (block 32) then walks through the list of rules with a trace marker to determine if any rule can be satisfied yet, in order to guarantee the alertness and efficiency of the system.

The SEU includes which is a logic unit for decomposing the answer of the user into at least one fragment and for determining if the fragment satisfies a rule of the rule base. The rules are decomposed into at least one sub-condition or rule portion by the EngineCore routine. The actual logic testing of the rules is handles by the module labelled "Equate" (block 44). This function will return the value TRUE preferably if and only if all the processing of the sub-conditions returns TRUE. At the very least, the function should return the value TRUE substantially only if the at least one fragment satisfies at least one rule of the rule base.

If logic testing returns the value TRUE, the action or actions required in response are performed with the module labelled "Perform" (block 40), which is responsible for recommending the product for the user. The purchase is then made by the user by clicking the "purchase" button of GUI (block 22, see FIG. 1), thereby launching the "Purchase Mechanism" module (Block 50).

"FireRule" (block 32) algorithm uses the working memory directly to determine the rule being examined, by saving the position of the rule in the list which is the trace marker.

"FireRule" (block 32) uses "Equate" (block 44) to determine that the rule conditions are satisfied. "Equate" (block 44) asks the user questions regarding those conditions, using the module "AskUser" (block 36). "AskUser" (block 36) uses a flag to stop the output of the questions to the user after the first question. Then, "FireRule" (block 32) launches the "lookAhead" software module (block 30), which processes the entire list of rules and tries to satisfy a rule, based on the information already obtained. This is done in order to break the dependency between the order of the product recommendation, the order of the rules and the "length", or number of conditions, in the rule. The main function employed is "FireNextRule" (block 34).

When a rule is processed and fails from lack of information, the condition is indicated with the appropriate flag. In this case, the module "lookAhead" (block 30) starts at the following rule, returning to the current rule when "FireNextRule" (block 34) is finished. If the rule fails from contradictory information—"lookAhead" (block 30) goes to the following rule, returning to the following rule when "FireNextRule" is finished.

"FireRule" (block 32) is not finished until every rule in the rules list has been fully processed and either proven or failed.

"FireRule" (block 30) is the shell to the "FireNextRule" (block 34) routine. The tasks performed are used to preserve the system status before launching "FireNextRule" (block 34).

Before "FireNextRule" (block 34) is launched, "lookAhead" (block 30) saves the current position in the list of rules in order to be able to return after "FireNextRule" (block 34) is finished. The current position is passed to "lookAhead" (block 30) as an argument. "lookAhead" (block 30) then restores the previous position after returning from "FireNextRule" (block 34). Optionally, if "Equate" (block 44) turned a flag regarding missing information in the process rule processing, "lookAhead" (block 30) turns it off.

The software module named "FireNextRule" (block 34) is the "twin" of "FireRule" (block 32), in the sense that it makes the same use of memory and calls the same routines as "FireRule" (block 32), with the exception of "lookAhead" (block 30). "FireNextRule" (block 34) works until all the rules are processed, discarding and performing any rule that can be proven with the current stack of information (without external input).

Technologies such as CGI operate within the framework of sequentially entering and exiting a system. When output takes place the system is shut down until the user submits the form and then the program entered again. In order to accomodate this structure, if rule performance involving output occurs and the system exits from "FireNextRule" (block 34), the previously saved position of the rule which "FireRule" (block 32) was last processing is not saved. Instead, when the program is re-entered, the previously saved position acts as a flag, such that the system continues from "FireNextRule" (block 34) using that flag. "FireNextRule" (block 34) is used in other mechanisms of the systems besides "lookAhead" (block 30).

The "Equate" (block 44) software module provides the support for the entire session. The rules to be evaluated consist of fragments of conditions, which in combination enables the virtual sales representative to recommend a particular product to the user.

"Equate" (block 44) allows use of any of the logical operators {and, or, =} and the arithmetical operators of comparison {=, =, <, >, <=, >=}. "Equate" (block 44) is a recursive routine formally defined as follows: Equate (Part1) and Part2): Equate(Part1) Equate(Part2)

The rule is considered proven if the invocation of "Equate" (block 44) both on Part1 and Part2 returns TRUE.

Equate (Part1 or Part2): Equate (Part1) Equate (Part2)

Now the rule is considered proven if either the invocation of "Equate" (block 44) on Part1 returns TRUE or the invocation of "Equate" (block 44) on Part2 returns TRUE.

For any other operator—Equate(X) (see "Equate" block 44) compares the pattern of the condition to the already known information. It returns TRUE if the right side of the condition is present in the stack of known information. Otherwise, it fails.

In the case of missing information "Equate" (block 44) calls "AskUser" (block 36) to get more information from the user by asking questions. In case the output is blocked, by "lookAhead" (block 30), for example, "Equate" (block 44) also returns FALSE. To distinguish between the different cases, a "missing_value" flag is set.

The "Perform" (block 40) software module is implemented as a unique routine used to perform numerous tasks, as described with reference to the remaining Figures below. "Perform" (block 40) is initiated once a rule has been proven, such that all the conditions were fulfilled and a product can be recommended. In order to recommend the product, the "TryRecommend" (Block 46) routine is started, which will find the product in the virtual shop and it's text/url/html reference, and send the information back to the user with the CGI or other Web server technology transaction.

"Perform" (block 40) writes to the memory all the products that were recommended, information which shall be used later for other mechanisms such as "CC Charge". "Perform" (block 40) can also recommend several products by the same condition, using the logic operator "and". This saves constructing the same rule multiple times.

The above 4 tasks of the "Perform" (block 40) software module can be used in various combinations through the same rule, linked by the operator "and". The "AskUser" (block 36) routine is used to generate the query output. After the first question is sent, "AskUser" (block 36) turns the "question_on" flag, blocking further output until that flag is removed by another routine.

"AskUser" (block 36) uses mechanisms defined in the "Interface to the SEU" (Block 52) to generate a query with all the related multimedia attributes (sound, video, pictures, text/html). The only argument is the query's name as defined in the virtual shop. As noted above, "TryRecommend" (Block 46) is used to generate another type of output: the product recommendation text. This software module can also be used to generate "normal" text answers without recommending any product.

The difference between a product and a text answer is being processed by the "Interface to the SEU" (Block 52) which is called here to complete the final output. "TryRecommend" (Block 46) works differently based upon the "sales strategy" choses. For "human" sales representatives, the module generates an immediate output without any reference to the memory. In the "quick" or "cruiser" mode, the module gathers the products and text references to a list output as the session is finished ("FireRule" (block 32) finished rule processing).

In addition to the "TryRecommend" (Block 46) software module, an option is given to use "TryGetConstText". "TryGetConstText" is a unique routine which enables a "canned" text to be combined with information generated on the fly. For example: "The time now is 15:00" or "You have to pay us $23000".

If the VSD wants to use sentences of the form above in the system of the present invention, the "variable" must be declared, with the text part of this type of answer. The information should be glued to the end of the text and is received by the rules in the e-shop. This part of "TryGetConstText" has widespread usage especially in the Arithmetic module.

"TryGetConstText" is able to receive a line of text with "to-be-replaced" entries and a list of replacements (variables), as well as to change the whole "to-be-replaced" entries with the corresponding entries in the list. That means that a different line of text will always be provided, based on the variables' value at the moment of replacement.

Figure 3:
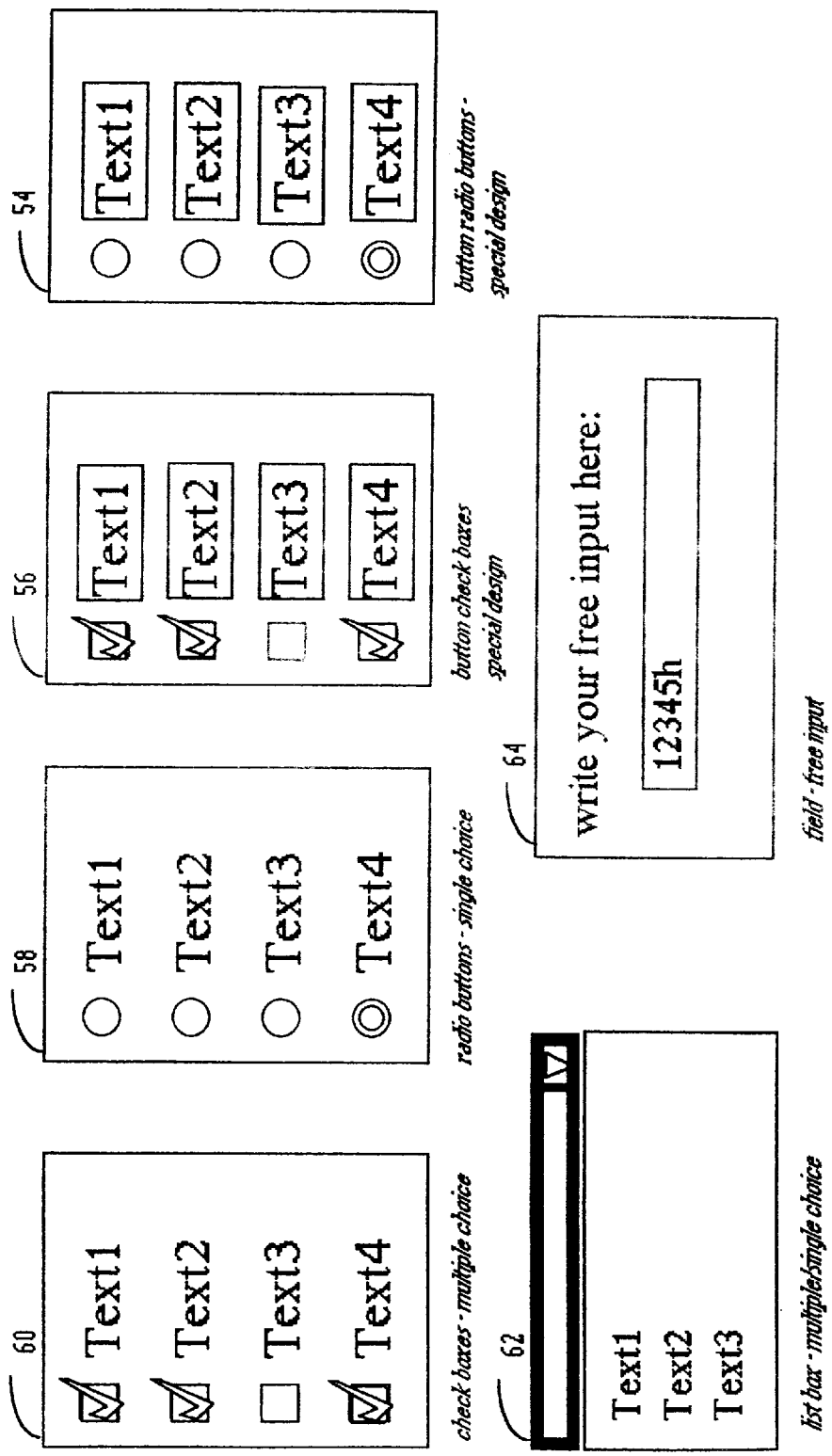
FIG. 3 is a schematic block diagram of illustrative GUI components of the present invention.

FIG. 3 is a schematic block diagram of the E-Shop of the present invention. The e-shop of the present invention is a software package which consists of one or several files (depending on the VSD) with the following components: configuration (internal or external to the rule base); a rule base; topic definitions and questions (prompts) to the user, which can then be interpreted according to the rule base. For example, the query might state "What kind of diamond are you looking for?" to the user. Possible answers to the question (in the case of multi-optional input such as menu) are found in the set {One carat, Below on carat, Over one carat}. A number of different input format styles are possible, such as free input (Block 64) or "menu like" input. The output styles include radio (Block 58), check-box (Block 60), list box (Block 62), button-checkbox (Block 56), and optionally button-radio (Block 54). Furthermore, multimedia references, including pictures, animation, sound, etc., can be optionally provided.

A "negotiation text" to be used in "offering alternatives" is optionally provided. For instance "Would you agree to compromise on the size of the stone and settle for "(One carat, 2 carat or any other attribute the current rule requires) ". See "offering alternatives" section below for more details. In addition, a recommendation text—for example "This "fancy" diamond with the size of 67 carats and the price of 100000000 U.S. Dollars is the best diamond we can offer you". Or—"I recommend 'imaginary car manufacturer product 1'. It's a safe, fast car which is ideal for family rides, business . . . plus, if you'll buy it before 4.6.1998 (date) I guarantee you a 78% discount!".

In addition, a multimedia reference can be presented to the user. The reference is a picture in an HTML accepted format to be used in the "Shopping Smart" function icon (optional—See "Shopping Smart" section below).

Both of the products and topics may be constructed in a database. If the VSD chose to put these topics, products or both of them into a database, the rule looks different.

In this case, instead of the usual "if X=Y and C=F and . . . then P" where all the topics X, C, . . . and the product P reside in a file written in the SL language, the condition (or the result if a product) of the rule will contain the following: a reference to an external file which is the name of the file; and the index of the entry corresponding to the topic/product.

The format is "db(<File Name>, <Entry's index>)".

This allows better maintenance and flexibility of the system: for example, the VSD may construct a few different databases and merely change the references to them to facilitate different sessions for difference types of users. See the section about the "Detection Engine" below for more details.

Instead of their contents as described above, the topics and the products may contain nothing but an HTML reference or a link to a specified URL.

Another issue that is included in the e-shop is the Business strategies supported by the SEU, which is contained in a business strategy unit (not shown) within the SEU.

The Human strategy tells the SEU to work in a human-like, full interactive mode. Once a product recommendation can be made, it is given immediately along with the purchasing offer with no delay. The user is asked various questions followed immediately by the appropriate answer. This creates an illusion of a real, human conversation.

It should be noted that the output of the question does not depend on the (physical) position of the rule in the rule base. The "lookAhead" (block 30) mechanism is responsible for the correct processing of the rules and for providing answers immediately after the corresponding questions.

In the Cruiser strategy, the SEU gathers all product recommendations and purchasing suggestions and outputs them all on the user's departure from a current department/session. The user sees many questions and comments without getting any answers to them. The user will be "cruising" through the current department, responding the questions the SEU finds necessary to ask. At the end, when and only when all the rules in the current department are processed, the user receives a list with all the answers and/or product recommendations collected thoughout the time in the current department.

The Quick strategy stops the investigation process after reaching the first product, or optionally and preferably recommends all possible products based on the existing information provided by the user. Naturally, the answers and purchasing offers are produced at the end of a department/session. The user is asked as few questions as possible, and after the SEU finds a product recommendation it stops the investigation. From that point and on, the SEU processes every rule in the current department trying to reach another product recommendation without asking anymore questions. The user gets a list of the product answers gathered by the SEU, ending the session in the current department.

Rules linkage and Variables: The VSD may want to operate a rule only if a certain "flag" is on or a specific circumstance(s) occur(s) (e.g. product "X" was purchased or not) or let the rules add information (e.g. if the eyes of the child are blue and the color of his hair is blond). The SEU knows how to deal with such techniques because it treats all sorts of information identically, such that the storage of information in the memory is done by the same patterns and thus is stored in the same memory zone.

Variables defined as a pseudo-topics do not contain a description. Thus, the SEU does put them to the virtual memory, along with their internally received values, but no output (questions) is involved during the process.

The Interface to the SEU is the unit for communication between the user and the main procedure of Sales Engine Unit (SEU)—"EngineCore" (FIG. 2, block 42) through some Communication Environment (CE). Examples of CE implementations are CGI, ISAPI, Console, GUI of Windows and other communication technologies and interfaces which can provide the connection of the user to the SEU.

The Interface unit reacts with the SEU unit on one hand and the server on the other hand using 3 routines: "WebMain"—calls the "EngineCore" (FIG. 2, block 42) routine which launches the main routine of the engine, "WebLoad"—loads the e-shop file, "WebInit"—reads the configuration file which contains definitions for the communication environment and initializes the server.

Figure 4:
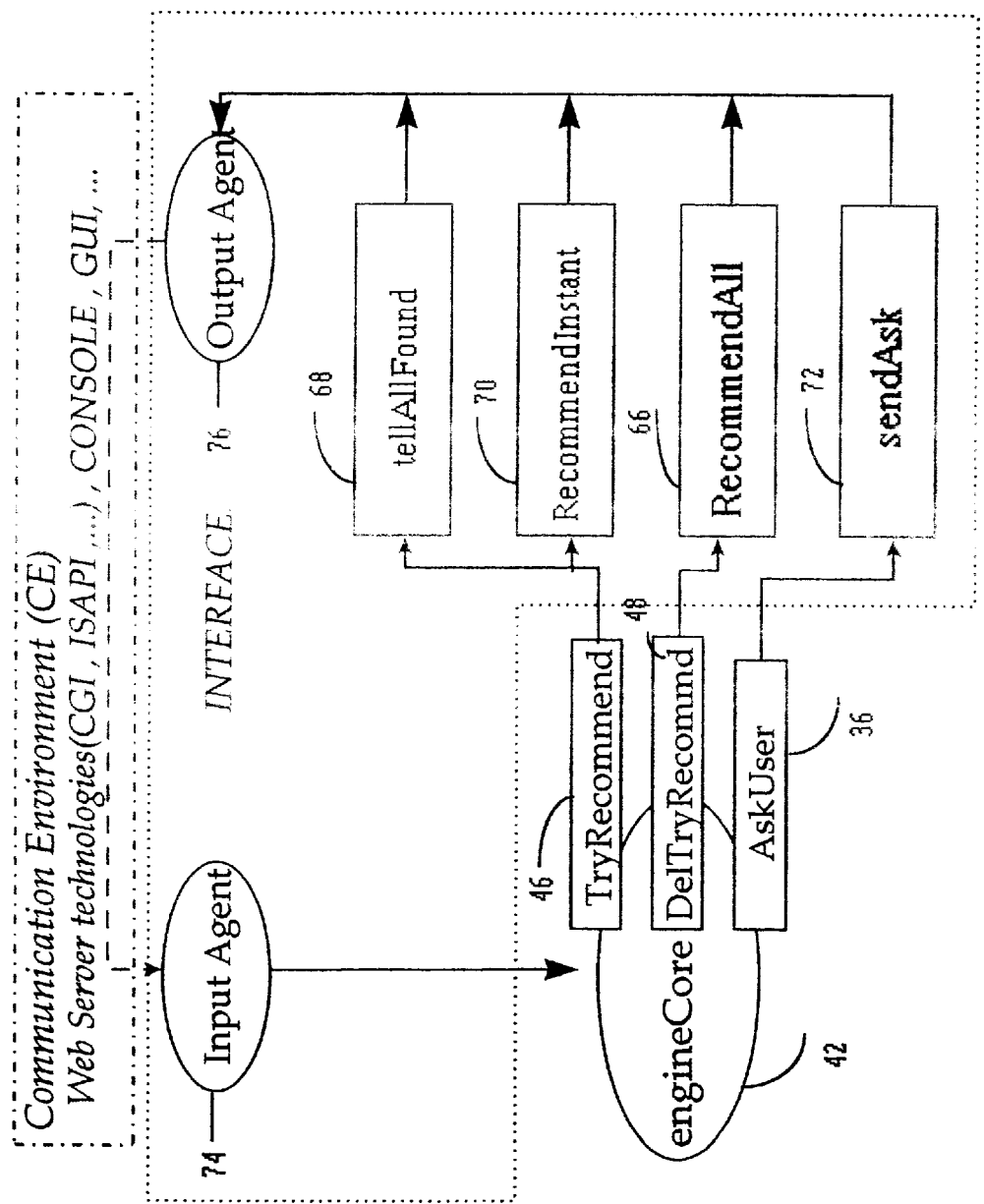
FIG. 4 is a schematic block diagram of an illustrative engine core interface according to the present invention.

The SEU, on the other hand, uses several functions from the Interface unit for input and output (this is how the SEU interacts with the user) as shown in FIG. 4. The "AskUser" procedure (which resides in the SEU unit) sends questions to the user. It is configurable to send all questions one by one or several questions together. "AskUser" then calls the "SendAsk" (Block 72) procedure which resides in the "Interface", to perform the actual output.

In order to output an answer (or a number of answers), the procedures "RecommendInstant" (Block 70) or "RecommendAll" (Block 66) respectively are invoked. The procedure "TellAllFound" (Block 68) is launched when the last message should be sent.

When one of the mentioned procedures of the "Interface" unit is executed, it calls the "OutputAgent" (Block 76) that contacts the server and tells the server to send the "on the fly" constructed HTML page to the Internet. The method for contacting the server differs according to the CE software being used.

However, "TryRecommend" (Block 46) acts differently based on the type of the business strategy that the VSD chose. If the business strategy is "human", "TryRecommend" (Block 46) will call the "RecommendInstant" (FIG. 4, Block 70). In case of any other business strategy it will save the recommendations in the virtual memory. "FireRule" will call the "DelTryRecommd" (Block 48) later, to construct a list of the recommendations saved previously. "DelTryRecommd" (Block 48) will call "RecommendAll" (Block 66) with the constructed list passed as a parameter in order to complete the output (further information regarding this process can be found in the "Business strategies supported by the SEU" section).

The user's responses to the SEU's queries are always processed by the "InputAgent" (Block 74) which translates the data received from the user (in the HTML format) to a language that the SEU understands and saves it into the virtual memory for further usage by "EngineCore" (Block 42).

The components of this system operate as follows:
The "RecommendInstant" (Block 70) procedure builds an answer page in HTML format. To build the header of the HTML page, it calls "BuildHead" procedure.

The header consists of the following information: the name of the CGI program; reference to font and background; a heading (such as "Welcome to Our Sit Online" or other messages).

The answer itself resides in the HTML body. The answer may be a product recommendation plus purchasing offer or some other kind of answer. Every kind of answer includes answer text. All answers which are product recommendations have "price" and "currency" variables in their description. While such type of answer being built, the "price" information and the 'button-checkbox' pair named "purchase" are being attached to the dynamically built HTML page (supported by the "Purchase Mechanism" (Block 50)). It is possible for the user to purchase the product immediately by pressing the button or clicking the checkbox. The button and the checkbox are together an object that makes it possible to control the button by the checkbox and vice versa.

The mark within the checkbox and the change of the button's label from "purchase" to "purchased" (or any other description desired) mean that the product is marked as purchased. According to such marks, a list of products can be built at the end of purchasing.

The "Continue" button closes the answer page in order to proceed with the SEU's session.

The header as well as the footer are constant for the entire session, but the HTML representation of the answers described above is built "on the fly" according to answer's type and contents.

The "RecommendAll" (block 66) procedure builds an HTML page that consists of number of different answers.

Given a list of answers as the only parameter, it generates the same HTML header as the previous function does. After that, all the answers are output using the same algorithm "RecommendInstant" (Block 70). The user can choose what products to buy by pressing the "purchase" button (supported by the "Purchase Mechanism" (FIG. 2, Block 50)).

Note that there is a separate button for each and every product in this page. The "Continue" button closes the page to allow the session to continue.

The "TellAllFound" (Block 68) procedure is only invoked at the end of the session to say "Good-bye" and to thank the user for the visit. This procedure sends the previously prepared HTML page—"Completing form".

The "SendAsk" (Block 72) procedure builds different types of HTML pages for user questions and answers.

All questions, which are stored in memory, have definition variables such as "askStyle" and "menuStyle". "AskStyle" specifies the form of the question—a menu or a field.

"AskStyle" is always associated with a question. If the question requires a 'yes' or 'no' answer—'yesno' style is used.

"MenuStyle" defines the way the menu appears, such as radioboxes, checkboxes, "buttonRadio" (pair button and radio) and "buttonCheckbox" (a button and a checkbox pair). The styles "buttonRadio" and "buttonCheckbox" are a radio or a checkbox controlled by a button. They make the usage of the menu easier and more comfortable because of the size of the button, so that the button is naturally bigger and easier to contact by mouse then a radio or a checkbox input.

Like the other pages the output is closed by the "Continue" button.

All the described procedures remain unchanged for ISAPI as well as other types of CE's operating under the Internet and using HTTP protocol.

The SEU allows the virtual sales representative to release comments throughout the session through a comment unit (not shown).

The comment structure is implemented as a condition that always succeeds. In the rule base it is planted in a rule using any one of the following keywords:

Humor (a set of humoristic remarks, or humoristic in nature phrases to output to the user. All are combined in a special database for this purpose).

Day2day (a set of slang language remarks, called day2day since it is designed to simulate simple and common daily language, which can also be described as a "pleasantry". All are combined in a special database for this purpose).

Personal_preference (to specify the sales representative's personal preference remarks, designed to help in convincing the customer regarding a decision. All these remarks (comments) are combined in a special database for this purpose).

Any other possible idea combined in its special database.

The comment is invoked by specifying the type of the comment followed by "=" and the number of the comment in the external library file which holds all the comments database. The library consists, in fact, of a number of different databases, one for each type of comments. This is used to supply the user with ready made comments yet giving the option to add new comments.

The reference is made by giving the position of the comment in the database.

In the processing of this rule, the SEU asks about all the Attribute Value pairs in the rule. If all the conditions are proven, the SEU refers one of the databases in the library and outputs the appropriate position entry in that database instead of asking a question.

The comments may be used freely throughout the system, exactly like conditions. Their position inside the rules will ensure that they are output only if all the conditions before them are fulfilled, which means that the VSD may create very meaningful comments inside the rules, gives the entire system even more intellectual capabilities.

Because the SEU treats the comments by simply generating output without receiving any information by this output (it is not a question) the comment is a condition that is always TRUE. Thus, after the comment is output, the SEU continues to the next condition in the rule.

As was said before, the library might contain comments such as jokes, work playing, cynical remarks, etc. (the "humor" section); shallow remarks such as "It is such a lovely day" or "Really? Do you live in Israel[ It is such a beautiful country" and comments that are meant to convince the user that he/she should buy the product: "You know, I also bought a "brand x" screen 2 years ago and it never was broken!" or "When my child was 8 years old I bought her a teddy bear just like that one and she always told me that it was the most beautiful present she ever received".

Figure 5:
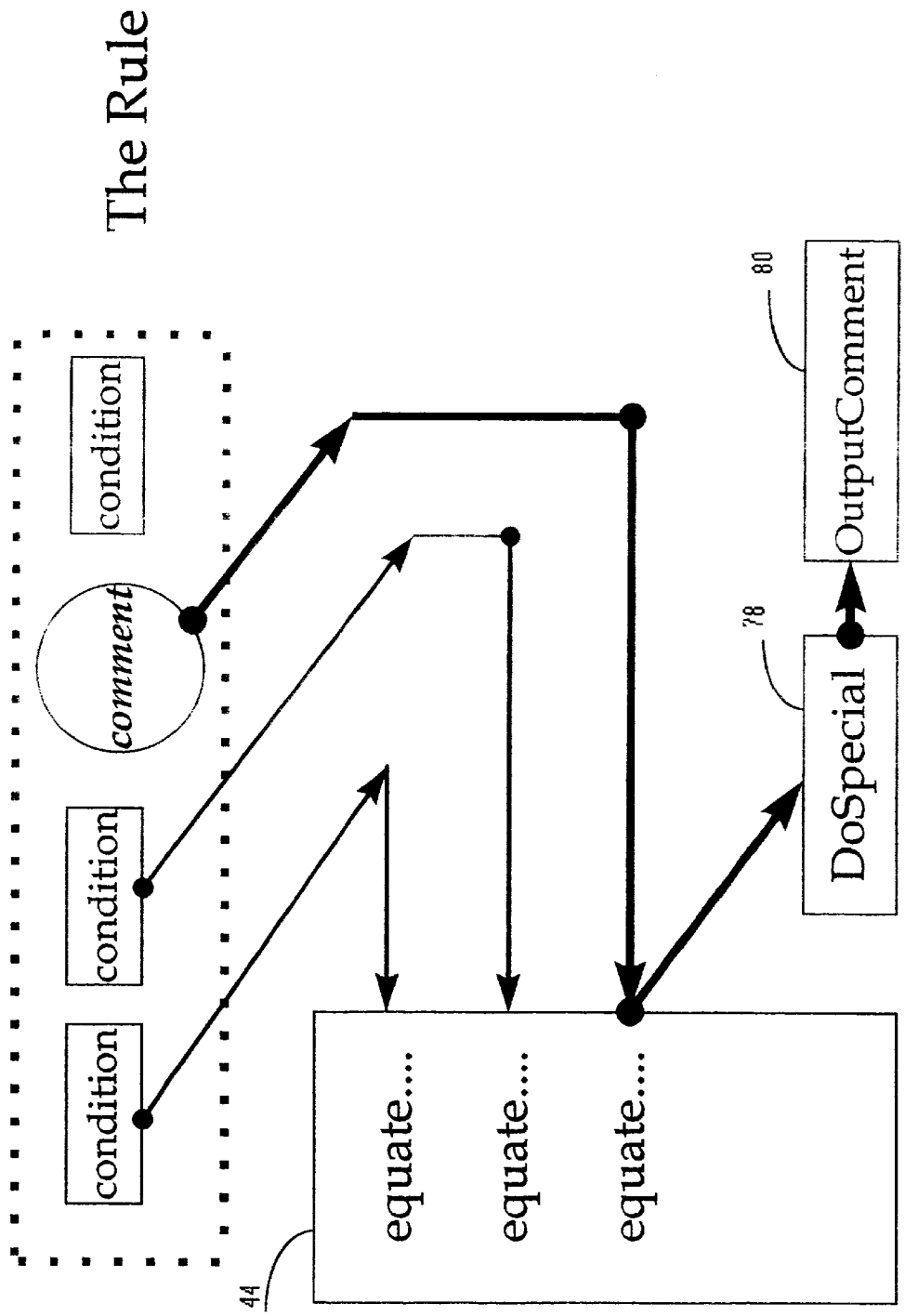
FIG. 5 is a schematic block diagram of an illustrative comments processing module according to the present invention.

As shown in FIG. 5, the comments software module operates as follows. Because the comment is a part of a rule, it is encountered by "Equate" (block 44) as it processes a rule. Thus, each time "Equate" (block 44) handles with the operator "=" it checks to see if the left side of the condition is a comment keyword, by calling "IsSpecial". If it is a comment it invokes the "DoSpecial" mechanism which deals with that special event.

This IsSpecial routine takes the name of the query as an argument and compares it to each of the keywords described above. In case of any of the keywords matches the argument this function returns TRUE—else it returns FALSE.

The DoSpecial (Block 78) is the mechanism that outputs the comment. Once the type of the comment is known, the database entry that is specified in the rule is examined (the number is passed as an argument to this function). It calls "OutputComment" (Block 80) in the interface shell to actually send the comment to the user.

Figure 6:
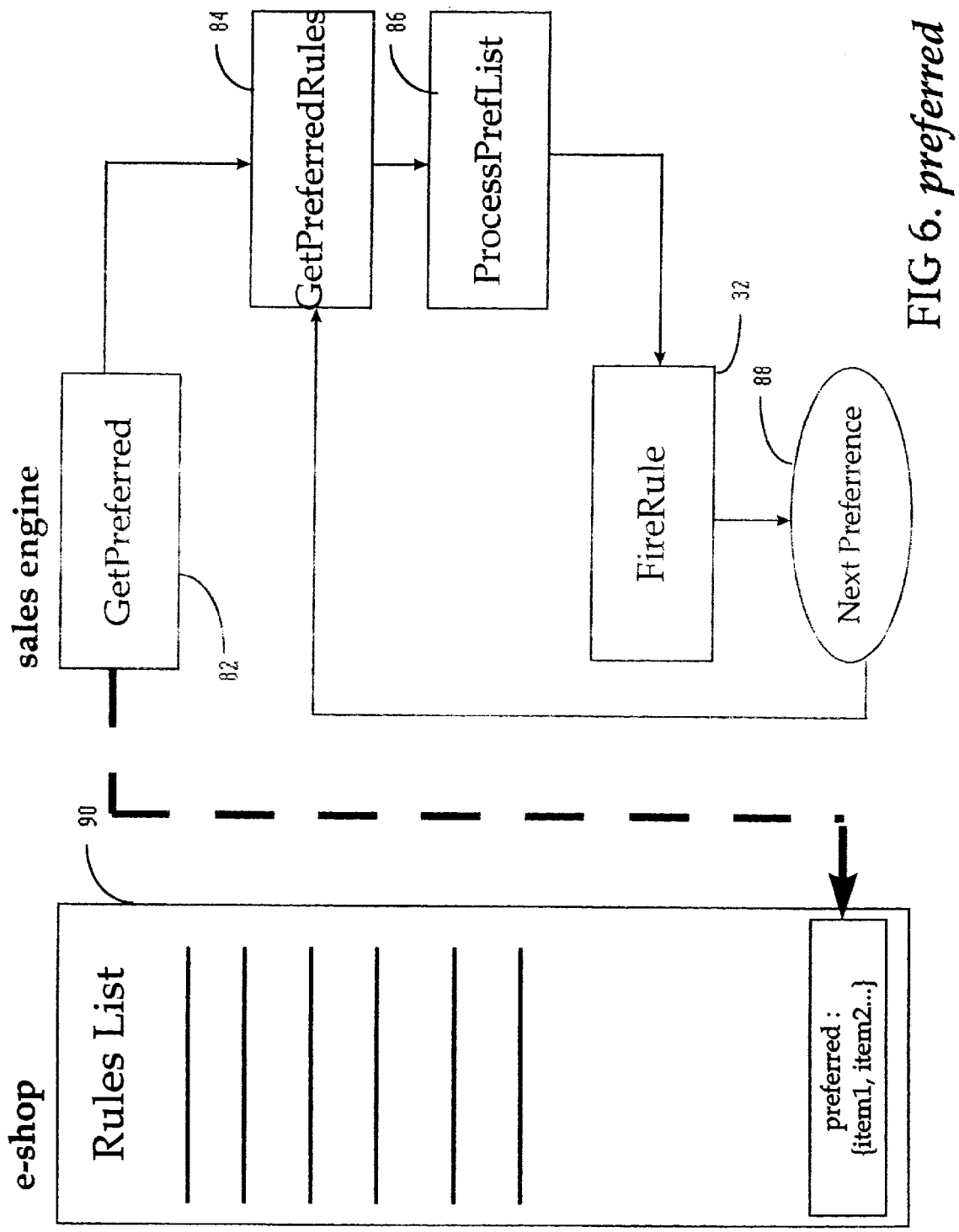
FIG. 6 is a schematic block diagram of an illustrative preferences module according to the present invention.

The Preferred mechanism is a handy tool that can be used by the sales representative to increase sales. This mechanism allows the system designer to specify which products have top priority for sale, and these products are pushed to the potential client first. As shown in FIG. 6, the system designer must specify a list of product names to be taken as a top selling priority. The system then processes the list and tries to direct the user to those products by asking guiding questions. This feature can also be used to specify a pre-set order of how products shall be sold (kind of user-defined grading on each product).

If the work "preferred" is in the Rules List (Block 90), followed by a list of preferred products, every rule is obtained that includes those preferences and placed in a list, and "FireRule" (FIG. 6, 2, block 32) is called to process the list. After that the rest of the processing is as described before—i.e. invoke "FireRule" (block 32)—from the start of the Rules List (FIG. 6, Block 90).

The "GetPreferred" (Block 82) function takes the preferences list from the system as written in the file. Each item on the list is processed and the following steps are performed:

Walk through the Rules List (Block 90) using "GetPreferredRules" (Block 84) gathering pointers (positions in the list) of every rule that leads to the preference.

Create a small, temporary list of all rules which are found.

Pass the list to "FireRule" (FIG. 6, 2, block 32) for the rest of the process. After "FireRule" (block 32) is finished, advance to the Next Preference (FIG. 6, Block 88) recursively, until the list of preferences is exhausted.

"ProcessPrefList" (FIG. 6, Block 86)" is also responsible for handling the tracing marker. Each time "FireRule" (FIG. 2, block 32) is exited, the marker is returned to the first entry of the new rules list for processing (rules for the next preference).

The "GetPreferredRules" (FIG. 6, Block 84) routine gets and processes the rules for a current preference.

First, all the rules that lead to the product specified by the preference are gathered using "GetPreferred" (FIG. 6, Block 82).

"GetPreferred" (Block 82) uses the active memory to save the positions of the rules that are relevant to the current preference. When this is finished (all rules have been processed), a list of those numbers is made using "GetPreferredRules" (Block 84). After building the list, "GetPreferredRules" (Block 84) also processes it by a call to "ProcessPrefList" (FIG. 6, Block 86).

The "GetPreferred" (FIG. 6, Block 82) routine looks for a rule that has the preference in its results. "GetPreferred" (FIG. 6, Block 82) is an implementation of a simple string search which tries to find the string specified by the preference in the results of a rule.

If a rule is found leading to the preference, the position is saved in the memory. The search is repeated for each and every rule until the list of the rules is exhausted.

The "ProcessPrefList" (FIG. 6, Block 86) procedure also handles the following two tasks. First, it scans the memory in search of previously saved rules positions. Each time it finds one it retrieves the rule pointed to by the position from the original rules list. All the rules it finds are appended to a temporary list. Second, the temporary list constructed previously is passed as an argument for "FireRule" (FIG. 6, 2, block 32) to process.

Figure 7:
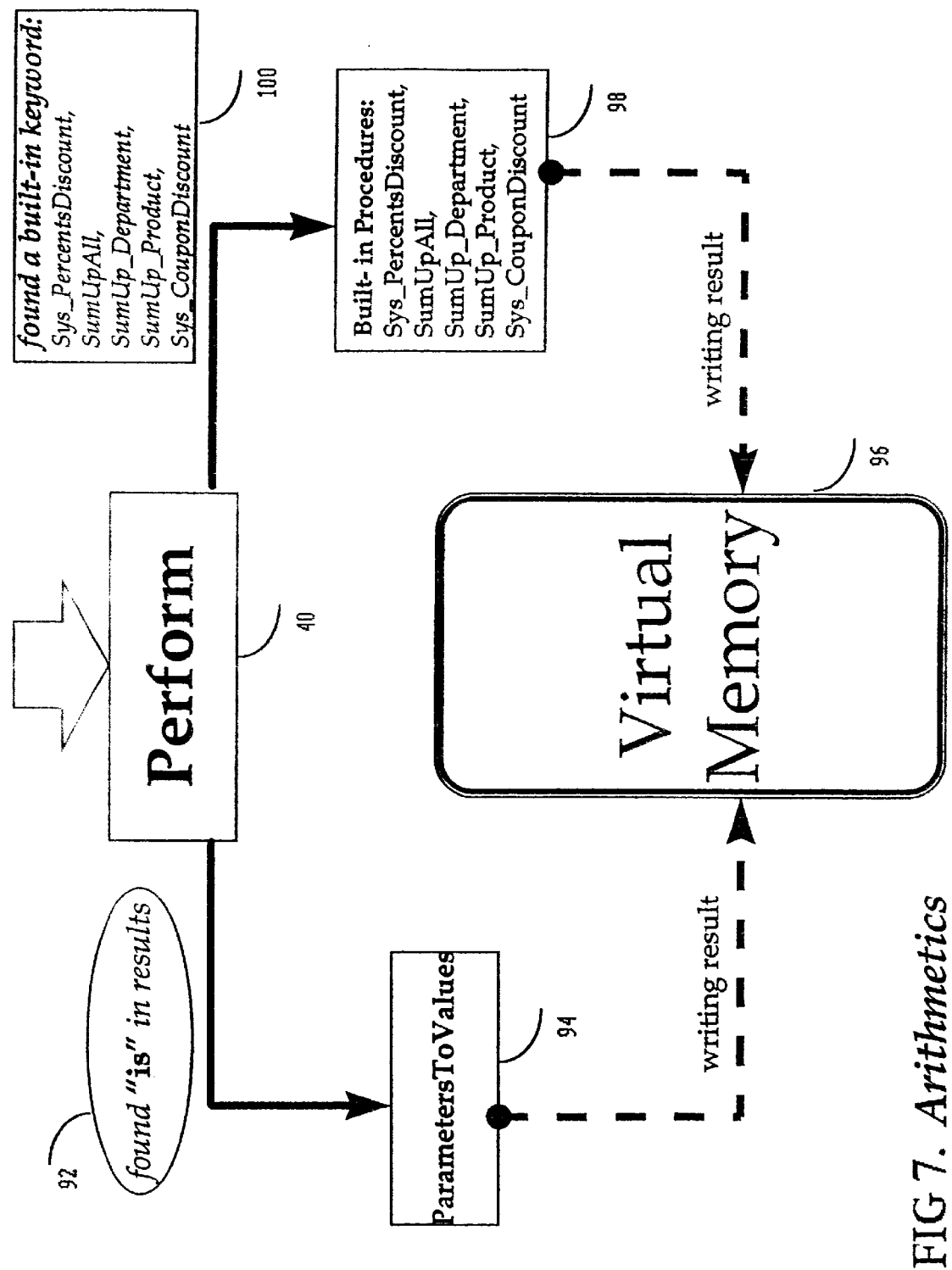
FIG. 7 is a schematic block diagram of an illustrative arithmetic module according to the present invention.

There are two ways to implement arithmetic evaluation in the system, as shown in FIG. 7:

For the first method, the parser allows the VSD to construct formulas containing variables. The variables are the topics which carry a numeric type information (such as age, price, amount . . . ). The parser works with the standard arithmetic signs (+, −, *, (,), ) plus the operator "percents_of".

The second method, Built in arithmetic functions, allows the user to: sum up all of the purchased products in the session ("SumUpAll" (FIG. 7, Block 98); sum up the purchased products in a current department ("SumUpDepartment" (FIG. 7, Block 98)); sum up all of the products of a given type ("SumUpProduct" (FIG. 7, Block 98)); give a percentage discount ("Sys_PercentsDiscount" (FIG. 7, Block 98)); and give a coupon discount ("Sys_CouponDiscount" (FIG. 7, Block 98)).

Both types of arithmetic are called from within "perform" (FIG. 2, block 40) and thus are allowed only in the results of a rule.

The Parser Structure: This kind of arithmetic is identified by the "perform" (block 40) by the "is" sign (FIG. 7, Block 92) between the variable and the formula instead of the "=" sign usually appearing between the topic/keyword and the value in the jurisdiction of "perform" (block 40)

The operation of the module is as follows. "Parameters To Values" (FIG. 7, Block 94) is the heart of the parser. "ParametersToValues" (Block 94) is given the formula written by the VSD and the variable to the left of the formula (the variable to store the result of the evaluation in). First, the routine breaks the formula string to tokens and constructing a list of it. Afterwards the operator "percents_of" is found and converted to a standard arithmetic expression (X*Y/100). Then, another list is constructed using the following guidelines.

If the token is a number or a standard symbol (+, −, *, \, (,)), add it to the list with no changes. If the token is a variable find the value of the variable. If it's a topic described in the system file and has not been asked yet, call "Ask User" (FIG. 2, block 36) to ask the question. If it's not a topic and no value is present in the virtual memory, assume its value is 0.

This routine uses the memory to retrieve the values for the variables. It generates questions output only in the case a value for a current topic can not be found in the memory.

After the original list is fully processed and a new one created (containing only numbers and standard operators) the formula is evaluated by stepping through the created list.

The built-in functions are invoked whenever the "perform" (FIG. 2, block 40) identifies the respective keywords (FIG. 7, Block 100) after the "=" sign in the results of the rule. The software module works as follows.

The "SumUpAll" (FIG. 7, Block 98) routine works with an accumulator (previously initialized to zero) and the working memory directly to retrieve every product registered under the handle "purchased". After a product is retrieved, this routine looks it up in the system file and finds its price. The prices are summed automatically by the accumulator.

Given a department's name, the "SumUpDepartment" (FIG. 7, Block 98). routine works like "SumUpAll" (FIG. 7, Block 98) except it retrieves from the memory only the "purchased" handle that belongs to the department specified.

Given a product's type which must be a "variable" that the VSD uses to assign products to, the "SumUpProduct" (FIG. 7, Block 98) routine retrieves all information about products which were purchased and which are declared in the system as connected to the product's type. For example, if the following rules exist in the rule base: "if size=big and speed=high then computer=first example, if operating_system=unix then computer=work_station and computer=second example" and the user decided to purchase the first example and the second example, then by invoking the "SumUpProduct" (FIG. 7, Block 98) with the "computer" given as parameter, the prices are summed.

The connection is established in the system file using the type of a product, the "=" sign and the actual name of the product.

The "Sys_PercentsDiscount" (FIG. 7, Block 98) routine is given the number of percents (15, 17, 22 . . . ) and the sum to deduct a discount from.

Each of the arguments may be an actual number, a value or a formula. This routine will calculate the actual sum of the discount and reduce it from the original sum. The result is saved in another variable given especially for this purpose by the VSD.

The "Sys_Coupon Discount" (FIG. 7, Block 98) is used in a case the VSD wishes to work with "coupon", thus this routine takes as arguments the sum to perform the discount on and the value of the coupon. Again, each of these parameters may be a number, a formula or a variable.

The routine performs a simple reduction of the "coupon" from the original sum given.

All arithmetic functions use the memory (FIG. 7, Block 96) for writing and the result of their invocation is saved with the variables they store the results in. This information is saved in the same form used to save the information gathered from the user or "rule linkage" and may be used later in the rules or in the detection engine.

Departments (see FIG. 8) are used to help the Virtual Shop Designer (VSD) to create an actual store, logically delimited by subjects.

Each department consists of: the "startDep" keyword, which is used to mark the beginning of the department, the department's name; configuration to whether or not to initiate the negotiation process (negotiation=on or off); and a message list with optional messages the VSD wishes to define. If no messages are defined that list is empty by default. In addition, there is a list of rules which are local to the current department.

Note: There is a possibility to pass along information obtained in one department to the other department. For example: if a product named "X" was purchased in one department, such information can be used in another department, using "rules linkage".

Figure 8:
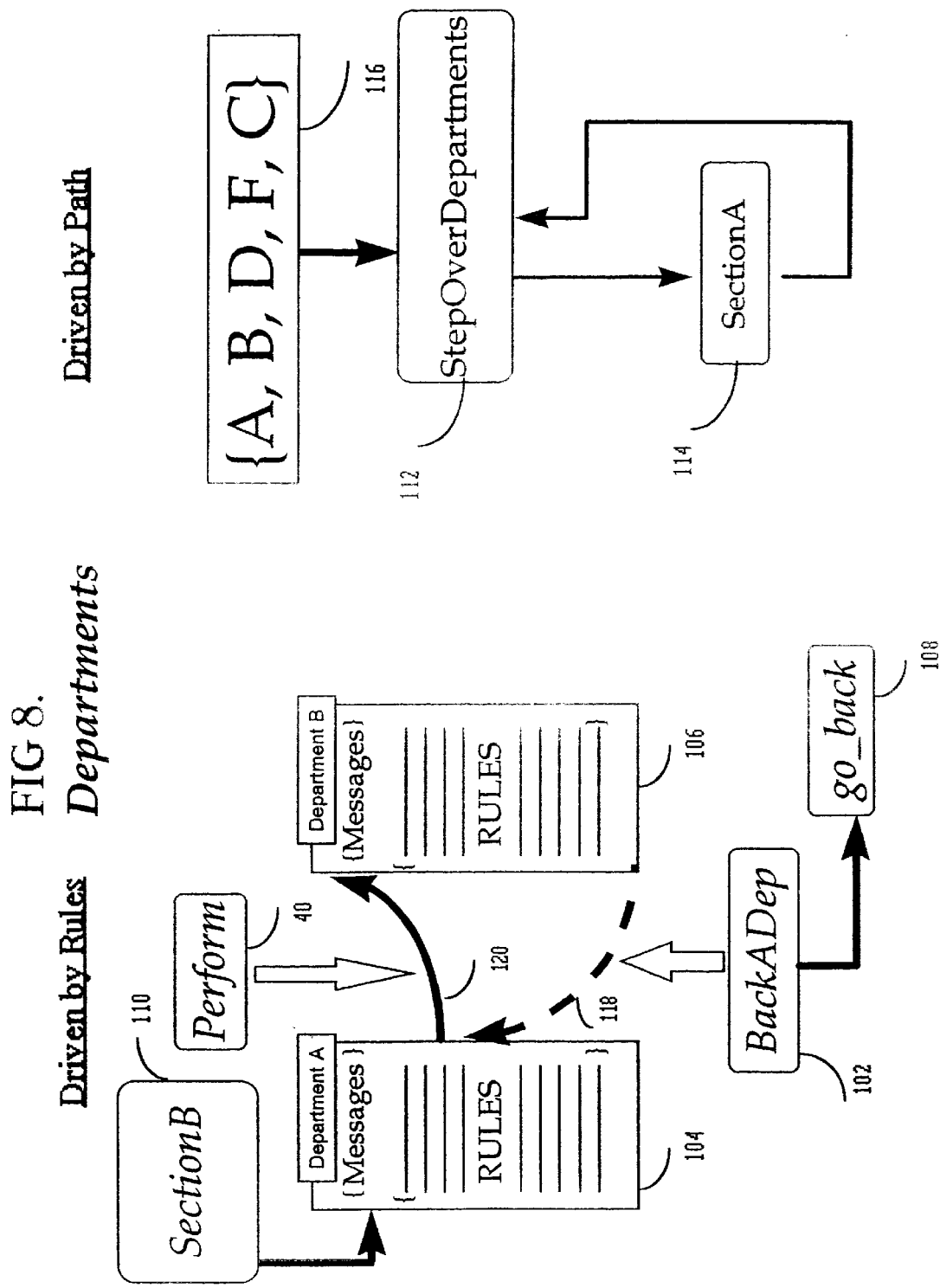
FIG. 8 is a schematic block diagram of an illustrative system of departments according to the present invention.
Figure 9:
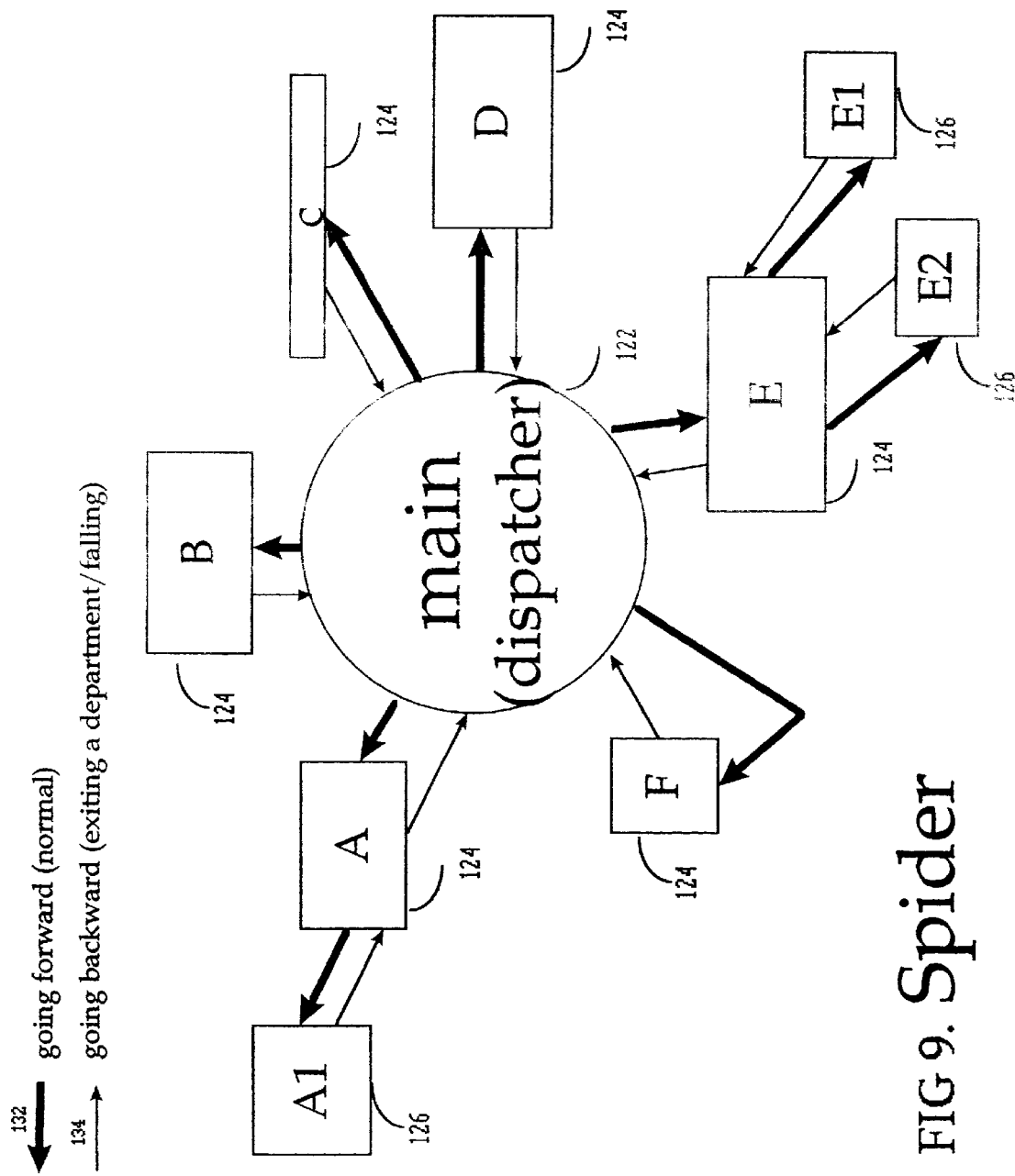
FIG. 9 shows a first embodiment of the system of departments according to the present invention.

There are 4 ways to design and manage the departments (see FIGS. 9, 10, 11, 12). The first way to manage the departments is "Spider" (FIG. 9). In this architecture there is one main module (FIG. 9, Block 122) which functions like a dispatcher, guiding the system to a different departments (FIG. 9, Block 124) with a rule derived technology (FIG. 9, Arrow 132). After a department is finished (the rules list is exhausted), the program returns immediately to the previous invoked department (FIG. 9, Arrow 134). See the "Departments section" and corresponding FIG. 8 for a description of the process of going to a department and returning from one department to another. The departments (Block(s) 124) represent different rules content according to the VSD's design. The departments may contain links to other departments (FIG. 9, Block(s) 126) which do not have an entrance from the main department (Block 122).

This architecture produces a smart, sophisticated system giving a variety of options for touring the departments in an intelligent way. (For example: a client never enters the negotiation module if the client did not buy anything previously or did not get product advice at any one of the departments).

Figure 10:
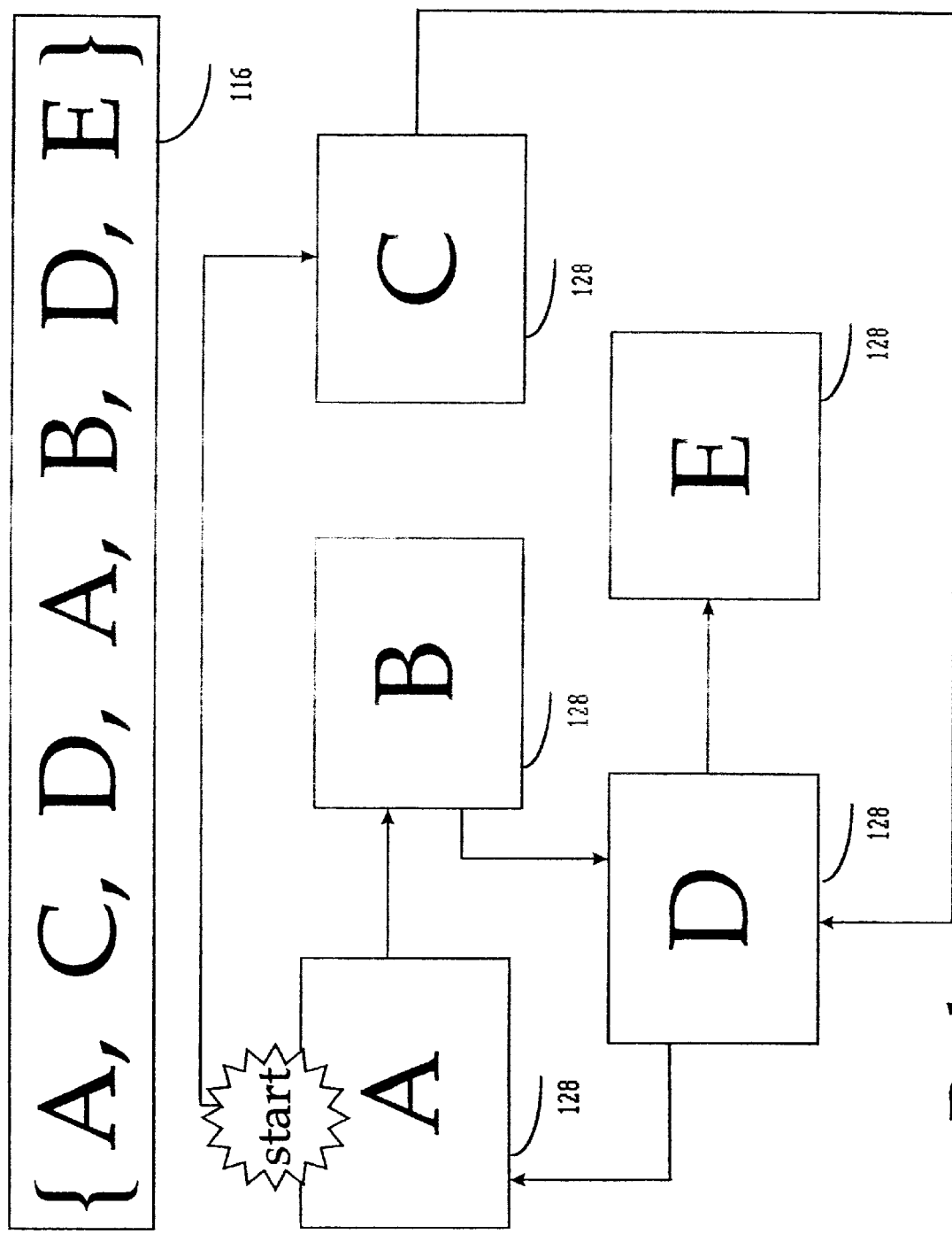
FIG. 10 shows a second embodiment of the system of departments according to the present invention.

The second way to manage the departments is "Path" (FIG. 10). This type of e-shop has several departments (FIG. 10, Block 128) which are not linked by rules. The "tour" is given by a path (FIG. 10, Block 116) with the departments' names. Each time a department is finished (Block(s) 128), regardless of whether or not an answer was given to or from the user, the next department is entered (Block(s) 128) as written on the path. This type of an e-shop is easier to build. In this type of technology the departments' messages can be more logical because the department (Block(s) 128) being left is known, as is the department (Block(s) 128) being entered. So that if, for example, the user enters the necklace department after visiting the department of earrings, an entrance message can be featured of the form "What are earrings without a matching necklace? Welcome to the necklace department!".

Because there is no possibility to an automatically "fall back" or return from one department (Block(s) 128) to another, this approach is both predetermined and controlled, thus reducing the moments where the system's behavior is erroneous or illogical.

Figure 11:
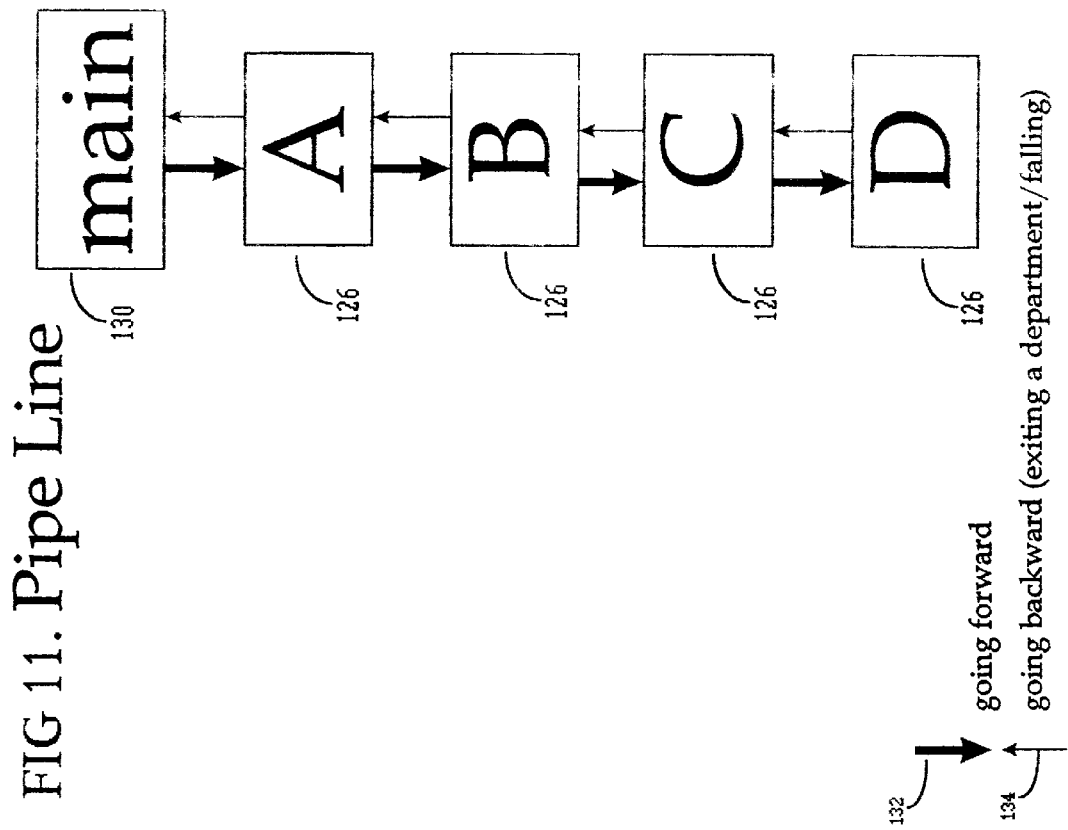
FIG. 11 shows a third embodiment of the system of departments according to the present invention.

The third way to manage the departments is "Pipe Line" (FIG. 11). In this approach there are several departments (FIG. 11, Block 126) with no dispatching mechanism. The logic here is very similar to the logic of the path, only here there must be a "main" department (FIG. 11, Block 130) and the other departments (FIG. 10, Block 126) are linked by rules (FIG. 10, Arrow 132). There is also the possibility of returning to a previous department. As an example, after department A (FIG. 11, Block 126) is finished, a return is made to the previous department, the "main" department (block 130). In order to prevent problems from arising, the "pipe line" approach is taken only in a case where the departments (FIG. 10, Block 126) connected by this architecture are logically dependent (one department's products are a necessity for the other department's products). For example consider the following pipe lines:

Screens→Screen protectors→A cable for the screen protectors

A VCR→A remote control for the VCR→A case for the remote control

A table→A tablecloth for the table→The embroidery for the tablecloth

Figure 12:
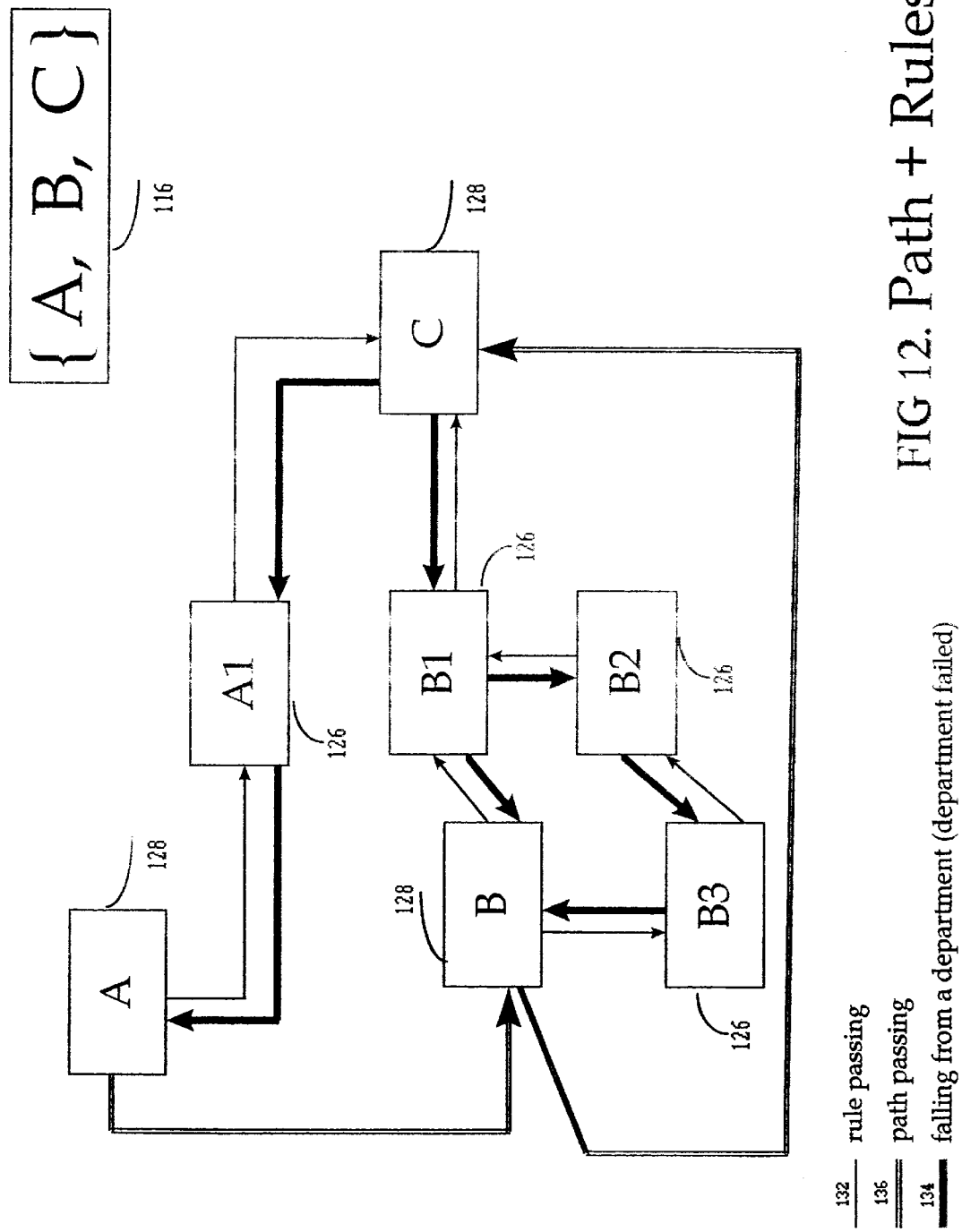
FIG. 12 shows a fourth embodiment of the system of departments according to the present invention.

The fourth way to manage the departments is "Path+Rules" FIG. 12): This is a combination of two different technologies: the pipe line-derived technology (FIG. 11) and the pre-set path (FIG. 10) derived technology. It allows paths to be created (FIG. 12, Block 116), such that some departments are connected by a path only (FIG. 12 Arrow 136) (no rules lead from one department to the other) (FIG. 12, Block 128). For other departments, spontaneous linkage based on rules is allowed (FIG. 12, Arrow 132) which means that the departments linked by a path (FIG. 12, Block 128, Arrow 136) can refer to other departments that are not part of the path (FIG. 12, Block 126). Those other departments (Block 126) are linked to the "path-driven" departments (Block 128, Arrow 136) with rules (Arrow 132). This gives a more intelligent system than the path (Block 116), giving various options for conducting the session. The "path" part (Block 116) in it guarantees that it will fall back (Arrow 134) rarely.

It is possible to combine and intermix the four ways to manage the departments in order to gain flexibility or features according to the need. In FIG. 9 there is an example of mixing the Spider with pipeline (A→A1, E→E1, E1→E2 . . . See FIG. 9, Block(s)126, 128 and Arrows 132, 134).

As shown also in FIG. 8, the routine that launches the engine, "EngineCore" (FIG. 2, block 42), determines whether it should invoke the "path" (FIG. 8, Block 116) algorithm or not by checking if the keyword "departments" is present in the VS file. If that keyword is present, a preset list of departments should be entered (Block 116) and so "StepOver Departments" (FIG. 8, Block 112) is called to process that list.

If no such list is present, "SectionB" (FIG. 8, Block 110) is invoked to process the departments.

The "StepOver Departments" (FIG. 8, Block 112) routine is used to process names of departments in the list (FIG. 8, Block 116) passed to it as an argument. It does so by calling "SectionA" (FIG. 8, Block 114) for each name. After "SectionA" (FIG. 8, Block 114) is finished processing the department, the next department in the list is considered. When the list is exhausted, the program is finished.

This routine is using the memory to retrieve any information regarding the position in the VS.

This routine is necessary due to the specification of the CGI, in that the session consists of exiting and re-entering the program. Each time "StepOverDepartments" (FIG. 8, Block 112) finds a "position marker" it passes the information consisting of current department name and the rule number in that department as an arguments to "Section A" (FIG. 8, Block 114). By default those arguments are instantiated to "main" for department name and "1" for the rule number.

The "SectionA" (FIG. 8, Block 114) was written to be called from "StepOverDepartments" (FIG. 8, Block 112). That is why it does not use the working memory for reading or writing (compare with "SectionB" (FIG. 8, Block 110) below).

In the operation of "SectionA" (Block 114), first the department's information is allocated in the VS file using "startDep". Then the departments' rules list is retrieved and passed to "ProcessRulesList" (FIG. 2, block 38) for processing. After "SectionA" (FIG. 8, Block 114) is finished, the program returns to "StepOverDepartments" (FIG. 8, Block 112) which then permits access to the next department in the list specified in the VS file. If the current department's messages list contains an "entrance" message this routine outputs the entrance message by a call to "OutputComment" (FIG. 5, Block 80).

The "SectionB" (FIG. 8, Block 110) routine is invoked in every VS design except the "path" that was described above.

It is responsible for saving the initialization of the parameters that are specified in the department, such as negotiation (on or off) and the business strategy (human, quick or cruiser), updating the trace marker for the department and outputting the entrance message for the department. Thus, it uses the working memory directly plus is passes all the necessary information about the department (rules' list, messages list, current position (rule number) and the department's name) to "ProcessRulesList" (FIG. 2, block 38).

If information was saved in the memory previously regarding the current department and position, "SectionB" (FIG. 8, Block 110) does not overwrite the information. Instead, it reads that information from the memory and pass the information along to "ProcessRulesList" (FIG. 2, block 38) as an argument. If no such information exists, "SectionB" (Block 110) looks up the rules list of the "main" department to pass along to "ProcessRulesList" (block 38) and saves that information in the memory for next time (for example of the process see FIG. 8, Block 104).

Because only one description of the department's information can be present in the memory, either "SectionB" (FIG. 8, Block 110) or "StepOverDepartments" (FIG. 8, Block 112) must clean up all descriptive information from the stack before writing any department's description to it.

The department's information consists of the 5 parts described in the beginning plus the trace marker (the number of the rule currently being processed).

The VSD may specify a department reference in the "then" part of a department rule as a result or consequence to be executed if the rule is true, by using the keyword "department" followed by the "=" sign and the name of the department. The system then performs a transition to the specified department, saving the current department's name and marker's position as a place to go back to (FIG. 8, Blocks 104, 106). When the department being entered is finished, the program goes back to the previous department without losing any information gathered previously. Such a transition is performed by one of the "Perform" (FIG. 2, block 40) routines as follows:

First, identify the department to be entered.

If the current department's messages list contains a "backInAMinute" message—output it now using "OutputComment" (FIG. 5, Block 80).

Save the current department's information with the handle "previous".

Generate a partial department's information constructed of the department's name and the position set to "1". After that, "Perform" (FIG. 2, block 40) calls the "SectionA" (FIG. 8, Block 114) or "SectionB" (FIG. 8, Block 110) to continue the construction of the department's information, based upon whether or not the keyword "departments" followed by a list of department names (FIG. 8, Block 116) is present in the VS.

Another department can also be entered with the "lookAhead" (FIG. 2, block 30) mechanism.

In that case, the status is saved under the name "lookAhead" (block 30). The meaning of this is that both "FireRule" (FIG. 2, block 32) and "FireNextRule" (FIG. 2, block 34) are moved to the new department's location.

Returning from a department to another department is relevant only for two departments linked by a rule and not a path (FIG. 8, Blocks 104, 106). When 2 departments are written in a preset list (FIG. 8, Block 116), such a return is not possible.

When department A refers to department B, the system returns to department A at the same position when the department was exited (FIG. 8, Blocks 104, 106). For this, 2 routines are used:

The "BackADep" (FIG. 8, block 102) routine is called from the third part of "ProcessRulesList" (FIG. 2, block 38). Once the end of a department is reached, this routine does the following:

Output the appropriate message for the department, passing the name and messages list to "OutputTheRightMessage" (FIG. 16, Block 184).

Invoke the "Go_Back" (FIG. 8, Block 108) routine to perform the exchange between the current and the "previous" department info in the working memory.

Retrieve the current department information (after the exchange).

Invoke "FireRule" (block 32) to process the rest of the rules in the department.

Unlike the move to another department done according to an appropriate rule (which means it is written explicitly in the VS), the process of returning back from a department is done automatically when the department is finished, such that the rules list is exhausted. Thus, this process is marked with a dashsed arrow (FIG. 8, Arrow 118), unlike the process of moving to another department which is marked by a solid arrow (FIG. 8, Arrow 120).

The "Go_Back" (FIG. 8, Block 108) function does a pure memory manipulation and thus produces no visible output.

First the memory is read to find the previous department's information using the handle "previous".

"Go_Back" (FIG. 8, Block 108) also updates the trace marker according to the status when the department was left.

If it is "lookAhead" (FIG. 2, block 30) status, then the program returns to the same rule. If it is not, the program returns to the rule succeeding that rule.

The current department information including all tracing signs, such as "was" is totally abolished. Instead, the "new" department information is given, which was the same information received under the handle "previous".

It is also up to "Go_Back" (FIG. 8, Block 108) to free the "previous" handle regarding the department returned to.

"Go_Back" (FIG. 8, Block 108) returns no value to the calling routine assuming all the necessary information is read from the memory.

The mechanism for offering alternatives attempts to bargain with the potential client and tries to make a sale when the user visited a department and got no answer, meaning that no products were available for this kind of demand.

The system always remembers the questions it asked and the responses given by the user.

In a case no product is available for a client according to the client request, the mechanism attempts to persuade the client to compromise about one or more topics to attempt to complete a sale of some product.

Preferably, the mechanism can be turned on and off from within each department.

The maximum number of attributes that differ from the original request is defined by the VSD.

The mechanism naturally integrates with the normal flow of the session.

The mechanism quits after a certain amount of questions or after a product is purchased.

The "line"s consist of the number of the rule and a list of conditions—flags pairs where the flags are 0—for a condition that was not fulfilled and 1 for conditions that were fulfilled.

The "goodLines" on the other hand, contain only a list of conditions that were not fulfilled (the conditions with the 0 flags), the number of the rule and the exact number of the conditions that were not fulfilled.

Figure 13:
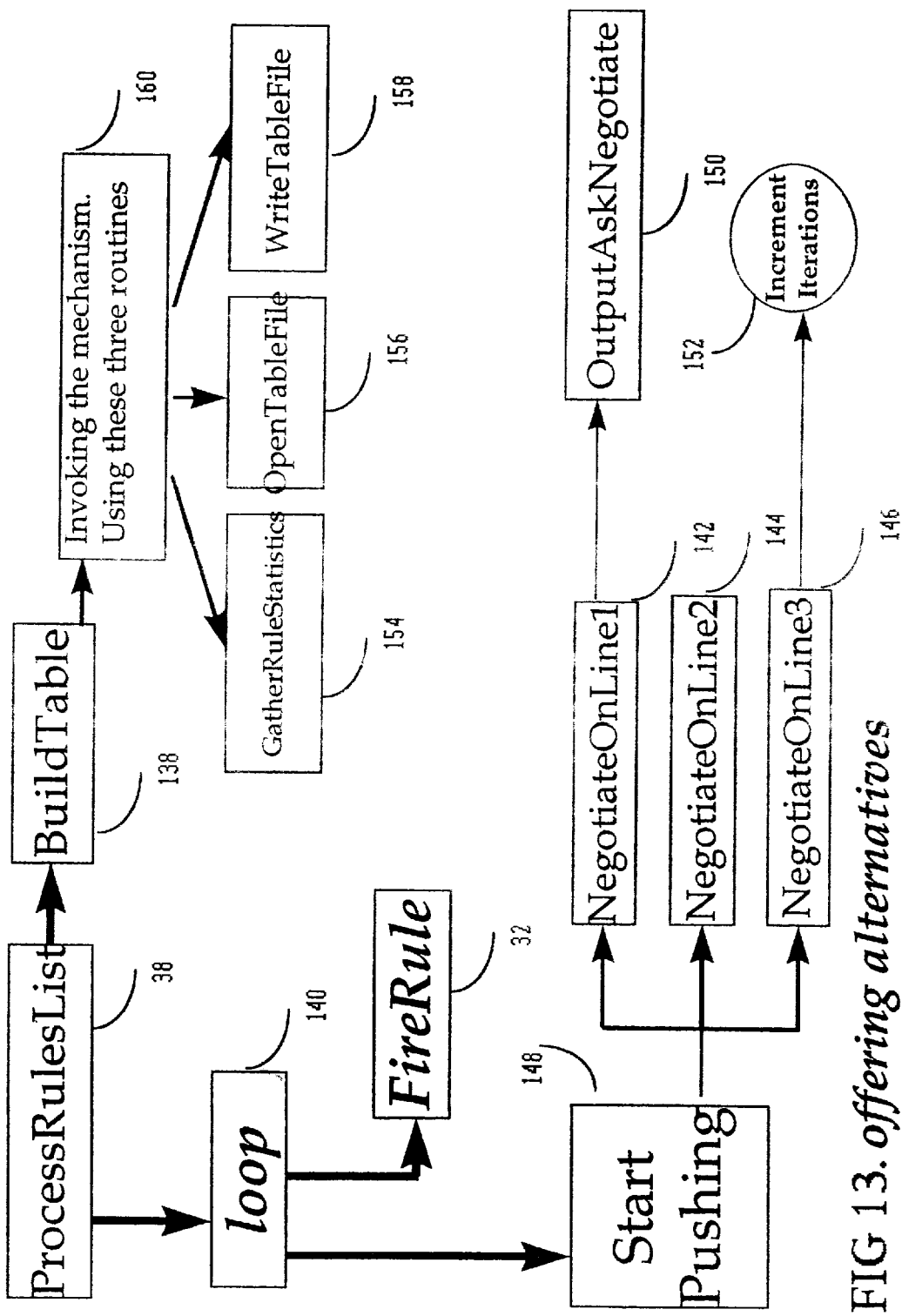
FIG. 13 is a schematic block diagram of an illustrative system of offering alternatives according to the present invention.

The operation of the mechanism for offering alternatives is described with reference to FIG. 13. The mechanism is invoked (FIG. 13, Block 160) from "ProcessRulesList" (FIG. 13, Block 38) using "BuildTable" (FIG. 13, Block 138). This routine creates the table file if the table file does not exist. If it exists this routine simply opens it for reading. Then "ProcessRuledList" (Block 38) invokes the "Loop" (FIG. 13, Block 140) mechanism to do the work.

Given a department's name and the rules list, the "BuildTable" (FIG. 13, Block 138) routine builds a table file using "OpenTableFile" (FIG. 13, Block 156) which consists of lines marked with "line" which hold the satisfied and not satisfied conditions for each and every rule, and other lines marked with "goodLine" that carry the information about those the rules which are relevant to the negotiation. The writing to the file is done by "WriteTableFile" (FIG. 13, Block 158). This information must consist of rules that meet the following demands: a. These rules must have all their attributes declared as negotiable. b. The maximum number of conditions that were not fulfilled must be less or equal to X, where X is a constant number defined either by the detection engine or directly from the e-shop's configuration file. The "gatherRuleStatistics" module is called (FIG. 13, Block 154) to satisfy these demands:

First, each and every rule in the current department is processed, checking which conditions were fulfilled and which were not fulfilled in the current session.

Then the "line" entries are constructed and written to a file using "WriteTableFile" (FIG. 13, Block 158). The lines are sorted to "goodLines" according to the number of unfulfilled conditions in those rules and whether or not a "line" consists only of negotiable topics. If at least one topic in a "line" is not negotiable, a negotiation on this "line" is not possible.

The "goodLine"S also specify the exact number of unfulfilled conditions for each rule.

The "WriteTableFile" (FIG. 13, Block 158) writes both "line" entries and "goodLine" entries to the same file.

To sort all the "line"s to "goodLines", statistics are gathered on the "line" to see how many unfulfilled conditions they have.

The program starts by looking at the "maxZeroes" information—which specify the maximum number of disproven conditions a "line" can have so it will be treated as "goodLine". This number is set by the VSD when the VS is built, however, it may be altered by the DE throughout the session.

A "line" will be considered as "goodLine" if and only if the number of conditions that were not fulfilled in this line is less or equal to "maxZeroes". If the number of conditions that were not fulfilled in this line is less or equal to "maxZeroes", "GatherRuleStatistics" (FIG. 13, Block 154) will also create a "goodLine" which will contain only the conditions that were not fulfilled in the current line. If the number of unfulfilled conditions is greater than "maxZeroes", the current line is skipped and the program continues checking the next line.

If the constant "maxZeroes" was not specified in the VSD or set by the detection engine, the default is preferably considered to be 3.

The "Loop" (FIG. 13, Block 140) procedure is where negotiation actually occurs.

The method is to process N "goodLines" where N is configurable either by the VSD, or by the detection engine.

This is a "smart" processing with a priority—from the "best" option to the "worst" option: e.g. the "goodLine" which has only one unfulfilled condition vs. a "goodLine" which has all N unfulfilled conditions. To do so, "StartPushing" (FIG. 13, Block 140) routine is called, but first the flag "question_out" is turned on, so no more questions are asked during the process.

"Loop" (FIG. 13, Block 140) uses the memory for reading. It checks the memory from time to time looking for an information saved under the handle "negotiated". Once it finds such information, it looks for the matching user's answer. If the answer is "yes" (e.g. the user was asked a question of the type "Do you agree to compromise and agree the color of the diamond would be yellow?" and answered "yes" to it), "Loop" (FIG. 13, Block 140) puts the information received by the negotiation process as if it was received by a normal process, and invoke "FireNextRule" (FIG. 2, block 34) to process the rules again with the extra information supplied (in the memory).

The "StartPushing" (FIG. 13, Block 140) routine executes for a maximum times of "productsToNegotiate" which is a constant number similar by definition and handling to "maxZeroes". The routine specifies the maximum of products which are allowed to be pushed, and thus, the maximum number of "goodLines" which the program is allowed to process.

This procedure ("StartPushing" (FIG. 13, Block 140) gives the "grading", such that the program begins looking for a "goodLine" with 1 unfulfilled condition.

When such a "goodLine" is found, the program initiates "NegotiateOnLine2" (FIG. 13, Block 144), and increments the iterations counter (FIG. 13, block 152) using "NegotiateOnLine3" (FIG. 13, Block 146).

After "NegotiateOnLine2" (FIG. 13, Block 144) is finished, and there is no product available for the user yet, the processed "goodLine" is deleted and the program tries to find another "goodline" that also has one unfulfilled condition. If the program could not find a "goodline" that has only one unfulfilled condition, it looks for a line which has 2 unfulfilled conditions and so on. All in all 2 indexes are used, one for the total amount of the "goodLines" already processed, and the other for the current amount of unfulfilled conditions being processed. The procedure stops execution and exits immediately if one of the following events occurs. First, if the number of "goodLine"s processed exceeds the limit set by "productsToNegotiate", or alternatively, if the number of unfulfilled conditions being examined exceeds the limit set by "maxZeroes".

"StartPushing" (FIG. 13, Block 140) stores the two inner indexes in the virtual memory in order to prevent data loss.

The "NegotiateOnLine2" (FIG. 13, Block 142) routine takes as an argument the "goodLine" to process. It calls "NegotiateOnLine1" (FIG. 13, Block 144), which outputs questions to the user regarding the appropriate topics by using "AskUserNegotiate" (FIG. 13, Block 150). The module performs a local "rules discard" mechanism after each part of the current "goodline" was negotiated but before the user's answer is checked. If the answer is "no", the "goodLine" is deleted entirely and the program exits. Before exiting the program reads the current number of iterations (the "goodLines" which were processed) from the memory and increments this number (FIG. 13, Block 152).

The "AskUserNegotiate" (FIG. 13, Block 150) procedure outputs specific "yes or no" questions for offering alternatives according to a factor described as a "negotiating factor", such as the price.

The VSD may specify a special question in the description of the topic in the VS file, such as "You know, the color you are asking for is currently unavailable, but we have so many other beautiful colors. Maybe you would like . . . ". The rest of the sentence is constructed by this routine on the fly, according to the value that the specific rule expects, such as color, brand name, size, etc.

If the VSD chose not to specify a special question, there is preferably a default text of the type "Would you agree<Topic> would be <Value>", where the topic is the current topic that is passed to this procedure as an argument. The value is the value needed to equate with the topic in order to perform the rule which is specified by the current "goodLine".

As an alternative and preferable file handing mechanism, the file for dumping the "lines" and "goodLines" could be created under the department's name, which would increase the ease of finding and manipulating the different routines participating in the mechanism.

The handle obtained is saved in the memory under the memory section "system".

When the file needs to be opened subsequently, the previously saved handle is used to open the file. Then all the information is written to the virtual memory, using the "OpenTableFile" (FIG. 13, Block 156) routine.

For writing the "WriteTableFile" (FIG. 13, Block 158) routine is used, which receives the department's name as its only parameter.

The routine opens a file under that name and writes to each and every piece of information to the file regarding the "line"s and the "goodlines". The "line"s and the "goodLines" have already been constructed in another routine, so all "WriteTableFile" (FIG. 13, Block 158) must do is transit them in the appropriate order to the file.

Figure 14:
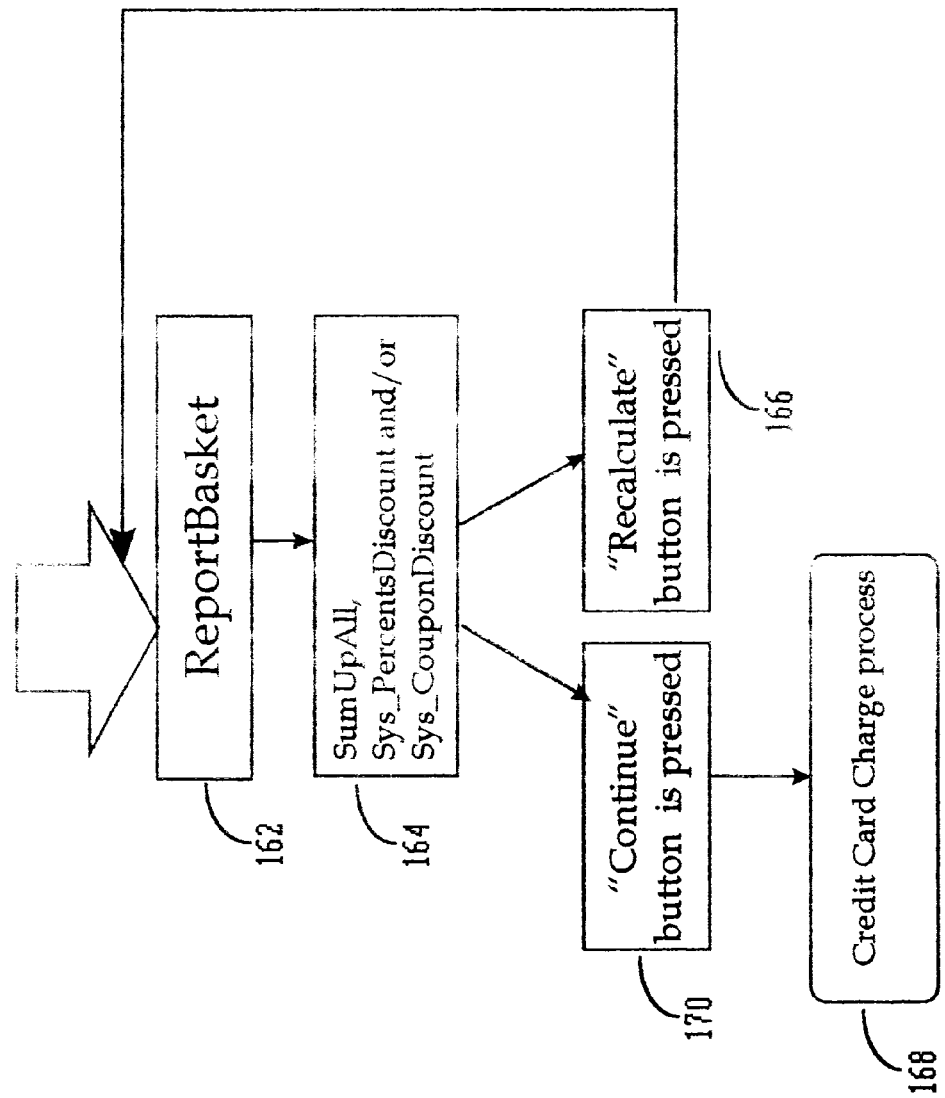
FIG. 14 is a schematic block diagram of an illustrative financial purchase manager according to the present invention.

FIG. 14 shows an illustrative embodiment of the Financial Purchase Manager (FPM). The FPM provides financial service of purchases. It enables the display of the full list of goods bought, their prices, any discount and the total amount which the client should pay.

The client has the ability to change the quantity of chosen goods and recalculate the sum of discount and the total price according to the changed quantity.

All the processes of the FPM are implemented as a specific part of the "Perform" (FIG. 2, block 40) unit for credit card charging.

For mathematical calculations of total sum and discount, the "SumUpAll" and "Sys_PercentsDiscount" (FIG. 14, Block 164; FIG. 7, Block 98) routines are used accordingly. They are both launched from "ReportBasket" (FIG. 14, Block 162), a routine that is responsible for displaying the list of the purchased goods.

The operation of these procedures are described with reference to FIG. 14. Before displaying list of purchased goods, the total price and discount are calculated. A list of goods is displayed in a table with a quantity field for each row (product) allowing the user to change the number of units to be ordered separately for every product.

The "ReportBasket" (FIG. 14, Block 162) routine starts by skimming the memory in search of "purchased" handles. As it was described in "The interface to the SEU" section of this document, the "purchased" handle stands for products that were purchased during the session.

Once it finds such a handle, "ReportBasket" (FIG. 14. Block 162) extracts the product's name and refers to the VS file.

In the VS file, "ReportBasket" (FIG. 14, Block 162) finds the product by the name and finds the price in the product's description/database field. The product's name and price are saved as a list entry.

After "ReportBasket" (FIG. 14, Block 162) has found and processed every "purchased" handle, it generates a HTML page with a table. The rows of the table consist of the generated list's entries plus one more column for the quantity field. The value of the field is also read from the virtual memory and is preferably "1" by default. Two buttons, "Continue" and "Recalculate" are displayed on the GUI and the output finishes.

The identity of the field corresponding to each product is known because the field's name in the HTML generated source it receives the name of the product it responds to.

The user's input is preferably checked to avoid negative numbers, fractions or letters. If the user uses one or more types of invalid input as described above, a message is shown, saying that only positive, whole numbers are allowed.

The user is preferably only able to press the 'Continue' button after pressing 'Recalculate' if the quantity has changed. Pressing the "Recalculate" button starts the process from the beginning (FIG. 14, Block 166), so that the "SumUpAll" (FIG. 14, Block 164) routine is invoked followed by "Sys_PercentsDiscount" (FIG. 14, Block 164) and/or "Sys_CouponDiscount" (FIG. 14, Block 164) with the new quantities so to the total price is obtained and the discount updated. The results of the inference resides in a new HTML page created by "ReportBasket" (FIG. 14, Block 162) as it repeats the whole process again.

Because the new quantities reside in the virtual memory with the name of the product they refer to, the new page includes the new quantities as the appropriate fields' values.

Pressing the "Continue" button (FIG. 14, Block 170) takes the user to the credit card charge process (FIG. 14, Block 168). The Financial Purchase Management unit may include the credit card charge unit, or else alternatively and preferably the units can be separate but in communication with each other.

The Credit Card Charge (CCC) process enables safe transfer of credit card numbers through the Internet. The security is provided by transferring the number with a plurality of separate transactions, in which the number is divided into a plurality of portions, and each portion is included in a separate packet for separate transmission through the Internet. The user preferably decides how many digits from the credit card number are transferred at any transaction. The CCC process at the client side has the following steps. First, the user is prompted to fill in a form including the shipping and credit card data. Next, at least one digit of the credit card number is entered in the input field. The user than presses the "Continue" button to send the form.

On the next screen the user is prompted to input at least one more digit and press the "Continue" button. This process is continued until the whole number is entered. The number of figures left to input is displayed.

After the entire number is received, determined by the server according to the type of the credit card and the number of expected digits of the credit card number, the user is prompted that the process finished successfully.

If characters other then numbers were entered or extra numbers were entered it is considered to be an error and the user is informed of the mistake. The process is interrupted and preferably must start all over again.

CCC process implemented as a specific part of the "Perform" (FIG. 2, block 40) function.

Note: The client decides how many digits to put in each form. The system generates as many forms as needed to charge the complete credit card number.

The operation of the credit card charge unit is explained with reference to FIG. 15.

The same "Perform" (FIG. 2, block 40) function is called several times during CCC process. However the behavior is different depending upon the CCC process state. In order to indicate the state, appropriate flags are used.

Figure 15:
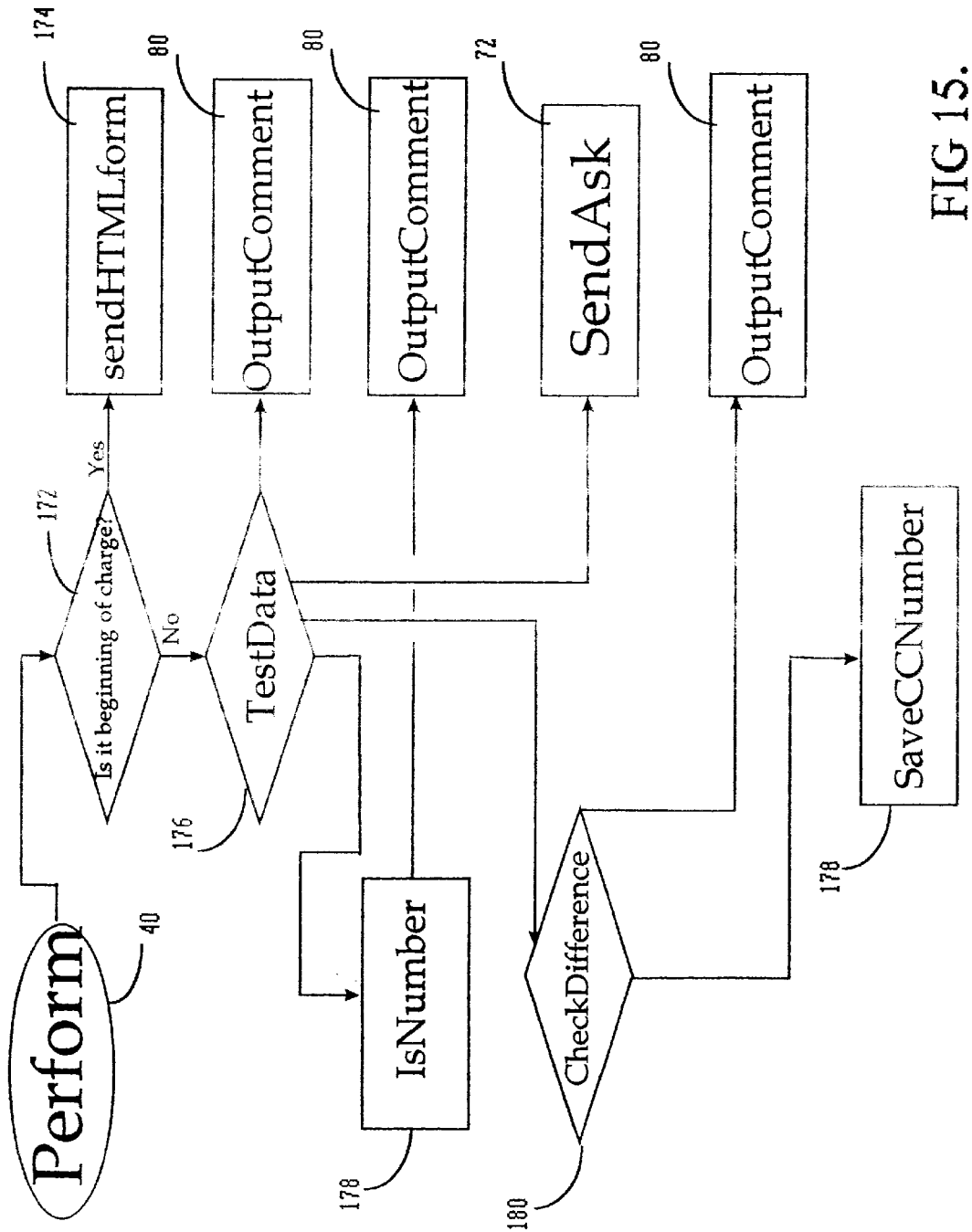
FIG. 15 is a schematic block diagram of an illustrative credit charge manager according to the present invention.

When entering the "Perform" (block 40) function, first the flag "ibeginning_of_charge" is tested (FIG. 15, Block 172). This testing is being done in order to send the first (prepared) HTML page at the beginning of CCC process with the use of "HTMLSend" (FIG. 15, Block 174). If it is the beginning of the CCC process, the first (prepared) HTML form is sent using "HTMLSend" (FIG. 15, Block 172). The difference between the first and the following pages is that the first page exists as a file in the disk while the others are created dynamically. The first form is being simply read from the disk and sent to the user by the "Interface" module using "HTMLSend" (FIG. 15, Block 172). Other pages are built "on the fly" by the same "Interface to the SEU", that has functions for building number types of HTML forms. The "SendAsk" (FIG. 15, Block 72) function is used for prompting to input numbers and "OutputComment" (FIG. 15, Block 80) for reporting state (errors and success). The first form that is sent by "HTMLSend" (FIG. 15, Block 174) includes fields for name, address, telephone number of client, credit card type and first part of credit card number.

The "TestData" routine (FIG. 15, Block 176) tests the received data and indicates whether the important client data was input by the client into the first page and was successfully received by server. All fields in the first page must be filled in, preferably excluding some non-mandatory fields such as telephone number and E-mail address. If not all the necessary data was filled in, an error message is sent using "OutputComment" (FIG. 15, Block 80) and the CCC process restarts.

The next test performed by "IsNumber" (FIG. 15, Block 178) determines whether the received portion of the credit card number is a valid number. If any non-numerical characters are present in the received part of credit card number, the number is invalid. If the number is invalid, an error message is sent using "OutputComment" (FIG. 15, Block 80) and the CCC process restarts. If the received part of credit card number is valid, the part is appended to the previously received parts using string concatenation, in order to construct the whole number. The "f_charge" variable serves for credit card number collection.

The third test performed by "CheckDifference" (FIG. 15, Block 180) checks whether the whole credit card number was received. The decision is made by matching the received number length with a previously stored constant number which is a length of every known type of credit card number. "CheckDifference" (FIG. 15, Block 180) performs all of the length tests.

The "CheckDifference" (FIG. 15, Block 180) routine is called from "TestData" (FIG. 15, Block 176) to calculate the difference between the valid length of the given credit card number and the length of the received data. There are two purposes for this calculation, showing the client how many digits are left to input and checking if the length of the input number is larger than it should be.

This function simply performs a subtraction between the length of the number as it should be (a constant) and the length of the number that was input. The variable "left" serves to store the difference. If the entire number was not yet received, "CheckDifference" (FIG. 15, Block 180) returns the difference and "TestData" (FIG. 15, Block 176) prompts the client using "SendAsk" (FIG. 15, Block 72) to input the next part. "TestData" (FIG. 15, Block 176) shows the user how many digits are left to input, using the value that was calculated in "CheckDifference" (FIG. 15, Block 180).

While checking the entire number received, the situation of extra data input is being tested as well. In the case that extra numbers were entered "CheckDifference" (FIG. 15, Block 180) returns a negative difference. "TestData" (FIG. 15, Block 176) informs the user about the mistake and the CCC process is restarted. If the input is of a valid length, "CheckDifference" (FIG. 15, Block 180) returns 0 and "TestData" (FIG. 15, Block 176) notifies the client about a successful transfer using "OutputComment" (FIG. 15, Block 80).

After the numbers have been received, the credit card number is optionally encoded and stored using "SaveCNumber" (FIG. 15, Block 178) along with the user's private information for further processing. Thus, if encoding is used the whole credit card number exists as a whole only for a rather short period of time.

Encoding is performed by the following steps:

The number being encoded is divided into several parts.

Every part is encrypted using an arithmetic or a logic operation with the appropriate part of the key. Alternatively and preferably, each part is encrypted substantially before being transmitted from the first computer to the second computer. During encryption, the length of the result string may overflow or underflow the length of the part that was encrypted. To recognize this, "situation flags" are set such as 'overflow', 'underflow' or 'no overflow' for every part that is being encrypted.

The credit card number is then reassembled from the parts with the additional flags. The process is as follows.

First, the number, as well as the key, is converted to a string. Then, the "encrypt" routine is invoked.

The first few characters of the number are taken and converted to integer. The same is done with the first part of the key. The arithmetic or logic operation with these two integers is performed. If overflow or underflow occur then the appropriate 'overflow' or 'underflow' flag is set.

Note: the actual representation of the flags consists of three parts: the first holds, as was said previously, the "overflow" or "no overflow" information about the part of the number it corresponds to. The second part of the flag carries information about the number of digits that the according part of the number contains.

In case overflow or underflow did occur, the third part of the flag holds the extra (or missing) number of digits which were added (or subtracted) as a direct results of the encoding operation. This number is evaluated by subtracting the length of the string before encryption from the length of the string after encryption.

The initial value of the flags is set to "no overflow" for the first part and "0" for the other two parts.

The second part of the number is taken and converted to an integer. The same is done with the second part of the key. The arithmetic or logic operation with these two integers is performed. If overflow occurs the appropriate 'overflow' flag is set.

The same conversions and operations are performed with every part of the number and the corresponding part of the key.

After that, all encrypted parts of the number are converted to strings and packed to a whole, encoded string, along with their corresponding flags.

The resulted string is stored in an external file along with the rest of the client's personal data (name, last name, etc.).

The decoder is a separate program, isolated from the Encode program in order to avoid fraud and theft. It can be located in a different server, URL, company, network or the like.

One implementation can be to locate the decoder program at the credit card company, so the card number is not available even to the VSD. The VSD receives the number only as a code representation while the true card number stays at the financial institution.

The decoder takes the string that represents the decoded credit card number, divides it into the parts which are set by the flags, converts the parts to integers, takes associated parts of the key, converts them to integers and performs the opposite arithmetic or logic operation with each part-key pair.

After performing the operation with all pairs, the decoder packs them all to create the decoded number. The Decoder takes the encoded string as the first and only parameter. The Decoder starts by extracting the flags' sub-string from the string. Then, by the value of the second part of the flag, the decoder collects the appropriate number of digits from the number and the key.

The sub-strings formed in branch 1 are transformed to integers.

The opposite arithmetic/logic operation is performed on these two integers. (instead of "+" there will be used "−" here, instead "*" used in the encoder, here shall be used "\" and so on).

The result is saved in a container.

Steps 1–3 are performed until the entire number is processed.

The list that was constructed from all the parts (branch 4) is assembled as a string.

The Department Messages are described with regard to FIG. 16. Every Department may contain a message list (FIG. 16, Block 182) which may specify 5 different types of messages (described below). This messages are of the form:

<Message keyword>=<Message test> where Message keyword is one of the "entranceMsg" (FIG. 16, inside Block 182), "failureMsg" (FIG. 16, inside Block 182), "exitMsg" (FIG. 16, inside Block 182), "non-purchasedMsg" (FIG. 16, inside Block 182) or "backInAMinuteMsg" (FIG. 16, inside Block 182) and the Message text is some lines of text the e-shop designer entered.

Not all five types of messages must be defined. Indeed, the messages might not be defined at all, if the VSD does not wish to let the user know which department is being accessed. These messages are configurable for each department separately.

There are basically 2 groups of messages : messages given upon entering a department and messages given while exiting. Those messages are handled differently. The pre-department messages work as follows. The message is handled by the routine that handles the entrance to the department.

It can be either "SectionA" (FIG. 16, Block 114) or "SectionB" (FIG. 16, Block 110), depending on the virtual shop design.

The message is retrieved from the messages list using the keyword "entranceMsg" (FIG. 16, inside Block 182). The message string is sent using the routine "OutputComment" (FIG. 16, Block 80), once the department which is about to be entered is identified using "startDep".

The post-department messages work as follows. There are several ways to leave a department. For example, if all rules are processed but there was no product to recommend—give a "failure message" (FIG. 16, inside Block 182).

If all rules are processed and one or more recommendations were given but the product(s) was not purchased—give a "non-purchased" message (FIG. 16, inside Block 182).

If all rules are processed and eventually the user did buy something—give an "exit" message (FIG. 16, inside Block 182).

If in the middle of rules processing, go to another department—give a "backInAMinute" message (FIG. 16, inside Block 182).

The procedures operate as follows.

The first 3 messages in the post-department messages are output using "OutputTheRightMessage" (FIG. 16, Block 184) routine.

The "OutputTheRightMessage" (FIG. 16, Block 184) routine is merely checks what message should be outputted and outputs the message using "OutputComment" (FIG. 16, Block 80). "OutputTheRightMessage" (FIG. 16, Block 184) is called from "BackADep" (FIG. 16, Block 102), which means that the messages are given when about to return to the previous department.

The "failure" message (FIG. 16, inside Block 182) is output if the flag "has_answer" is turned off for the current department (this flag is turned 'on' by "TryRecommend" (FIG. 2, Block 46) routine).

The "exit" message is output if the flag "purchased" is turned on for the current department.

The "has_answer" flag does not need to be checked, because purchasing can't be done without receiving a product recommendation first.

The "non-purchased" message is given when the flag "has_answer" is on but the flag "purchased" is off.

The "backInAMinute" message (FIG. 16, inside Block 182) is handled in the "Perform" (FIG. 2, block 40) routine. When "Perform" (block 40) encounters the keyword "department" in the results of the rule it has to perform—it retrieves the "backInAMinute" message (inside Block 182) from the current department messages list (FIG. 16, Block 182) and send it using "OutputComment" (FIG. 16, Block 80). This message is sent before leaping to the next department.

The description of the E-Shop builder is shown in FIG. 17.

The E-Shop is a software package, individualized for each VSD. Therefore, it has to be designed by the VSD and added to the SEU in order to form a complete, working system.

The E-shop builder is structured as a unit that helps the VSD build the e-shop. It does so by interrogating the VSD about the products, the selling methods and strategies. Everything is done in the form of an interactive interview with the VSD. The trend is to work on one product at a time—asking about the usual topics usually considered during the sale of the product. The purpose of this session is to teach the Internet Sales Representative regarding the shop, the products, the sales strategy, the negotiations and every other component the 'human' sales representative would like to teach to the Internet Sales Representative. However, it should be noted that the E-shop builder of the present invention could also be used to build substantially any rules-based system based on questions asked of, and answers obtained from, a live human being.

The procedure operates as follows. The process begins with greeting the sales representative and an explanation of the process, in a form of "Hello, welcome to the E-Shop builder. We will now build you an electronic shop which will consist of departments, shelves, products, a cash register and salesmen as you would like to see it. All you have to do is to answer the questions I will ask you."

After that, the session begins. The builder asks about the departments first. Departments are defined as product lines, much like real departments, so a possible answer to the question "which departments do you want?" may be "computers, printers, modems".

The builder then concentrates on each department separately, asking the VSD which products are to be sold in each department. For example, when the VSD is asked "What products do you want to sell in the printers department?", the answer may be "Epson 400, Epson600, Epson800, HPL6L".

After receiving the information about the products, the builder starts asking questions about about each product separately. The VSD is asked about the subjects usually considered while selling the current product. The term "subjects" refers to issues which are crucial to the selling process.

For example, if cars are sold then the acceleration of the car, the make and model, the number of passengers, even the color is important to know before any car is recommended.

So the VSD is prompted to enter those topics and the input may be something like "color, model, acceleration, performance" and the like.

Once the issues are known, the builder asks for the text of the questions. That text is used by the SEU later to ask about the issue. The builder asks "How would you ask your client what color he or she wants?". The VSD writes the question to ask, using imagination and creativity. For instance, an interesting question may look like this:

"The color of the car is very important, you know. My cousin once bought a beige limousine and no one has spoken to him for a year. So think hard before you tell me: what color do you want your car to be?"

After that, the builder needs to know the appropriate answers to the issues, the answers which lead the sales representative to recommend the current product. For example, if the issues are: "color, speed, acceleration" and the product is "Brand X car", the sales representative recommends that brand only if the color is black, gray or white and the speed is very high and the acceleration is very fast. So the next builder's question is "When you ask me "what color do you want your car to be?" what should I answer you so you'll recommend a Brand X car?" and the VSD will input all the colors wanted here, for instance "gray or black or white".

After the issues for the current product are processed in that way, the recommendation text is given. The recommendation text is used by the SEU to tell the user the recommended product. After the user is asked about the color, the speed and the acceleration and respond to the questions accordingly to what the VSD expected, the user gets this recommendation text. The builder asks the VSD how to recommend the product to the user. A possible answer could be "Brand X is the perfect choice for people who like big, fast cars. We have a special Brand X sale this month, so if you buy one now, you'll get a 10% discount!"

The process continues until all the departments are built, along with the topics, options, answers and so on. This indicates the end of the first pass on the creation of the E-shop.

The second pass deals with the different business strategies, the offering alternatives and the preferred products for each department. The builder go through the list of departments by their names asking the user to choose the business strategy for the department. Some possible business strategies are: human, quick, cruiser, as described above.

After selecting the business strategy, the builder asks the VSD about the products to try to sell first in the current department. The VSD may specify product names in the form of "Brand X, Brand Y, Brand Z". This list is written to the e-shop file as "preferred" for the current department. If the VSD supplies no answer to this question but just indicates acceptance, the builder will continue the investigation and no "preferred" brands are written to the file.

As for the offering alternatives, the builder asks the VSD only one question regarding all the topics in the department: "Click on the topics you want from the list below to specify that the topic is negotiable" followed by a list box that contains all the topics that were input throughout the session. If the VSD selects the topic in the list box, the topic changes color and is treated by the builder as negotiable. The word "negotiable" is written in the topic's description in the VS file. The same is done for the department to specify "negotiation=on" or "off" in the department's description.

The third pass is used to specify the department architecture (spider, path, pipe line, etc.).

The builder helps the VSD to create an appropriate design by giving directions based on the amount of the rules, the industry the VSD is dealing with and other criteria. In the fourth pass the VSD is guided through the construction of the "cash register" department and the decision of which department is the "main" department. The last pass before adding graphics to the VS is the pass where the builder simulates the session by reading the rules and outputting the appropriate questions. In this process the VSD may add the comments by clicking the "Add comment" button in the session's window instead of clicking the "OK" button which launches the next screen (question).

The process functions are described with regard to FIG. 17.

The "ProcessDepartments" (FIG. 17, Block 202) routine uses "OutputComboQuery" (FIG. 17, Block 186) to get the departments the VSD wants to put in the virtual shop. It simple outputs the question and reads a string of the departments' names separated by commas. It calls "ProcessProducts" (FIG. 17, Block 188) to gather information about the products the VSD has in each department.

The "ProcessProducts" (FIG. 17, Block 188) routine reads a string of products the VSD wants to sell in the current department and create a list of them. After that, this procedure goes through the list, asking the user to enter the topics. It calls "ProcessAllTopics" (FIG. 17, Block 192) to read, create a list out of and process the topics the VSD wants to talk about in the process of selling each product. In the end of it all, it builds the rule pattern and write it to the virtual memory directly (FIG. 17, Block 190). It also creates the appropriate pattern for product recommendation in SL format. This is also saved in the virtual memory (FIG. 17, Block 190), until the VS file is created (FIG. 17, Block 196).

Given a string of topics and the name of the product those topics are related to, The "ProcessAllTopics" (FIG. 17, Block 192) routine will create a list out of the topics and for each topic the following shall be performed:

If the topic is new (e.g.—the VSD never mentioned it before), the system asks the user for a text string which shall be used as a question for the topic. If the topic was recognized by the system as an existing topic, this query is skipped. The system asks the user what answer should received on the question so that the appropriate recommendation is the current product.

The question for the topic and the expected value are saved by this routine in the virtual memory (FIG. 17, Block 190), in the "on the fly" generated SL format. The pair topic-value is also saved separately under the handle "condition".

Both of these routines use "OutputComboQuery" (FIG. 17, Block 186) to generate output and "GetValidXXXX" (FIG. 17, Block 198) unit to read a valid input.

After a specific product has been discussed, the "MakeRule" (FIG. 17, Block 198) routine is invoked to collect conditions of the virtual memory (FIG. 17, Block 190) and organize them all under the handle "rule". After this procedure the conditions are delected so the different rules are not mixed up.

The "WriteVSFile" (FIG. 17, Block 194) routine is invoked by the main routine and is used to copy data previously saved in a working memory to a file. It opens a file with the name specified by the user plus the extension "sell". All information stored under the handle "products", "topics" and "rules" is flushed to the file.

"WriteVSFile" (FIG. 17, Block 194) is called every 10 minutes or so, in order to back up the existing work of the VSD.

The wizard library is used to generate an interesting, human output.

The file is divided to sections each of which is initiated by a certain keyword and contains several strings delimited by commas.

The strings themselves are represented as a normal text strings but they may contain "replace tags" of the format "'<'xxxxx'>'" "xxxxxx" is some line of text. While execution, this line shell be replaced with information generated on the fly, by "OutputComboQuery" (FIG. 17, Block 186).

The "OutputComboQuery" (FIG. 17, Block 186) routine is called with a query name (keyword) that must be specified in the "wizlib" and a list of replacements to be used instead of the text inside the "replacement tags".

First, a random number function is run, giving as a seed the number of lines in the section specified in the "wizlib" by the keyword, to avoid repeating the same question several times in a row.

Next, the line specified by the number that the random function returned is extracted, and the following operations are performed.

First, convert the string to a list of words.

Next, find the left mark-up tag ("<") and delete it from the list.

Replace the following text with the first element of the list of replacements given as a parameter.

Delete the right mark-up tag (">").

Delete the first element in the list of replacements, making the second element the first element for the next time.

The above steps are performed as long as the list of replacements is not empty.

The "GetValidXXXX" (FIG. 17, Block 198) unit contains various routines under the prefix "GetValid". These routines are responsible for getting a valid input from the user. Invalid input is a blank line, gibberish, etc.

Each of these routines calls "OutputComboQuery" (FIG. 17, Block 186) to ask the user to re-enter the answer to one of the wizard's questions. These routines are designed to be executed until the user gives a valid input.

The task of the Detection Engine (DE) is to detect different situations and twist the session course in a way the VSD decides. Extreme situations can be an industrial spy in the system, a user that wishes to purchase valuable products, or another thins, according to criteria defined by the VSD.

The detection engine can be thought of as a special, secret department in the VS. This department never produces any external output, instead its results are written to the system data in the virtual memory. Thus, the results of its rules modify the flow of the session.

Some of the "extreme situations" are handled by default in the DE, while the user is free to add such situation definitions at will.

The structure of the DE is the structure of a department without the messages. It is fully rule-derived as the results of a rule are either the modifiable features (such as "maxZeroes", business strategy, etc.), or any other type of information the VSD wants to put in the DE.

The procedure is operated as follows. The SEU is always aware of the DE physical location on the disk. While working in a normal mode, after each question outputted to the user—the SEU referring to the DE and scans it using the routine "LoadDE" which operates exactly like "FireNextRule" (FIG. 2, block 34) only with a different "Perform" (FIG. 2, block 40) routine: "twist". The "Equate" (FIG. 2, block 44) function, however, remains the same.

The "Twist" routine takes the results of the detection rules and write then to the "system" section of the memory. It acts differently based upon the given input.

If the result is a keyword ("maxZeroes", "departments", "business_strategy", etc.)—"Twist" replaces all existing information regarding the keyword.

If it some other input—"Twist" adds it to the memory and no overwriting takes place.

Some of the built-in options are as follows:

(*) Transfer to chat—given the appropriate conditions that were accomplished (following criterias described by the VSD), the DE is able to generate a message to the user that someone wants to talk to him and transfer him to chat with a human sales representative.

Show the door—the DE may decide, based on the conditions supplied by the user, that the current user is a spy or another intruder and is able to gently encourage the user to exit, saying something like "sorry, but we have no products available for you" or "I'm really busy right now, could you come back later?"

Lengthen the session—the DE is able to create a longer sessions by changing the "businessStrategy" information and/or changing the "maxZeroes" constant.

More/less animation—The DE can also change the visual appearance of a question/answer by outputting more multimedia or, on the contrary, prevent the SEU to output one or more types of multimedia. This is done by formatting the HTML script generated by the SEU and removing all references to pictures, sounds, movies, etc.

Changing the test of a question/recommendation—based on a specific conditions, the DE can replace the text of a specified question/recommendation with another text specified by the user.

The technique is the same as mention in the Visual Appearance.

Such a replacement can also be done with multimedia.

Add to VIP list—(available after the session only)—the DE decides which customers are "interesting" from the VSD's point of view and adds their e-mail to a special log for future use by the VSD.

The Portable Code SEU implementation structure and description is shown in FIGS. 18 and 19. The Portable Code SEU is a preferred embodiment of the present invention which has the advantage of reducing the amount of time required for data transfer between the client and the server through the Internet. Currently the speed of Internet connections is not very high. Sending the whole SEU+the e-shop to the client side needs only three transactions: one to transfer the SEU, the second to transfer the e-shop to the client and at the end of the session, the third to transfer the history of the session (log) back from the client to the server. For comparison, the SEU implemented in CGI (or any other non-portable web server technology such as ISAPI) requires one Internet transaction per question\comment\answer or message. A regular session may include 30–60 transactions such that a portable-code implementation of the SEU results in a significant acceleration of communication. In this implementation, the entire work that needs to be done by the SEU is done at the client side while the server is only responsible for uploading the SEU and the e-shop, and for receiving the log file.

There are two approaches developed to embed the SEU in portable code scripts, such as Java applets. Either the SEU is written in portable code language, or the SEU is invoked by an interpreter which was written in a portable code language.

In the first approach—the SEU works almost the same as if it was embedded using common web server technologies (CGI, ISAPI, NSAPI and the like). The difference is that the system works in consult mode at the client side (FIG. 18, Block 212). The steps of loading and launching it are as follows.

Once the request has been made to the server, the portable code written SEU script downloads itself to the client computer being operated by the user (FIG. 18, Block 210).

The SEU stays in the virtual memory of the client computer throughout the session (FIG. 18, Block 212).

Once at the client side, the SEU uses the open connection (FIG. 18, Block 208) as an input stream and loads a copy of the e-shop to the clients's memory (FIG. 18, Block 210).

The session takes place on the user's computer (FIG. 18, Block 212). All of the features are available by using the GUI (See FIG. 3), as described for the Web browser interface.

During the session, the user answers the questions, receives the comments of the SEU and messages, is exposed to multimedia and is able to purchase any product in real time.

After the session is finished, the program creates a file which holds everything saved previously by the SEU to the memory.

This file is transported immediately (FIG. 18, Block 214) to the server (FIG. 18, Block 214). The implementation of the SEU as portable code is very similar to the Web-based version. The only differences involve the interface with the user. Rather than building HTML pages as the SEU normally does, the portable SEU builds local windows and controls on the client side (GUI) (see FIG. 3).

Also, rather than loading the e-shop as a file from the server's computer (FIG. 18 Block 204), the portable SEU loads it by using an HTTP connection (FIG. 18, Block 208) through the Internet.

The credit card number transferring process differs from the process described previously (see FIG. 15). While working with the portable code, the whole credit card number is received by the SEU, encoded and passed on to the server (FIG. 18, Block 204) in one piece with a log and private client information (FIG. 18, Block 214). The reason for this difference is that when the entire program resides on the client computer, the possibility is reduced that the user's credit card number would be stolen.

There are two particularly important routines that require special attention: the routine that saves the virtual memory to a file, and the one that sends the log from the client side to the server.

The "PutMemToFile" (FIG. 18, Block 216) routine starts by gathering all flags' handles such as "info", "previous" and all others mentioned through this document. Then, it continues by creating a list from each piece of information associated with those handles. Each list is written to the file.

As the file returns to the server, the file is decomposed and saved in the log file along with other similar files.

The "SendLog" (FIG. 18, Block 218) function sends all the collected information received through the session and the credit card information (if there is any) to the server (FIG. 18, Block 204). The function opens an HTTP connection (FIG. 18, Block 208) to the server (FIG. 18, Block 240), sends a POST request with all the collected data and receives a confirmation about successful data transfer. The confirmation is sent using text/plain MIME type.

If confirmation is not received, the SEU reports to the user (FIG. 18, Block 206) that the purchase cannot be completed because of the absence of a connection (FIG. 18, Block 208) with the server (FIG. 18, Block 204).

The confirmation is given by a server side application written in CGI, ISAPI or other web server technology which received the data, saves it to the local disk in a previously specified location and, if the above two tasks were completed successfully, sends confirmation to the client (FIG. 18, Block 206).

In the second approach, the SEU is interpreted by a transportable code implemented interpreter.

The program, consisting of the SEU, the e-shop and the interpreter, is a stand-along application (FIG. 19, Block 220) which starts execution once all of the components are downloaded to the client computer (FIG. 19, Block 206). For this embodiment, the SEU must be implemented by an interpretable language (such as BASIC).

Once the interpreter is downloaded by the client, it builds an HTTP request, loads the SEU and starts the SEU. The remaining processes are operated as describe before.

The term "interpreter" refers to an interpreter from the source language of the SEU to the destination language (the portable code).

Because the e-shop may contain links to a database (FIG. 19, Block 222), which are impossible to transfer using any known portable code, the database must be converted to a file which is transferable (FIG. 19, Block 228).

The "DBtoNoDB" (FIG. 19, Block 226) routine uses simple string search to scan through the rule base and find references to a database (given by file name and entry number). It creates new, temporary, e-shop file in which every database reference is removed. Instead, an answer is written in SL format. This answer will consist of the product's name, the recommendation string and the price of the product.

The "DBtoSL" (FIG. 19, Block 228) routine is used to convert any database written in SQL, Oracle or DB2 format to a transferable file (FIG. 19, Block 228). The routine generates a list of every row in the original database. The database fields are written to a text file separated by commas. There is a "." (period punctuation) at the end of each row.

The SEU automatically identifies the first word as containing the object's name and the second word as containing the objects's text. For any other words it assumes they are the style, the asking format, "negotiable" flag (on or off) and "multiple" flag respectively. The process is similar to the one previously described for enabling the SEU to interact with the database directly. This routine may be used to transfer comments, questions and answers which are not do contain product information.

Note: The detection engine has the ability to determine whether or not to recommend to the user to start the session by using portable code. The DE may give a recommendation to start downloading the portable code version of the application to the user, based on the time of day and the speed of the connection, which is verifiable by the use of standard functions such as "ping".

The Shopping Smart summary software module is a preferred feature of the present invention which allows the user to view the list of products which were purchased. This feature is implemented within the Communication Environment using Web server technologies (CGI, ISAPI and so on). The user can see the contents of the purchase at any point of the purchase process.

Preferably, every HTML page used as a GUI for the present invention includes an icon to represent the Shopping Smart feature. When user moves the mouse over the icon, a window is opened. In the window the user can see a list of products, previously marked as purchased, with their respective prices and quantities. Below the list, the user can see the total sum of the cost of the purchase. The button "Recalculate" is supplied below for the user to push. The user has the ability to change the quantity of any purchased product in the appropriate "Quantity" text field and recalculate the total sum according to the new quantity. Moving the mouse cursor out of the Shopping Smart window causes the window to be closed automatically.

The Shopping Smart function is preferably always available on any Web page being used as part of the GUI by the present invention, so that there is no need to go to another Web page in order to view this information as described previously for other prior art on-line shopping implementations.

The Shopping Smart function can optionally and preferably be implemented in various languages by using various technologies. The implementations below are possible options for full and partial solutions.

For example, for the SEU based implementation example and structure, all the data processing and calculations are made by the SEU. When the user contacts the Shopping Smart icon with the mouse or other pointing device, preferably substantially without "clicking' on the icon, the 'onMouseOver' event launches the "ShopSmart" function written in the page in a form of script. The "ShopSmart" function launches the SEU in a special mode for Shopping Smart, in order to run Financial Purchase Manger mechanism. The SEU sends the response to Shopping Smart window in a form that was described above. Pressing the "Recalculate" button will send the updated information to the SEU. The SEU sends the results back to the Shopping Smart window as is usually done in regular CGI or other Web Server Technology processes.

The window is closed when it the mouse or other pointer device is "off" the icon, such that the GUI indicator (a cursor or arrow for example) is no longer visible in contact with the icon, through the 'onMouseOut' event, which is called from within the reference to the 'Shopping Smart' summary icon image.

The procedure for operating the "Shopping Smart" function is as follows. The ShopSmart procedure opens a window with an HTML (or other markup language) form (or other similar structure). The ShopSmart procedure calls the "open" function in order to open the window. The URL that is passed to "open" as a parameter is:

[SEU]?VS=[the VS name]&MODE=FPM

Using the mode "FPM", the SEU will know that the "Perform" (FIG. 2, block 40) routine which deals with FPM is required. Thus, the normal SEU process is halted and the appropriate "Perform" (block 40) routine (for FPM) is invoked.

Alternatively and preferably, the Shopping Smart function can be implemented by using substantially only JavaScript (or other similar languages as advanced markup language for all types of scripts, such as Java language and the like. When the user contacts The Shopping Smart icon with the mouse, the 'onMouseOver' event will launch the "ShopSmart" function. However, in this implementation, the function works differently. The function is operated as follows.

The ShopSmart procedure takes information about purchased products and displays that information in a table, positioned in a previously opened window. The data about purchased products and prices is generated by the SEU throughout the session and is accumulated in the dynamically created HTML pages as a hidden type of input. For example:

<INPUT TYPE="hidden" NAME="sys_purchased_01" VALUE="Brand X mouse">

<INPUT TYPE="hidden" NAME="BRAND X mouse" VALUE="30">

<INPUT TYPE="hidden" NAME="Currency" VALUE="$">

The shown data represents the product 'Brand X mouse' that costs 30$. By scanning names and finding "sys_purchased_nn" (where 'nn' is any integer) "ShopSmart" knows the name of the purchased product. Then, the matching price string can be retrieved according to the name and then concatenated with the currency string taken from the "Currency" hidden input. "ShopSmart" outputs the product name and price as row of HTML table to window. The same action is performed for all found products. The total sum is calculated and displayed under the products list. As a result, the user can see the full list of products, their prices and the total sum of the purchase.

According to another preferred embodiment of the present invention, "multiple Sales Representatives" can be implemented with the SEU. Such an embodiment can be used within a framework of a plurality of different Virtual Shops (VS) being operated with the same Sales Engine Unit (SEU). The VSD can build a number of VS's (separate VS for each department, product line or just a different electronic sales representative character) and to pass the VS file name on to SEU as a parameter. At least one characteristic of the different sales representative "characters" can determine the interaction with the user.

The manner in which the VS is loaded is optionally and preferably different for each Communication Environment (CE). As an example for CGI and HTML, in CGI mode the SEU is launched by an HTML FORM. In order to launch the SEU with another VS name, other than the default name, the FORM tag should look like:

<FORM METHOD=POST ACTION=<SEU name>?VS=<VS name>. . . > where <SEU name> is the real name of the SEU file, and <VS name> is the real name of the VS file.

The SEU gets <VS name> from the "QUERY_STRING" environment variable, previously written by the server, and loads the names VS file instead of the default.

The described method enables a separate VS to be implemented for every shop's department. Such an embodiment allows much of the work required for building the first VS to be reused for further VS implementations. In order to incorporate new departments in an existing VS, references to the different departments must be included and the information concerning each department saved in another file. The references are represented by strings. Each string includes the reserved word "ref", in order to recognize the reference as a reference, and a path to the referenced department. As an example, the reference can look like this:

PrintersRef=ref("/cgi/printers.sell").

The SEU will recognize the references and load all referenced files. In such a way, the SEU will have the full data of the whole shop.

If the different e-shops are constructed with different sales representatives, the DE preferably determines which e-shop to launch. For example, if one virtual sales representative is a woman named Kelly, another is a former boxer named "Rocky" who speaks accordingly, and yet another is a teenager named Jessy, the DE may decide which virtual sales representative is the most suitable for the user, based on user gender and age, the time of day, the speed of the connection, and so on.

The reasons for constructing different types of virtual sales representatives include the ability to use different languages, language styles, multimedia representations, or to give the user a variety of "people" to choose from. Another reason is that the use of multi-file VS is extremely useful when linked to an existing site. Yet another reason is to enable the user to receive a recommendation from each display on the GUI separately, instead of forcing the user to go through the session from the beginning.

In addition, working in multi-files also confers a great deal of flexibility for the DE. The DE may construct the session by deciding on the departments which are "off-limit" to the current user. For example, if the user is a spy, the department which gives information about the new line of the company's products could be made "off limits" to such a user.

According to yet another preferred embodiment of the present invention, there is provided the ability to transfer to "chat" mode from the SEU.

Transfer to chat, shown in FIG. 20, is the operation of detecting and transferring to live chat. The motivation here is the detection of users with whom such "chat" would be beneficial.

The DE is responsible for the detection of clients that the VSD has specified as "interesting" (FIG. 20, Block 230). For example, the VSD may construct a rule that says that only clients who bought 5 products or above, enter the chat. The rules according to which the DE will transfer the user to a live chat reside in the DE department. After the DE has come to a conclusion that the specific user should be transferred to chat, it must check for an available live human sales representative. Such a human sales representative is considered to be unavailable if all of that representative's previously opened browsers are connected to users.

If no human sales representative is available, the DE allows the SEU to continue the session without generating any message to the user. The DE then places the user on a queue and attempts to lengthen the session as much as possible while waiting for such a human representative to become available. After each "Post" request from that user, the DE automatically checks for an available line to such a human sales representative.

If a free line can be found, the DE constructs a page with a message to the user that human sales representative X would like to speak. After sending the page to the user, the DE immediately constructs a memo for the human sales representative which is a brief overview of the session with the user, including all the information the user has supplied.

After performing each of the following tasks, the DE connects the user to the chatter and the SEU's session with the current user ceases to execute.

If no free line could be found and there are no more features available to lengthen the session, the DE sends the user a message saying something like "Joe would want to talk to you so much, but all lines are busy. Can you come back later so he could talk to you?". The message sent in this situation is preferably constructed by the VSD in the process of building the shop.

The chat function is operated as follows, with reference to FIG. 20. The "ConductChat" (FIG. 20, Block 232) routine is the core for the 'transfer to chat' mechanism.

It starts by launching "CheckFreeLine" (FIG. 20, Block 234) to find an available line to transfer the user for the chat.

If "CheckFreeLine" (FIG. 20, Block 234) returns "NO_LINE", "ConductChat" (FIG. 20, Block 232) will indicate this situation by turning a flag "ChatQueue" 'on'. The user is now in a queue for a chat (FIG. 20, Block 236). Whenever the SEU sees that flag, it will invoke "CheckFreeLine" (FIG. 20, Block 234) again, trying to get the user to chat with the human sales representative.

If "CheckFreeLine" (FIG. 20, Block 234) returned a human sales representative's name, "ConductChat" (FIG. 20, Block 232) launches "BuildUserMsg" (FIG. 20, Block 238) with the parameter "in", followed by "BuildMemo" (FIG. 20 Block 240) to prepare both the user and the human sales representative for the coming chat. "BuildMemo" (FIG. 20, Block 240) clears the virtual memory of any trace of the user, finishing the session (FIG. 20, Block 242).

The CheckFreeLine (FIG. 20, Block 234) function checks for an available human sales representative for a chat. No parameters are passed to it; instead it works with an external INI file. The INI file contains the following information, written in the usual INI format:

[linesInfo]
Kelly=0
Kelly_IP=192.156.9.786
John=1
John_IP=222.999.1.333
Roy=1
Roy_IP=201.967.7.123
. . .

"Roy", "John" and "Kelly" are the names of the human sales representatives, while the numbers to their right are the flag (0—human sales representative's current browser is free, 1—human sales representative's current browser is busy). For each name, the IP address is also specified to get the full identification of the human sales representative when the users are matched to the human sales representatives throughout the chat.

"CheckFreeLine" (FIG. 20, Block 234) finds the section "linesInfo" and packs all the strings that follow it to a list.

The procedure then starts processing the list, by breaking each of the list elements to a "Name=IsBusy" structure and checking if the sales representative is free. If a free sales representative is found, "CheckFreeLine" (FIG. 20, Block 234) returns the corresponding "Name"; if not, the procedure returns "NO_LINE".

The "BuildUserMsg" (FIG. 20, Block 238) routine expects one of the following parameters: "in" and "out".

When it is launched with the parameter "in", this routine generates an HTML page for the following purposes: to inform the user of the transfer to a chat mode; and to initialize the chatter with some information that is passed to it by a hidden parameter residing in the page. It should be mentioned that the chatter is a different program, isolated from the SEU.

The form that is built is as follows.
<Form method=Post Action=/cgi-shl/chatter exe?MODE=CLIENT&STATE=INIT>
<Input type=hidden Name="clientName"
  Value=*client's name as was supplied in the beginning of the session*>
The next portion is where the message for the user is written:
<Input type=hidden Name="Sales representative" Value=
  *The sales representative's name*>
<Input type=hidden Name="Sales representativeIP"
  Value=*The sales representative's IP address*>
<Input type=hidden Name="Sales representativeIP"
  Value=*The sales representative's IP address.*>
<Input type=hidden Name="Data file" Value=*data file name*>
<\Form>

The parameters "data file", "Sales representative", "Sales representativeIP" and "ClientName" are those which shall be used by the chatter for initialization.

When the procedure is launched with the parameter "out", it generates a plain text message to inform the user that sales representative X would like to speak with the user, but that the representative is busy. The message could also suggest that the user could come back later, when X would not be as busy.

The "BuildMemo" (FIG. 20, Block 240) routine constructs a file to be passed to the chatter which displays the information in the sales representative's window.

Given the appropriate user's handle as a reference to the virtual memory zone that stores all the information about the user since the session started, "BuildMemo" (FIG. 20, Block 240) can work in one of the following ways.

If the VSD specified in the "config" section of the VS an "important" set of the form "important(interest, age, money, . . . )", which describes the major issues that the sales representative needs to know when entering a chat with the user, "BuildMemo" (FIG. 20, Block 240) processes the topics by their names, given on the right side of the "=" sign. It does so by referring to the appropriate handles in the memory, specified by those names, and retrieving the information that resides under those handles.

If no such section is specified in the INI file, or if it contains no data, "BuildMemo" (FIG. 20, Block 240) looks at all handles, but retrieves only the information meets the following conditions: first, that the information is of the form "(X, Y)" and second, that neither X nor Y are keywords (except the "purchased" keyword which identifies the products purchased throughout the session).

After the information was read from the memory "BuildMemo" (FIG. 20, Block 240), the information is placed into a file with the same handle which was previously generated by the SEU for referring the appropriate memory zone.

In each of these approaches, "BuildMemo" (FIG. 20, Block 240) goes through the entire memory zone. Regardless of the action taken with a handle, that handle is delected from the memory. In the end, all handles associated with the current user are removed so that this user no longer exists from the SEU's point of view.

As shown in FIG. 21, the chatter software module is a separate program designed for communication between the user and the sales representative. It has two modes: user mode and sales representative mode page (FIG. 21, Block 246). For "user" mode, it is launched by the DE (FIG. 20, Block 230). The sales representative runs his or her own chatter software module locally, declaring by doing so that he or she is ready to have a chat. The sales representative sees a few browsers, one for each of the users, while the user sees only the progress of the user's own chat with the sales representative.

Every time the sales representative opens a browser, it is considered by the chatter to be connected to a different sales representative. Thus, every time the word "sales representative" is used throughout the document, it is usually describing a single "user-sales representative" connection.

As described previously, the chatter can work in two modes: user and sales representative page (FIG. 21, Block 246). The mode in which the chatter works is passed to it by a parameter. The mode is 'user' by default.

When the chatter is activated, it checks to see if it is launched for refreshing the chatter page (FIG. 21, Block 244). The chatter page is refreshed automatically every 15 seconds. The "state" parameter contains the state of the channel, identified by the "channel" parameter. The examples for invoking the chatter are shown below. If the current state is "refresh" (FIG. 21, Block 244), the chatter calls the "RefreshChat" (FIG. 20, Block 262) function in order to send an updated chat page. In both 'user' and 'sales representative' mode (FIG. 21, branches of block 246), the chatter tests if the channel between the user and the sales representative exists (FIG. 21, Block 248). If the 'STATE' is 'INIT' the channel does not exist (FIG. 21, Block 248, the branch marked with "no") and thus the chatter calls the "BuildNewChannel" function (FIG. 21, Block 266) in user mode and "RegisterSales representative" (FIG. 21, Block 250) in sales representative mode and exits.

If the channel exists (FIG. 21, Block 248, the branch marked with "yes") and the "Send" button was pressed by either the user or the sales representative, the message received from the user or the sales representative is stored in the channel's storage room (FIG. 21, Blocks 254, 260). If the "Leave the Chat" button was pressed (FIG. 21, Blocks 252, 256—the branches marked with "yes"), the message "User has left the chat", or "Sales representative has left the chat" is stored (FIG. 21, Blocks 258). The message that is written depends on the current chatter's mode.

"UpdateRegister" routine (FIG. 21, Block 264) is called, in order to update the sales representative state. The "UpdateRegister" function (Block 264) marks the sales representative as "available" when the user left the chat, or deletes the sales representative from the section [linesInfo] when the sales representative left the chat.

The channel storage room looks like a section in a INI file where the name of the section is the name of the channel (channel0, channel1, channel2 . . . ). The channel's storage room contains data in the format shown below:

[channel 0]
sales representative_name=Michael
sales representative_IP=132.63.98.65
user_name=John
user_IP=123.65.89.5
sm_msg=Hello, glad to see you in our shop . . .
user_msg=Hi, I would like . . .
sm_msg=. . .
user_msg=. . .
[channel 1]
sales representative_name=Daniel
sales representative_IP=120.253.45.5
user_name=Alex
user_IP=157.125.84.235
sm_msg=Hello, glad to see you in our shop . . .
user_msg=Hi, I am looking for . . .

The functions for these channels work as follows, with reference to FIG. 21. There are two situations in which the chat page is refreshed: for an existing chat (the 'channel' parameter specifies a live channel); for initialization of the chat for the sales representative (the 'channel' parameter specifies a free line, such that the connection is idle).

In the case of an existing chat, the function scans the current channel's storage room for chat elements (string in form "sm_msg=. . . " and user_msg=. . .") and extracts the parts of chat text from them. Then, a markup language page is built from the gathered text and sent to the HTTP server.

In the case of initialization of the chat for the sales representative, the entire channel's data is scanned in order to test if the current sales representative is involved to chat by the Detection Engine (FIG. 20, Block 230). For this purpose the sales representative's name and the connection's IP address are matched to the current connections's data in every section. If no matching data can be found, a page with the text "Line is free" is sent to the free connection's browser as described in the "RegisterSales representative" function (FIG. 21, Block 250). If a new channel for the current sales representative is found, the function "BuildSales representativeResponse" is launched.

The function "BuildNewChannel" (FIG. 21, Block 266) takes the data previously prepared by the Detection Engine (FIG. 20, Block 230) about the user and the sales representative's data and builds a new channel for them. It builds the channel name by concatenating the word "channel" with the channel's number. The channel's number is increased by 1 for every new channel, starting with 0. A new channel's storage room (a new section in the INI file) is created and the corresponding data about the user and the sales representative (names and IP addresses) is written into it.

The description of "BuildMemo" (FIG. 20, Block 240) in the 'Transfer to chat' section of the present Application describes the generation and transfer process of the user data and the sales representative's name from the DE to the chatter (FIG. 20, Block 230).

The user IP address is received from the HTTP server using standard CGI (or other Web Server technology). The data is of the form as shown above. After those operations the function "BuildUserResponse" is called.

The function puts a new sales representative's name and IP address into the section "linesInfo" of the INI file. If the pair 'name-IP address' already exists (in the case the sales representative wants to conduct two or more chats simultaneously) the IP address is slightly changed (by appending letters 'a', 'b' and so on to the end of the IP address). This action is done in order to give every active browser, or connection, full identification.

After that, the chatter treats each entry in the "linesInfo" section as another sales representative. The sales representative's name is taken from the initial page of registration. The initial form includes a text field for entering the name of the sales representative. This initial form will launch the chatter as shown below:

<FORM METHOD=POST
ACTION="/cgi-shl/chatter.exe?MODE=SALES REPRESENTATIVE&STATE=INIT">

The sales representative's IP address is received from the HTTP server in the same way as the user's IP address.

How the sales representative's data appears in this form is described in the "Transfer to chat" part of this document. The Detection Engine (FIG. 20, Block 230) uses the information later on, to decide which sales representative is available or less occupied so it can distribute the users equally between the sales representatives.

After registering the sales representative, the chatter sends a page with a "Line is free" message to the sales representative. The page is refreshed every 10 seconds in order to check whether the browser has started a chat (the connection is alive). Refreshing is done by using a standard markup language tags within the markup page header.

The function "BuildUserResponse" builds a frame of markup language pages (as HTML, DHTML and like).

The pages include a header page with the sales representative's name, a Chat History page with reflects everything that was said by both the user and the sales representative since the chat was initiated, and a Message page which is the active text area for writing.

The Chat History page is automatically refreshed every 15 seconds. The refresh is implemented by using standard mark up language tags within the Chat History page header.

The Message Page includes two buttons: "Send" and "Leave Chat" for proceeding or interrupting chat respectively. Both of them are 'submit' buttons of the form, which means that pressing either one of them launches the chatter program. The event of proceeding or interrupting the chat is handled by the chatter program itself, which recognizes the button that was pressed based on the button's "VALUE".

The function "BuildSales representativeResponse" builds a frame of markup language pages (as HTML, DHTML and the like).

The pages include a Header Page with the user's name, a Chat History page (the same as above), a Message page (the same as above) and a Purchase History page.

The Purchase History page contains the list of options and products chosen by the user in this session with the SEU, before the chatter was entered. This list aids the sales representative to move the chat in the right direction. The page is built from the data of a file that was previously prepared by the Detection Engine (FIG. 20, Block 230). The name of the file is obtained by the chatter from the initial form (the form which launches the chatter).

The advanced parser link to the SEU is shown in FIG. 22. The parser is responsible for a) translating the user's queries (written in natural language) to conditions, b) skimming the rules in the VS file to find rules that contain those conditions, c) handling cases such as inappropriate words by activating several side mechanisms. In the last situation, those mechanisms preferably answer the user in a form of "Don't be rude", for example.

The parser's answers are recommendations of a product or type of a product, or stereotyped answers as written in the VS file as the results of the corresponding rule.

The whole mechanism works with two different files. The first file, a general file, holds the language fragments such as prepositions, adjectives, nouns, etc. The second file, the product keyword file, holds the professional terms that are relevant to the VSD's industry. For example, if the industry is diamonds then the file may contain words like "carat", "cut", "clarity".

The general file is preferably supplied with the software and is more preferably renewed occasionally. The other product keyword file is preferably and optionally constructed by the VSD, as a part of building the e-shop, although industry-specific libraries could also be used.

The language is defined with a number of relations between the product keywords, the most important being the schema. A schema is a description of the logical structure of the VS. In the parser, the schema is the "entity network" for the language. A schema entry follows the form: ENTITY ASSOCIATION ENTITY; this signifies that the two entities are bound together by the given association, such as 'diamond' from 'country', 'cut' of 'diamond', 'price' in 'shequels'.

Both of the files contain the following items. First, there is the schema of questions, which is the schema for all possible questions to be asked such as color of diamond, clarity of diamond, country of export, etc. Next, there are names of objects, in which all known objects are listed, such as diamond, country, year. Third, synonyms for entities are allowed, such as "stone" as the synonym for "diamond", "articulation" as a synonym for "cut" and so on. Fourth, synonyms for associations are allowed and can consist of more than one word. For instance the association "on" is a synonym for "above", and the associations "in", "inside of", "within" are all synonyms. Fifth, some words and phrases are simply ignored by the system since they are not directly relevant to the meaning of questions. Ignored words are "give me", "tell me", etc.

Sixth, the units of measure for different entities are, for instance, "carats" when the entity is the size of the diamond, "MHZ", when the entity is "speed of computer". Seventh, there are synonyms for relational operators, for example to state that a diamond is "bigger than" 1 carat. These synonyms are listed here. Eighth, alternative ways to designate adjectives for "minimum" in the current application are listed, such as slowest, smallest, ugliest, less interactive. Ninth, alternative ways to determine equivalent adjectives for "maximum" are listed here, such as fastest, biggest, most beautiful, smartest.

The parser recognizes at least nine types of queries: a) something that is equal to a second something ("diamond with the red color"); b) something that is associated with a specific characteristic ("computer with 8 MB of RAM"); c) something associated with another query ("dress from the leading designer"); d) something related to a feature ("diamond bigger than one carat"); e) a minimum feature ("lowest price", "slowest computer"); f) a maximum feature ("fastest computer", "biggest diamond"); g) a negative feature ("computer that is not big", "diamond that does not cost 1000 dollars", "operating system which is not Brand X"); h) query1 and query2 ("a very fast computer or big computer", "computer with 8 MB of RAM or with 3.2 MB of disk space"); i) query1 and query2 ("computer with 8 MB of RAM and 3.2 GB of disk space", "dress which costs 2000 dollars and is from the leading designer").

The procedure for operating the parser is as follows. The "GetQuery" routine (FIG. 22, block 310) is the main parser routine. It is invoked once the SEU discovers that the user entered a query.

First, the "DumpRedundant" routine is started to remove all punctuation marks and the words that are marked as "words to be ignored". "DumpRedundant" returns a list of words on which the parser itself is invoked, in the form of the "Comprehend" routine (FIG. 22, block 268). The "Known" routine (FIG. 22, block 312) is then launched. It travels down the list of words and checks every word to see if it's a known word. The routine looks for the word both in the language file and the professional terms file. In case unknown words are found, "Known" (FIG. 22, block 312) gathers them all in a list. After that, "Known" (FIG. 22, block 312) reports to the user that a portion of the question was not understood. The user is given two options, to formulate the question differently, or to give up the question. This output is done through "HandleErr".

"HandleErr"—In any other type of query other than those described or in the case the "Known" routine (FIG. 22, block 312) encounters an unrecognized word, the parser outputs an "error". If there is an unrecognized word, the word will be output also. Two buttons are output, labelled as "Rephrase the question" and "Give up". By pressing the "Rephrase the question" button, the normal SEU's session is suspended, the same page is output again, regardless of whether the user answered the SEU's question. If the "Give up" button was pressed, the routine checks if the user answered the SEU's question. If so, the session continues normally. If not, the question is output again, this time with no text area below.

The results of the parsing are stored in the virtual memory, and then the routine "HandleRes" is invoked. "HandleRes" is the routine that works with the virtual memory directly, and is responsible for deciding what action to take.

As noted before, the "Comprehend" routine (FIG. 22, block 268) launches the parser. The parser works in a method called "parsing by difference lists." It means that all of the functions that participate in the process of parsing the query have the input list as a parameter and return the remainder of the list after a part of a query is parsed. This remainder is stored in the virtual memory.

The first action of "Comprehend" (FIG. 22, block 268) is to invoke the "Sentence" routine (FIG. 22, block 270). As the "Known" procedure (FIG. 22, block 312) looked at the list of words and checked the validity of each word, so does "Sentence" (block 270) check for phrases. It has several structures it recognizes. If for any reason the structure cannot be recognized, it gives the user the same options as the "Known" (FIG. 22, block 312) routine.

The first block of "Sentence" (FIG. 22, block 284) deals with the queries of the form "How fast is the computer imaginary brand AAAA"?".

It attempts to break the query to the form "Size-Entity-Constant". The structure of the sentence is considered valid if and only if the following rules are true. First, the "Entity"

is defined as an entity in the professional terms file. Second, the "Size" is a relevant "size" for the entity (for example, the size "fast" is relevant for the entity "car" or "computer" but is irrelevant to the entity "dress" or "diamond"). Third, the "Constant" "is" or "belongs to " the "Entity" (for example, the constant "digital work station" belongs to the entity "workstation" or "computer" but does not belong to the entity "diamond"). Fourth, the statement "Size-Association-Entity" is defined as a valid schema, in which 'Association' is the preposition used. For example, the phrases 'computer is big' or 'software from "imaginary firm GGG"' are proper, but not 'computer from big' or 'software is "imaginary firm GGG"'.

First, the size is identified, because the size can consist of only one word. The identification is performed by examining all of the "rel_size" entries in the professional terms file. Then, the routine looks for a "Constant", which can be only a professional term or product keyword such as "imaginary brand AAAA", "imaginary designer's cloth", "imaginary firm CCCC" so that the search is relatively small. The search is performed by concatenating the list of words to a string, taking each constant defined in the professional term or product keyword file and checking for it within the string.

If a constant is identified correctly, the "ExpressEnt" (FIG. 22, block 274) procedure is invoked to determine if the remainder of the list is a valid entity. If it is, the size is examined for relevance to the entity. A relevant size is found with a "rel_size" entry which consists exactly of the entity and size detected. If the size is relevant, the association is retrieved using "ExpressAssoc" (FIG. 22, block 280). If a valid association is returned, the relevance of the constant to the entity is determined by finding a "data" entry in the professional terms file which specifically states that the constant "Constant" belongs to the entity found. The validity of the schema is checked by a single reference to the professional terms or product keyword file to verify whether the size found, the entity retrieved and the association established exist together as a schema.

The second block of "Sentence" (FIG. 22, block 286) handles the queries of the form "How fast is "imaginary brand AAAA"?". It attempts to decompose the query to the form of "Size-Constant". The structure of the sentence is considered valid if and only if the "Constant" is defined in the professional terms or product keywords file as a constant for any entity (for example, the constants "imaginary brand AAAA", "imaginary brand BBBB" and "imaginary brand CCCC" may be defined as constants belonging to the entity 'computer'. In addition, the "Size" must be relevant for the entity corresponding to the constant and the statement "Size-Association-Entity" must be defined as a valid schema, in which 'Association' is the preposition.

The third block of "Sentence" (FIG. 22, block 288) handles queries of the type "how fast is the fastest computer" or "how expensive is the dress of the leading designer". The query is decomposed to the form of "Size-Query". The structure is considered valid, if and only if the "Size" is relevant "size" for the entity, the statement "Size-Association-Entity" is defined as a valid schema, and the query "Query" is a valid query.

The size is located first and then the association within the question. The remainder is considered to be "Query" and is passed first to "ExpressEnt" (FIG. 22, block 274) which should return a valid entity, and then, if the previous process is correct, the "Query" is passed recursively to "Sentence" (FIG. 22, block 270) to parse and evaluate the query.

The fourth block of "Sentence" (FIG. 22, block 290) handles queries of the type "the slowest computer" or "the cheapest dress". The query is decomposed to a form of "Min-Query". The structure is considered to be valid if and only if the "minimum" word is relevant to the entity (the "minimum" word "slowest" is relevant to the entities 'computer' and 'rocket' but is not relevant to the entity 'diamond', for example), the entity in the "Query" query is defined as an entity in the professional terms file, and the "Query" is a valid query.

The fifth block of "Sentence" (FIG. 22, block 292) handles queries of the type "the fastest computer" or "the biggest diamond". The query is decomposed to a form of "Max-Query". The structure is considered to be valid if and only if the "maximum" word is relevant to the entity (the "maximum" word "fastest" is relevant to the entities 'computer' and 'rocket' but it is not relevant to the entity 'diamond', for example), the entity in the "Query" query is defined as an entity in the professional terms file and the "Query" is a valid query.

The sixth block of "Sentence" (FIG. 22, block 294) handles queries of the type "give me computers" or "tell me about the diamonds you have". The appropriate structure is "Entity" and thus, to be considered valid, the structure simply needs is to verify that "Entity" is a valid entity (the entity is defined in the "professional terms" file).

The seventh block of "Sentence" (FIG. 22, block 296) handles queries of the type ". . . faster than 200 MHZ", "bigger than 1 carat". The appropriate structure is "Rel-Val-Unit". The structure is considered valid if and only if the relational operator is relevant to the unit (for instance the relation "fast" is relevant to "MHZ" and the relation "long" is relevant to "meters", but both of those relations are irrelevant to "litters"), and the value "Val" exists.

The eighth block of "Sentence" (FIG. 22, block 298) handles queries of the type "computer faster than 200", "diamond bigger than 2". The structure should be "Rel-Val". The structure is considered valid if and only if the value is a valid numeric value and the relation is relevant to the entity used. There is a single measuring unit for the current entity, so there is no ambiguity in such a reference. For example, the only measuring unit for "size" of diamonds is "carat" so by saying "diamond with the size of 1", the phrase cannot be misunderstood. However, if "size" is defined as "can be measured as 'grams' or 'carats', the same phrase causes ambiguity. "IsSingleUnit" (FIG. 22, block 280) determines only one such unit is possible.

The ninth block of "Sentence" (FIG. 22, block 300) handles queries of the type "with a speed of 200 MHZ", "with a size of 1 carat". The structure is "Ent-Val-Unit". This structure is valid, if and only if the entity is valid, the value is a valid numeric value, and the unit is relevant to the entity.

The tenth block of "Sentence" (FIG. 22, block 302) handles queries of the type ". . . with a speed of 200", ". . . with the size of 1". The structure is "Ent-Val". In order to be considered valid, the structure must fulfill the following conditions. First, the entity is valid and the value is a numeric value. Next, there exists only a single measuring unit for the current entity, so there is no ambiguity in such a reference, as determined by "IsSingleUnit" (FIG. 22, block 280).

The eleventh block of "Sentence" (FIG. 22, block 304) handles queries of the type ". . . the computer "imaginary brand AAA"", "the book "imaginary book 1111" and the like. The structure is "Ent-Const". In order to be considered valid, the structure must fulfill the following conditions. First, the Entity is a valid entity and Const is a valid constant. In addition, the constant must be relevant to the schema.

The twelfth block of "Sentence" (FIG. 22, block 306) handles constants only. The structure is "Const". The constant "Const" can consist of multiple words, of course, as for "The Pride Of Sinai" (diamond), "imaginary brand ABCD" (computer) and so on. In this case, the constant must be valid and the entity to which it belongs is determined in order to replace the constant with the sequence "Entity-Constant" to continue parsing correctly. Thus, the phrase "how fast is the "imaginary brand AAAA"?" will be replace by "how fast is the computer "imaginary brand AAAA"").

The thirteenth block of "Sentence" (FIG. 22, block 308) handles the logic operators: "and", "or", "not", for queries in the form of ". . . the biggest computer and the fastest computer . . .". ". . . a diamond with size of 1 carat or clarity of VS", for example. Once one of these words is found, the structure is decomposed to "Query1 and Query2", "Query1 or Query2" or "not Query". In either case, the "Sentence" routine is invoked for each query separately.

"EvalQuery" (FIG. 22, block 272) is the routine for evaluating the query. The first block of "EvalQuery" (FIG. 22, block 272) is called from the first and the second blocks of "Sentence" (FIG. 22, block 284, 286 respectively). In this case "EvalQuery" (FIG. 22, block 272) receives the "Size" ("fast", "low", "big". . .) and the "Constant" ("imaginary brand AAAA" (the entity: computer), "imaginary band ONON" (the entity: band), "imaginary brand MMMM" (the entity: mouse)). The routine then finds the major corresponding entity for the "Size", looks for the entity in the description of the constant in the database and retrieves the value of the "size" listed there (for instance: "200 MHZ"). The result constant is saved in the memory under the handle "output".

The second block of "EvalQuery" (FIG. 22, block 272) is called from the fourth block of "Sentence" (FIG. 22, block 290). This part of "EvalQuery" (FIG. 22, block 272) receives the maximum word ("fastest", "most expensive") and the entity name ("computer", "dress") as parameters, and then retrieves a constant name ("imaginary brand AAAA", "imaginary designer's summer suit") from the entry defined as "maximum" for the current maximum word and the given entity. The result constant is saved in the memory under the handle "output".

The third block of "EvalQuery" (FIG. 22, block 272) is called from the fifth block of "Sentence" (FIG. 22, block 292) (queries of the type "the slowest computer", "the least beauitiful dress"). This part of "EvalQuery" (FIG. 22, block 272) receives minimum word ("slowest", "ugliest", "least expensive") and the entity name ("computer", "dress") as parameters, and then retrieves a constant name ("imaginary brand SSSS", "imaginary clothing EEE") from the entry defined as "minimum" for the current minimum word and the given entity. The result constant is saved in the memory under the handle "output".

The fourth block of "EvalQuery" (FIG. 22, block 272) is called from the seventh and the eighth blocks of "Sentence" (FIG. 22, blocks 296, 298 respectively) (queries of the type ". . . faster than 200 MHZ" and "faster than 200"). "EvalQuery" (FIG. 22, block 272) is called with the parameters "relop" ("faster", "higher", "lower". . .) and the value ("200", "1", etc.). Note that the value passed here have already been processed by "ExpressValue" (FIG. 22, block 278).

"EvalQuery" (FIG. 22, block 272) now determines whether the relational operator is a synonym for "greater" or "less" and retrieves the word's root (for example, "fast" is the root word for "faster", "big" is the root for "bigger", "interesting" is the root for "more interesting" and so on). Next, the appropriate (relevant) major entity for the word accepted previously is retrieved by using schema. For example, the entity 'speed' is retrieved for the word "fast". Next, a condition of the form "RootWord relation-operator Value" is constructed (for example: "Speed>200", "Size<3"). The condition is stored in the virtual memory, under the handle 'condition', for further use.

The fifth block of "EvalQuery" (FIG. 22, block 272) handles queries of the type ". . . with a speed of 200 MHZ" and "with a speed of 200" and thus is invoked from the ninth and tenth blocks of "Sentence" (FIG. 22, blocks 300, 302 respectively). When called, this part of "EvalQuery" (FIG. 22, block 272) takes only the "entity" (speed, size, height) and the value (200, 1, VVS . . .). Next, a condition of the form "Entity=Value" (Clarity=VVS, Speed=200, etc.) id determined. This condition is saved in the virtual memory under the handle 'condition'.

Both the fourth and the fifth blocks of "EvalQuery" (FIG. 22, block 272), also receive the logic operator preceding the query they are parsing. Thus, the conditions they construct are saved under the handle conditions, as stated before, but keeps the logical order, since the logic operator (if any is present) is saved under the handle "op", before the evaluated condition.

All entities, values, sizes and associations passed as parameters to "EvalQuery" (FIG. 22, block 272), or addressed to by this routine, were processed previously by the "Express XXXXX" routines (FIG. 22, blocks 274–282).

The "ExpressNum" routine (FIG. 22, block 276) is responsible for identifying numeric expressions in a query and words and phrases which stand for numeric expressions: "one million", "2 thousands", "five hundreds", "seven". The routine attempts to convert each word to a number. If the conversion succeeds, the process stops and the word is returned. If no numeric values are found in the list, "ExpressNum" (block 276) continues by searching each of the words "hundred", "million", "billion", "thousand". . . etc. in the input list. The set of the words which are searched also includes the words "one", "two". . . , "ten", "twenty". . .). If any of those words is found, "ExpressNum" (block 276) automatically converts the word to the numeric value and continues by looking at the word right to the next of it. This is done to correctly convert expressions like "ten thousand". If the word to the right is also one of the words mentioned above, the conversion is performed and the resultant number is multiplied by the result of the previous conversion. If the word to the right of the previous word is not a verbal representation of a number, "ExpressNum" (FIG. 22, block 276) determines whether it is an adjective. If it is an adjective, the word is skipped and "ExpressNum" (block 276) continues to the next word. If it is not, "ExpressNum" (block 276) stops executing and returns the converted result found. If nothing is found, the input list is returned, and the "result" returned is "–0".

"ExpressUnit" is a routine which uses an entity as a parameter and searches the measuring unit in the input list, from left to right. The procedure starts at the first word in the list. "ExpressUnit" then searches for that word first in the set of units from the file containing the professional terms and then, if the word is not found in the professional terms file, the procedure looks in the language file. When examining the professional terms file, "ExpressUnit" only considers the units which are defined for the current entity. If the word is found there, the word is simply returned, because the parser assumes that the query is of the form "Speed of 233 MHZ". If the word was not identified as a correct unit for the current entity, "ExpressUnit" checks if the word is an adjective. If it is an adjective, the word is skipped and "ExpressUnit" continues by examining the next word.

If no valid measuring units are found, this routine returns a symbolic constant "NO_UNIT".

The "ExpressValue" routine (FIG. 22, block 278) tries to retrieve a value for entities. The functions include retrieving a verbal value for the given entity (passed as a parameter). For example, the word 'Round' is a verbal value for the entity 'cut of diamond'. If this fails, the entity tries to find a numeric value in the text by calling "ExpressNum" (FIG. 22, block 276).

"ExpressValue" (FIG. 22, block 278) first examines the "Entity-Word" pair in the definition of "data" entries (assuming that the parser is parsing a query of the form "Clarity of VVS"). If "ExpressValue" (block 278) cannot find an appropriate "data" entry, an expression of the form 'data' ([clarity, 'VVS'], [clarity, 'PK']. . .) has not been defined. If no valid value of any kind is found, this routine returns a symbolic constant "NO_VALUE".

"ExpressEnt" (FIG. 22, block 274) retrieves entities or converts synonyms for entities to a "real" entity representation. For example, if an entity named 'diamond' with a synonyms list {'stone', 'rock', 'tear of angels'. . .}) is defined and the query is of the form "What is the biggest stone?", "ExpressEnt" (FIG. 22, block 274) converts the word "stone" to the word "diamond".

The "Sentence" routine (FIG. 22, block 270) launches the "ExpressEnt" (FIG. 22, block 274) function with a parameter which is a non-empty list of words. This list is considered by "Sentence" (block 270) to be a representation of an entity. Thus, "ExpressEnt" (FIG. 22, block 274) simply determines if the "Sentence" (block 270) determination is correct.

First, the list of the words is concatenated to a string. Then, "ExpressEnt" (FIG. 22, block 274) looks for the string in the "entity" definitions of the professional terms file. If the definition is found, it is returned. If not, "ExpressEnt" (block 274) continues to look for the word in the "synonyms" part of the file. If not there, "ExpressEnt" (block 274) returns a symbolic constant "NO_ENT".

"ExpressAssoc" (FIG. 22, block 280) retrieves associations or converts synonyms for associations to a "real" association representation. For example, if an association named 'in' is defined with a synonym list {'within', 'inside', 'from within'. . .} and the query is of the form "What color tubes are inside the TV?", "ExpressAssoc" (block 280) converts the word "inside" to the word "in".

The "Sentence" routine (FIG. 22, block 270) launches the "ExpressAssoc" (block 280) with a parameter which is a non-empty list of words. This list is considered by "Sentence" (block 270) to be a representation of an association. Thus, "ExpressAssoc" (block 280) simply determines whether the "Sentence" (block 270) determination is correct.

First, the list of the words is concatenated to a string. Then, "ExpressAssoc" (FIG. 22, block 280) looks for the string in the "association" definitions of the professional terms file. If the definition is found, it is returned. If not, "ExpressAssoc" (block 280) continues to look for the word in the "synonyms" part of the file. If not there, "ExpressAssoc" (block 280) returns a symbolic constant "NO_ASSOC".

The binary routine "IsSingleUnit" (FIG. 22, block 282) receives an entity as a parameter and searches the measuring unit section to see if only one measuring unit is defined. If so, this routine returns TRUE. If the measuring unit section contains more than one measuring unit, the routine returns FALSE.

The interactions of the SEU and the parser are as follows. The VSD may specify in the VS file, in the topics, answers and product definitions, where, if at all, the user has the option to ask a question. This specification is made by adding the keyword "AskHere" to the topic, to the answer or to the product definition.

When any of the routines "AskUser" (FIG. 2, block 36), "TryRecommend" (FIG. 2, block 46) or "DelTryRcmmd" (FIG. 2, block 48) consider a keyword, a text area is output, by using any standard mark-up language, under the name <Input Type=TextArea name=UserQuery>.

When the form is returned, after the user presses the continue button, first the text area is examined for a response. If there is an entry, under "UserQuery" with any text string the user wrote, saved under the handle "fact" in the virtual memory, the user's query is retrieved and the parser is invoked.

If no such entry is present "FireRule" (FIG. 2, block 32) is invoked normally.

After completing execution of the parser, "HandleRes" is invoked to handle the consequences of the parsing process. These consequences can be either 'conditions' or 'output', based on the query the user asked and how the parser translated it. For example, the result of a query in the form of "Do you have a computer of the size of 'Midi Tower' and the speed of 266 MHZ?" is 2 conditions, size='Midi Tower' and speed=266, linked by the operator "and". On the other hand, the result of the query "Give me the biggest computer you have" is output based upon which computer is defined as the biggest.

For a query of the type "give me computers . . ." or "I am interested in big screen TV's", identified by the flag "query" that is set to "request", the "HandleRes" invokes the "LookForCond" routine. This routine attempts to find the rules which contain those conditions. The routine first creates blocks out of the conditions. The blocks of conditions which are created are determined by the separating conjunction. If the structure is "Condition1 and Condition2", the two conditions are examined together, such that the rules must contain both the 'Condition1' and the 'Condition2' and those conditions must be also linked by an "and" conjunction. On the other hand, for "Condition1 or Condition2", the two conditions are examined separately, and thus the rules which contain either "Condition1" or "Condition2" are collected.

Preferably, the "and" conjunction has higher precedence than the "or" conjunction.

For example, if in the process of the session, the user asked: "I'm interested in computers with 16 MB of RAM and 3.2 GB of disk space", the procedure would be as follows. Suppose there are 10 computers which meet those demands, such that their corresponding rules contain the conditions memory=16 and diskSpace=3.2. The rules are then gathered to a list. "FireRule" (FIG. 2, block 32) now works only with that list, until the session is over. If no matching condition is found, the definition of the topic is used to build a sentence similar to: "Well, we do not have currently the computers with the exact speed you want, but we have computers with 300 MHZ of speed, 400 MHZ of speed, 100 MHZ of speed and lots, lots more!". These sentences are constructed using "OutputComboQuery" (FIG. 17, block 186) which takes the topic's name and the topic's value list as the parameters.

If there are conditions in the memory, and the flag "query" is set to "yesno", the situation is a little bit different. "LookForCond" is still invoked by "HandleRes", and the blocks of conditions are also built, but in this case, for each block constructed, the following procedure is followed. Each condition in the block is marked by "Condition:1". Then, the "Check" routine is invoked to process all of the rules in the VS file. If one or more answers are found at this point, they are output using "DelTryRecmmd" (FIG. 2, block 48). If an answer cannot be found, the block is re-marked as "Condition:0" rather than Condition:1", the topics in the conditions are declared as 'negotiable' and the "offering alternatives" mechanism is invoked (described in FIG. 13).

In the process of executing the "Check" routine, everything not yet asked is considered to be proven.

It is also possible that "HandleRes" does not find any conditions in the memory after "Sentence" (FIG. 22, block 270) is finished. In this case, a handle named "output" is located in the memory. Under this handle, all constant names are saved. "HandleRes" simply outputs the constants.

If the constant is a product, "HandleRes" outputs the button "purchase" and a "Sounds Interesting" button.

If a "purchase" button is pressed, information about purchasing is written to the virtual memory and the SEU's session continues normally.

If the "Sounds Interesting" button is pressed, "HandleRes" receives all of the rules which result in the recommendation of the current product. In those rules, the conditions which were not proven are received, and the investigation is started. For example, if the rule needs the speed to be 'high' and the 'size' to be 'big' and the 'color' to be 'Yellow', and the user's query was '. . . big computers . . .', the conditions speed='high' and 'color'='Yellow' are extracted, and questions are asked about the color and the speed.

It will be appreciated that the above descriptions are intended only to serve as examples, and that many other embodiments are possible within the spirit and scope of the present invention.

What is claimed:

1. A virtual sales representative for assisting a customer in the selection of a purchase product from an e-shop built by a merchant, the customer having interests, the e-shop offering a plurality of available products within at least one department, the virtual sales representative comprising:
   (a) an e-shop file containing:
      (i) a set of questions for presenting to the customer, said questions relating to the available products and the interests of the customer, said questions associated with responses from the customer, said set of questions having a changeable order;
      (ii) a set of comments for presenting to the customer, said comments relating to said responses of the customer, said set of comments having a changeable order;
      (iii) a set of informational messages for presenting to the customer, said informational messages relating to the at least one department, said set of informational messages having a changeable order;
      (iv) a set of actions for helping the customer, said set of actions having a changeable order;
      (v) a first set of rules governing the selection of said questions, said comments, and said informational messages, said first set of rules governing whether one of said questions, comments, and informational messages, is to be presented to the customer, and, if so, which of said questions, comments, and informational messages, is to be presented to the customer, said first set of rules containing logical operators;
      (vi) a second set of rules governing the respective orders of said questions, said comments, and said informational messages, said second set of rules containing logical operators;
      (vii) a third set of rules governing the selection of said actions for helping the customer, said third set of rules containing logical operators,
   (b) a virtual shop designer, for automatically generating and organizing said sets of rules, questions, comments, and informational messages through chat-like interaction with the merchant;
   (c) a detection engine for receiving responses from the customer to said questions and sensing the behavior patterns of the customer, said detection engine having an output, said detection engine operative to:
      (i) applying said second set of rules to determine the respective orders of said questions, said comments, and said informational messages;
      (ii) processing said third set of rules according to said logical operators;
      (iii) receiving behavioral data about the customer;
      (iv) determining whether said behavioral data is sufficient to prove at least one rule of said third set of rules;
      (v) selecting and initiating an action from said set of action; and
      (vi) activating said sales engine unit,
   (d) an alternative-offering mechanism for offering alternatives to the customer, said alternative-offering mechanism operative to applying said second set of rules to determine the respective orders of said questions, said comments, and said informational messages; and
   (e) sales engine unit operative to:
      (i) processing said first set of rules according to said logical operators;
      (ii) processing said second set of rules according to said logical operators;
      (iii) receiving said responses from the customer and determining whether said responses from the customer are sufficient to prove a rule of said first set of rules;
      (iv) selecting a product from the available products to recommend to the customer;
      (v) selecting a question from said set of questions for presenting to the customer;
      (vi) selecting a comment from said set of comments for presenting to the customer; and
      (vii) selecting an informational message from said set of informational messages for presenting to the customer;
      (viii) selecting a closest rule from said first set of rules;
      (ix) determining if said closest rule can be proven by responses from the customer, and if so, presenting the customer with a product associated with said closest rule, and if not, exempting said closest rule from said first set of rules and determining if a next closest rule can be selected from said first set of rules.

2. The virtual sales representative of claim 1, wherein said alternative-offering mechanism is further operative to presenting convincing text to the customer for convincing the customer to change his interests to be compatible with the available products, and wherein said alternatives are to be used instead of said interests.

3. The virtual sales representative of claim 1, wherein said sales engine unit is further operative to selecting a department from the at least one department for presenting to the customer.

4. The virtual sales representative of claim 1, wherein said e-shop file further contains a set of preferred products preselected by the merchant from the available products.

5. The virtual sales representative of claim 1, further operative to taking an order for a product from the customer.

6. The virtual sales representative of claim 5, further operative to receiving credit card information from the customer.

* * * * *